(12) United States Patent
Zhang et al.

(10) Patent No.: US 9,000,063 B2
(45) Date of Patent: *Apr. 7, 2015

(54) MULTISTEP UV PROCESS TO CREATE SURFACE MODIFIED CONTACT LENSES

(71) Applicant: Semprus Biosciences Corp., Cambridge, MA (US)

(72) Inventors: Zheng Zhang, Cambridge, MA (US); Alonzo Cook, Cambridge, MA (US); Karen Ann Schultz, Cambridge, MA (US); Jun Li, Brookline, MA (US); Christopher R. Loose, Cambridge, MA (US); Arthur Coury, Boston, MA (US)

(73) Assignee: Semprus Biosciences Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,832

(22) Filed: Dec. 14, 2012

(65) Prior Publication Data

US 2013/0158150 A1 Jun. 20, 2013

Related U.S. Application Data

(60) Provisional application No. 61/570,810, filed on Dec. 14, 2011.

(51) Int. Cl.
| | | |
|---|---|---|
| C08F 2/50 | (2006.01) | |
| C08F 2/46 | (2006.01) | |
| B29C 71/04 | (2006.01) | |
| A61L 2/08 | (2006.01) | |
| A61L 24/00 | (2006.01) | |
| C08G 61/04 | (2006.01) | |
| C08G 77/00 | (2006.01) | |
| C08K 5/00 | (2006.01) | |
| C08G 77/06 | (2006.01) | |
| B29D 11/00 | (2006.01) | |

(52) U.S. Cl.
CPC .............. *C08G 77/00* (2013.01); *C08K 5/0025* (2013.01); *C08G 77/06* (2013.01); *B29D 11/00038* (2013.01)

(58) Field of Classification Search
CPC .............. C08F 2/50; C08F 8/00; G03F 7/031; C08L 83/04; B29C 59/16; B29D 11/00038
USPC .................. 522/33, 6, 1, 71, 189, 184; 520/1
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,671,305 A | 6/1972 | Brown et al. |
| 3,671,502 A | 6/1972 | Samour et al. |
| 4,098,728 A | 7/1978 | Rosenblatt |
| 4,113,224 A | 9/1978 | Clark et al. |
| 4,136,250 A | 1/1979 | Mueller et al. |
| 4,138,446 A | 2/1979 | Kawakami et al. |
| 4,153,641 A | 5/1979 | Deichert et al. |
| 4,197,266 A | 4/1980 | Clark et al. |
| 4,211,227 A | 7/1980 | Anderson et al. |
| 4,444,711 A | 4/1984 | Schad |
| 4,460,534 A | 7/1984 | Boehm et al. |
| 4,480,011 A | 10/1984 | Durand et al. |
| 4,555,732 A | 11/1985 | Tuhro |
| 4,636,208 A | 1/1987 | Rath |
| 4,740,533 A | 4/1988 | Su et al. |
| 4,877,864 A | 10/1989 | Wang et al. |
| 5,002,794 A | 3/1991 | Ratner et al. |
| 5,013,649 A | 5/1991 | Wang et al. |
| 5,034,461 A | 7/1991 | Lai et al. |
| 5,047,045 A | 9/1991 | Arney et al. |
| 5,070,215 A | 12/1991 | Bambury et al. |
| 5,180,375 A | 1/1993 | Feibus |
| 5,204,060 A | 4/1993 | Allenmark et al. |
| 5,260,000 A | 11/1993 | Nandu et al. |
| 5,271,876 A | 12/1993 | Ibar |
| 5,310,779 A | 5/1994 | Lai |
| 5,358,995 A | 10/1994 | Lai et al. |
| 5,387,662 A | 2/1995 | Kunzler et al. |
| 5,449,729 A | 9/1995 | Lai |
| 5,453,467 A | 9/1995 | Bamford et al. |
| 5,512,205 A | 4/1996 | Lai |
| 5,554,139 A | 9/1996 | Okajima |
| 5,610,252 A | 3/1997 | Bambury et al. |
| 5,648,442 A | 7/1997 | Bowers et al. |
| 5,661,007 A | 8/1997 | Wozney et al. |
| 5,688,678 A | 11/1997 | Hewick et al. |

(Continued)

FOREIGN PATENT DOCUMENTS

| | | |
|---|---|---|
| DE | 102006004111 | 8/2007 |
| EP | 0354984 | 2/1990 |

(Continued)

OTHER PUBLICATIONS

Bell et al., "Biomedical Membranes from Hydrogels and Interpolymer Complexes", Biopolymers II, 1995, 122, 125-175.

Chang et al., "Highly Protein-Resistant Coatings from Well-Defined Diblock Copolymers Containing Sulfobetaines", Langmuir, 2006, 22, 2222-2226.

Chapman et al., "Polymeric Thin Films that Resist the Adsorption of Proteins and the Adhesion of Bacteria", Langmuir, 2001, 17(4), 1225-1233.

Chen et al., "Controlling Antibody Orientation on Charged Self-Assembled Monolayers", Langmuir, 2003, 19, 2859-2864.

Chen et al., "Strong Resistance of Oligo(phosphorylcholine) Self-Assembled Monolayers to Protein Adsorption", Langmuir, 2006, 22, 2418-2421.

(Continued)

*Primary Examiner* — Ling Choi
*Assistant Examiner* — Jessica E Whiteley
(74) *Attorney, Agent, or Firm* — Baker and Hostetler LLP

(57) ABSTRACT

Medical devices having a wettable, biocompatible surface are described herein. Processes for producing such devices are also described.

17 Claims, 2 Drawing Sheets

(56) References Cited

U.S. PATENT DOCUMENTS

| | | | |
|---|---|---|---|
| 5,708,094 A | 1/1998 | Lai et al. |
| 5,710,302 A | 1/1998 | Kunzler et al. |
| 5,714,557 A | 2/1998 | Kunzler et al. |
| 5,739,236 A | 4/1998 | Bowers et al. |
| 5,760,100 A | 6/1998 | Nicolson et al. |
| 5,776,999 A | 7/1998 | Nicolson et al. |
| 5,783,650 A | 7/1998 | Bowers et al. |
| 5,789,461 A | 8/1998 | Nicolson et al. |
| 5,843,346 A | 12/1998 | Morrill |
| 5,844,016 A | 12/1998 | Sawhney et al. |
| 5,849,811 A | 12/1998 | Nicolson et al. |
| 5,866,113 A | 2/1999 | Hendriks et al. |
| 5,894,002 A | 4/1999 | Boneberger et al. |
| 5,908,906 A | 6/1999 | Kunzler et al. |
| 5,919,523 A | 7/1999 | Sundberg et al. |
| 5,965,631 A | 10/1999 | Nicolson et al. |
| 5,997,895 A | 12/1999 | Narotam et al. |
| 5,998,498 A | 12/1999 | Vanderlaan et al. |
| 6,039,913 A | 3/2000 | Hirt et al. |
| 6,054,504 A | 4/2000 | Dalla Riva Toma |
| 6,087,415 A | 7/2000 | Vanderlaan et al. |
| 6,120,536 A | 9/2000 | Ding et al. |
| 6,150,459 A | 11/2000 | Mayes et al. |
| 6,177,406 B1 | 1/2001 | Wang et al. |
| 6,200,338 B1 | 3/2001 | Solomon et al. |
| 6,200,626 B1 | 3/2001 | Grobe, III et al. |
| 6,251,964 B1 | 6/2001 | Porssa et al. |
| 6,284,854 B1 | 9/2001 | Bowers et al. |
| 6,346,594 B1 | 2/2002 | Watanabe et al. |
| 6,358,557 B1 | 3/2002 | Wang et al. |
| 6,361,768 B1 | 3/2002 | Galleguillos et al. |
| 6,387,997 B1 | 5/2002 | Grolemund et al. |
| 6,395,800 B1 | 5/2002 | Jones et al. |
| 6,432,919 B1 | 8/2002 | Wang et al. |
| 6,486,333 B1 | 11/2002 | Murayama et al. |
| 6,489,382 B1 | 12/2002 | Giesecke et al. |
| 6,533,415 B2 * | 3/2003 | Watanabe ............... 351/159.33 |
| 6,534,268 B1 | 3/2003 | Kawai et al. |
| 6,558,734 B2 | 5/2003 | Koulik et al. |
| 6,559,242 B1 | 5/2003 | Ball et al. |
| 6,589,665 B2 | 7/2003 | Chabrecek et al. |
| 6,627,124 B1 | 9/2003 | Herbrechtsmeier et al. |
| 6,656,214 B1 | 12/2003 | Fogarty et al. |
| 6,711,879 B2 | 3/2004 | Korteweg et al. |
| 6,800,225 B1 | 10/2004 | Hagmann et al. |
| 6,844,028 B2 | 1/2005 | Mao et al. |
| 6,897,263 B2 | 5/2005 | Hell et al. |
| 7,067,194 B2 | 6/2006 | Mao et al. |
| 7,087,658 B2 | 8/2006 | Swan et al. |
| 7,091,283 B2 | 8/2006 | Muller et al. |
| 7,220,491 B2 | 5/2007 | Rouns et al. |
| 7,238,364 B2 | 7/2007 | Sawhney et al. |
| 7,238,426 B2 | 7/2007 | Jiang et al. |
| 7,276,286 B2 | 10/2007 | Chapman et al. |
| 7,291,427 B2 | 11/2007 | Kawamura et al. |
| 7,300,990 B2 | 11/2007 | Lewis et al. |
| 7,306,625 B1 | 12/2007 | Stratford et al. |
| 7,335,248 B2 | 2/2008 | Abou-Nemeh |
| 7,384,590 B2 | 6/2008 | Kelly et al. |
| 7,431,888 B2 | 10/2008 | Frechet et al. |
| 7,629,029 B2 | 12/2009 | Mao et al. |
| 7,632,389 B2 | 12/2009 | Wen et al. |
| 7,737,224 B2 | 6/2010 | Willis et al. |
| 7,879,444 B2 | 2/2011 | Jiang et al. |
| 7,919,136 B2 * | 4/2011 | Linhardt et al. ............... 427/2.1 |
| 8,044,112 B2 | 10/2011 | Matsuzawa |
| 8,308,699 B2 | 11/2012 | Zhang et al. |
| 8,574,660 B2 | 11/2013 | Weaver et al. |
| 8,632,838 B2 | 1/2014 | Roth et al. |
| 2001/0050749 A1 | 12/2001 | Watanabe |
| 2002/0052448 A1 | 5/2002 | Wang et al. |
| 2003/0017464 A1 | 1/2003 | Pohl |
| 2003/0021823 A1 | 1/2003 | Landers et al. |
| 2003/0125409 A1 | 7/2003 | Lai |
| 2003/0143335 A1 | 7/2003 | Qiu et al. |
| 2003/0185870 A1 | 10/2003 | Grinstaff et al. |
| 2004/0126409 A1 | 7/2004 | Willcox et al. |
| 2004/0253383 A1 | 12/2004 | Belik et al. |
| 2004/0256232 A1 | 12/2004 | Jiang et al. |
| 2005/0058689 A1 | 3/2005 | McDaniel |
| 2005/0079365 A1 | 4/2005 | Widenhouse et al. |
| 2005/0237480 A1 | 10/2005 | Allbritton et al. |
| 2005/0287111 A1 | 12/2005 | Schlenoff et al. |
| 2006/0004165 A1 | 1/2006 | Phelan et al. |
| 2006/0057180 A1 | 3/2006 | Chilkoti et al. |
| 2006/0183863 A1 | 8/2006 | Huang et al. |
| 2006/0217285 A1 | 9/2006 | Destarac |
| 2007/0048249 A1 | 3/2007 | Youngblood et al. |
| 2007/0104891 A1 | 5/2007 | Fournand |
| 2007/0111258 A1 | 5/2007 | Kaufman et al. |
| 2007/0178133 A1 | 8/2007 | Rolland |
| 2007/0254006 A1 | 11/2007 | Loose et al. |
| 2008/0015282 A1 | 1/2008 | McCabe et al. |
| 2008/0048350 A1 | 2/2008 | Chen et al. |
| 2008/0172011 A1 | 7/2008 | Heroux et al. |
| 2008/0181861 A1 | 7/2008 | Jiang et al. |
| 2008/0214980 A1 | 9/2008 | Anand |
| 2008/0255305 A1 | 10/2008 | Brook et al. |
| 2008/0262300 A1 | 10/2008 | Ewers et al. |
| 2008/0286332 A1 | 11/2008 | Pacetti |
| 2009/0155335 A1 | 6/2009 | O'Shaughnessey et al. |
| 2009/0157002 A1 | 6/2009 | Dumot et al. |
| 2009/0162662 A1 | 6/2009 | Chang et al. |
| 2009/0163891 A1 | 6/2009 | Ewing et al. |
| 2009/0197791 A1 | 8/2009 | Balastre et al. |
| 2009/0200692 A1 | 8/2009 | Chang |
| 2009/0259015 A1 | 10/2009 | Jiang et al. |
| 2009/0311301 A1 | 12/2009 | Kleiner et al. |
| 2010/0035074 A1 | 2/2010 | Cohen et al. |
| 2010/0048847 A1 | 2/2010 | Broad |
| 2010/0072642 A1 * | 3/2010 | Broad et al. ............... 264/2.6 |
| 2010/0099160 A1 | 4/2010 | Jiang et al. |
| 2010/0152708 A1 | 6/2010 | Li et al. |
| 2010/0174245 A1 | 7/2010 | Li et al. |
| 2010/0249267 A1 | 9/2010 | Jiang et al. |
| 2010/0249273 A1 | 9/2010 | Scales et al. |
| 2010/0298646 A1 | 11/2010 | Stellon |
| 2011/0105712 A1 | 5/2011 | Jiang et al. |
| 2011/0282005 A1 | 11/2011 | Jiang et al. |
| 2011/0305872 A1 | 12/2011 | Li et al. |
| 2011/0305895 A1 | 12/2011 | Roth et al. |
| 2011/0305898 A1 | 12/2011 | Zhang et al. |
| 2013/0155370 A1 | 6/2013 | Zhang et al. |
| 2013/0155371 A1 | 6/2013 | Zhang et al. |
| 2013/0158211 A1 * | 6/2013 | Zhang et al. ............... 525/474 |
| 2013/0158488 A1 | 6/2013 | Weaver et al. |
| 2013/0158517 A1 | 6/2013 | Bouchard et al. |
| 2013/0158518 A1 | 6/2013 | Li et al. |
| 2013/0176529 A1 * | 7/2013 | Li et al. ............... 351/159.33 |
| 2014/0037967 A1 | 2/2014 | Roth et al. |
| 2014/0045398 A1 | 2/2014 | Zhang et al. |

FOREIGN PATENT DOCUMENTS

| | | |
|---|---|---|
| EP | 0406161 | 1/1991 |
| EP | 0419654 | 4/1991 |
| EP | 0479245 | 4/1992 |
| JP | 63/234007 | 9/1988 |
| JP | 08/199094 | 8/1996 |
| JP | 2000/016905 | 1/2000 |
| JP | 2001/337298 | 12/2001 |
| JP | 2007/130194 | 5/2007 |
| SU | 1780673 | 12/1992 |
| WO | WO 94/21698 | 9/1994 |
| WO | WO 95/05408 | 2/1995 |
| WO | WO 96/31792 | 10/1996 |
| WO | WO 00/39176 | 7/2000 |
| WO | WO 03/000433 | 1/2003 |
| WO | WO 2004/058837 | 7/2004 |
| WO | WO 2004/100666 | 11/2004 |
| WO | WO 2007/002493 | 1/2007 |
| WO | WO 2007/024393 | 3/2007 |
| WO | WO 2007/068744 | 6/2007 |
| WO | WO 2007/095393 | 8/2007 |

(56) References Cited

FOREIGN PATENT DOCUMENTS

| | | |
|---|---|---|
| WO | WO 2007/099239 | 9/2007 |
| WO | WO 2008/006911 | 1/2008 |
| WO | WO 2008/019381 | 2/2008 |
| WO | WO 2008/083390 | 7/2008 |
| WO | WO 2009/079664 | 6/2009 |
| WO | WO 2009/085096 | 7/2009 |
| WO | WO 2010/065958 | 6/2010 |
| WO | WO 2010/065960 | 6/2010 |
| WO | WO 2011/084811 | 7/2011 |
| WO | WO 2011/133486 | 10/2011 |
| WO | WO 2011/156589 | 12/2011 |
| WO | WO 2011/156590 | 12/2011 |

OTHER PUBLICATIONS

Chen et al., "Strong Resistance of Phosphorycholine Self-Assembled Monolayers to Protein Adsorption: Insights into Nonfouling Properties of Zwitterionic Materials", J. am. Chem. Soc., 2005, 127, 14473-14478.

Cheng et al, "Inhibition of Bacterial Adhesion and Biofilm Formation on Zwitterionic Surfaces", Biomaterials, 2007, 28, 4192-4199.

Cheng et al., "Thickness-Dependent Properties of Polyzwitterionic Brushes", Macromolecules, 2008, 41, 6317-6321.

Cheng et al., "Zwitterionic Carboxybetaine Polymer Surfaces and their Resistance to Long-Term Biofilm Formation", Biomaterials, 2009, 30, 5234-5240.

Du et al., "Grafted Poly-(ethylene glycol) on Lipid Surfaces Inhibits Protein Adsorption and Cell Adhesion", Biochimica et Biophysica Acta, 1997, 1326, 236-248.

Feng et al., "Adsorption of Fibrinogen and Lysozyme on Silicon Grafted with Poly(2-methacryloyloxyethyl Phosphorylcholine) via Surface-Initiated Atom Transfer Radical Polymerization", Langmuir, 2005, 21, 5980-5987.

Feng et al., "Atom-Transfer Radical Grafting Polymerization of 2-Methacryloyloxyethyl Phosphorylcholine from Silicon Wafer Surfaces", Wiley, InterScience, 2004, 2931-2942.

Fujimoto et al., "Ozone-Induced Graft Polymerization onto Polymer Surface", Journal of Polymer Science, 1993, 31, 1035-1043.

Goda et al., "Biomimetic Phosphorylcholine Polymer Grafting from Polydimethylsiloxane Surface Using Photo-Induced Polymerization", Biomaterials, 2006, 27, 5151-5160.

Harder et al., "Molecular Conformation in Oligo(ethylene glycol)-Terminated Self-Assembled Monolayers on Gold and Silver Surfaces Determines Their Ability to Resist Protein Adsorption", J. Phys. Chem. B., 1998, 102, 426-436.

Haynie et al., "Antimicrobial Activities of Amphipilic Peptides Covalently Bonded to a Water-Insoluble Resin", Antimicrobial Agents and Chemotherapy, 1995, 39(2), 301-307.

Ignatova et al., "Combination of Electrografting and Atom-Transfer Radical Polymerization for Making the Stainless Steel Surface Antibacterial and Protein Antiadhesive", Langmuir, 2005-2006, 22, 255-262.

Ishihara et al., "Photoinduced Graft Polymerization of 2-Methacryloyloxyethyl Phosphorylcholine on Polyethylene Membrane Surface for Obtaining Blood Cell Adhesion Resistance", Colloids and Surfaces B: Biointerfaces, 2000, 18, 325-335.

Ishihara et al., "Protein Adsorption from Human Plasma is Reduced on Phopholipid Polymers", J. Biomed. Mater. Res., 1991, 25(11), 1397-1407.

Jiang et al., "Blood Compatibility of Polyurethane Surface Grafted Copolymerization with Sulfobetaine Monomer", Colloids and Surfaces B: Biointerfaces, 2004, 36, 27-33.

Jiang, "Zwitterionic Separation Materials for Liquid Chromatography and Capillary Electrophoresis Synthesis, Characterization and Application for Inorganic Ion and Biomolecule Separations", PhD Dissertation, Umea University, Umea, Sweden, 2003, 63 pages.

Jin et al., "Protein-Resistant Polyurethane Prepared by Surface-Initiated Atom Transfer Radical Graft Polymerization (ATRgP) of Water-Soluble Polymers: Effects of Main Chain and Side Chain Lengths of Grafts", Colloids and Surfaces B: Biointerfaces, 2009, 70, 53-59.

Jin et al., "Protein-Resistant Polyurethane via Surface-Initiated Atom Transfer Radical Polymerization of Oligo(ethylene glycol) Methacrylate", Wiley Periodicals, Inc., 2009, 1189-1201.

Jun et al., "Surface Modification of Segmented Poly( ether urethane) by Grafting Sulfo Ammonium Zwitterionic Monomer to Improve Hemocompatibilities", Colloids and Surfaces B: Biointerfaces, 2003, 28, 1-9.

Kang e al., "Surface Modification and Functionalization of Electroactive Polymer Films via Grafting of Polyelectrolyte, Polyampholyte and Polymeric Acids", Journal of Materials Science, 1996, 31, 1295-1301.

Kildal et al., "Peroxide-Initiated Grafting of Acrylamide on to Polyethylene Surfaces," J. Appl. Polymer Sci., 1992, 44, 1893-1898.

Lai, "The Role of Bulky Polysiloxanyalkyl Methacrylates in Polyurethane-Polysiloxane Hydrogels", Journal of Applied Polymer Science, 1996, 60, 1193-1199.

Li et al., "Protein Adsorption on Alkanethiolate Self-Assembled Monolayers: Nanoscale Surface Structural and Chemical Effects", Langmuir, 2003, 19, 2974-2982.

Li et al., "Protein Adsorption on Oligo(ethylene glycol)-Terminated Alkanethiolate Self-Assembled Monolayers: The Molecular Basis for Nonfouling Behavior", J. Phys. Chem. B, 2005, 109, 2934-2941.

Liu et al., "Grafting of Zwitterion from Cellulose Membranes via ATRP for Improving Blood Compatibility", Biomacromolecules, 2009, 10, 2809-2816.

Lowe et al., "Well-Defined Sulfobetaine-Based Statistical Copolymers as Potential Antibioadherent Coatings", J. Biomed Mater Res, 2000, 52, 88-94.

Massia et al., "Immobilized RGD Peptides on Surface-Grated Dextran Promote Biospecific Cell Attachment", J. Biomed Mater Res, 2001, 56, 390-399.

Michel et al., "Influence of PEG Architecture on Protein Adsorption and Conformation", Langmuir, 2005, 21, 12327-12332.

Nichols et al., "Tear Film, Contact Lens, and Patient-Related Factors Associated with Contact Lens-Related Dry Eye", Invest Ophthalmol Vis Sci., 2006, 47, 1319-1328.

Odian, "Principles of Polymerization: Polymerization Mechanism, Typesof Polymers and Polymerizations", John Wiley & Sons, Inc., $4^{th}$ Ed., 2004, 3 pages.

Sakharov et al., "Caralytic Oxidative Deformylation of Polyethylene Glycols with the Participation of Molecular Oxygen", Kinetics and Catalysis, 2001, 42(5), 662-668.

Salim et al., "Studies of Electroosmotic Flow and the Effects of Protein Adsorption in Plasmapolymerized Microchannel Surfaces", Electrophoresis 2009, 30, 1877-1887.

Tada et al., "Anti-Biofouling Properties of Polymers with a Carboxybetaine Moiety", Macromolecular Biosciences, 2009, 9, 63-70.

Vermette et al., "Tissue Engineering Intelligence Unit 6: Biomedical Applications of Polyurethanes", (entire book) Eurekah.com, 2001, 284 pages.

Villa-Diaz et al., "Synthetic Polymer Coatings for Long-Term Growth of Human Embryonic Stem Cells", Nature Biotechnology, 2010, 28(6), 581-584.

Wang et al., "Antifouling Ultrafiltration Membrane Composed of Polyethersulfone and Sulfobetaine Copolymer", Journal of Membrane Science, 2006, 280, 343-350.

Wang et al., "Highly Efficient Antifouling Ultrafiltration Membranes Incorporating Zwitterionic Poly( [ 3-( Methacryloylamino )Propyl ]-Dimethyl( 3-Sulfopropyl) Ammonium Hydroxide)", Journal of Membrane Science, 2009, 340, 164-170.

Weinstock et al., "Rapid, Nondestructive Estimation of Surface Polymer Layer Thickness Using Attenuated Total Reflection Fourier Transform Infrared (ATR FT-IR) Spectroscopy and Synthetic Spectra Derived from Optical Principles", Applied Spectroscopy, 2012, 66(11), 1311-1319.

West et al., "The Biocompatibility of Crosslinkable Copolymer Coatings Containing Sulfobetaines and Phosphobetaines", Biomaterials, 2004, 25, 1195-1204.

Wozney et al., "Novel Regulators of Bone Formation: Molecular Clones and Activities", Science, Research Articles, 1988, 242, 1528-1534.

(56) References Cited

OTHER PUBLICATIONS

Yuan et al., "Chemical Graft Polymerization of Sulfobetaine Monomer on Polyurethane Surface for Reduction in Platelet Adhesion", Colloids and Surfaces B: Biointerfaces, 2004, 39, 87-94.

Yuan et al., "Grafting Sulfobetaine Monomer onto the Segmented Poly(Ether-Urethane) Surface to Improve Hemocompatibility", J. Biomater. Sci. Polymer Edn, 2002, 13(10), 1081-1092.

Yuan et al., "Improvement of Blood Compatibility on Cellulose Membrane Surface by Grafting Betaines", Colloids and Surfaces B: Biointerfaces, 2003, 30, 147-155.

Yuan et al., "Platelet Adhesion onto Segmented Polyurethane Surfaces Modified by Carboxybetaine", J. Biomater. Sci. Polymer Edn, 2003, 14(12), 1339-1349.

Yuan et al., "Polyurethane Vascular Catheter Surface Grafted with Zwitterionic Sulfobetaine Tnonomer Activated by Ozone", Colloids and Surfuces B: Biointetfaces, 2004, 35, 1-5.

Yuan et al., "Surface Modification of SPEU Films by Ozone Induced Graft Copolymerization to Improve Hemocompatibility", Colloids and Surfaces B: Biointerfaces, 2003, 29, 247-256.

Yuan et al., "Grafting Sulfobetaine Monomer Onto Silicone Surface to Improve Hemocompatability", Polymer International, Jan. 2004, 53(1), 121-126.

Zhang et al., "Blood Compatibility of Surfaces with Superflow Protein Adsorption", Biomaterials, 2008, 29, 4285-4291.

Zhang et al., "Chemical Modification of Cellulose Membranes with Sulfo Ammonium Zwitterionic Vinyl Monomer to Improve Hemocompatibility", Colloids and Surfaces B: Biointerfaces, 2003, 30, 249-257.

Zhang et al., "Nonfouling Behavior of Polycarboxybetaine-Grafted Surfaces: Structural and Environmental Effects," Biomacromolecules, 2008, 9, 2686-2692.

Zhang et al., "Superlow Fouling Sulfobetaine and Carboxybetaine Polymers on Glass Slides", Langmuir, 2006, 22(24), 10072-10077.

Zhang et al., "Surface Grafted Sulfobetaine Polymers via Atom Transfer Radical Polymerization as Superlow Fouling Coatings", J. Phys. Chemistry B, 2006, 110, 10799-10804.

Zhang et al., "The Hydrolysis of Cationic Polycarboxybetaine Esters to Zwitterionic Polycarboxybetaines with Controlled Properties", Biomaterials, 2008, 29, 4719-4725.

Zheng et al., "Molecular Simulation Study of Water Interactions with Oligo (Ethylene Glycol)-Terminated Alkanethiol Self-Assembled Monolayers", Langmuir, 2004, 20, 8931-8938.

Zheng et al., "Strong Repulsive Forces between Protein and Oligo (Ethylene Glycol) Self-Assembled Monolayers: A Molecular Simulation Study", Biophysical Journal, 2005, 89, 158-166.

Zhou et al., "Platelet Adhesion and Protein Adsorption on Silicone Rubber Surface by Ozone-Induced Grafted Polymerization With Carboxybetaine Monomer", Colloids and Surfaces B: Biointerfaces, 2005, 41, 55-62.

* cited by examiner

MULTISTEP UV PROCESS TO CREATE SURFACE MODIFIED CONTACT LENSES

FIELD OF THE DISCLOSURE

The present invention generally relates to medical devices, particularly contact lenses, having a wettable, biocompatible surface and methods of producing such devices.

BACKGROUND

Siloxanes are commonly included in contact lenses to improve their oxygen permeability. However, the inclusion of siloxanes can have a detrimental effect on the wettability or hydrophilicity of the lens. One suitable approach to overcome this issue is to coat or modify the contact lens surface, preferably with a biocompatible material.

Oxygen permeability of hydrophilic contact lens formulations can be improved, for example, by adding various silicon- and fluorine-containing hydrophobic monomers. Such modifications, however, may come at the expense of lens wettability and biocompatibility; for instance, materials exhibiting high gas permeabilities due to the inclusion of high levels of silicon or other strongly hydrophobic monomers frequently exhibit reduced wetting characteristics. This can lead to various problems ranging from poor lens movement on the eye, increased fouling due to lipid, protein, and/or biomolecule adherence to the lens surface, and adhesion of the lens to the eye. These and other issues can be remedied by providing a surface modification that makes the lens surface considerably more wettable.

Various techniques for improving the hydrophilicity of contact lenses have been disclosed, many of which involve a plasma treatment step. It would be desirable to have a surface modification process that did not require a separate plasma unit operation, as these techniques can be highly variable, costly, and inconvenient.

In general, various surface properties of materials, such as bioactivity, chemical reactivity, gas permeability, and wettability, can be improved by polymeric surface modifications. Other desirable features that can be enhanced or improved by surface modifications include adhesion, biocompatibility, liquid or stain resistance, lubricity, protein resistance, anti-reflective behavior, selective binding of biomolecules, and wear resistance. Although some methods of surface modification of polymers are known, it would be useful to provide improved surface modifications and processes for preparing the same.

SUMMARY OF THE DISCLOSURE

Among the various aspects of the present disclosure is the provision of a process for modifying the surface of a silicon-containing polymer.

Briefly, therefore, the present disclosure is directed to a process for modifying the surface of a silicon-containing polymer, the process comprising the steps of: forming a silicon-containing polymer having a body in a first polymerization reaction mixture, the first polymerization reaction mixture comprising a photo-initiator whereby the photo-initiator initiates the polymerization and/or crosslinking of the silicon-containing polymer; forming a second polymerization reaction mixture comprising the silicon-containing polymer, a polymerization monomer, a free radical initiator system and a solvent system, the polymerization monomer comprising a zwitterionic monomer, wherein no more than 25% of the photo-initiator that initiated the reaction forming the silicon-containing polymer body is removed from the silicon-containing polymer before the silicon-containing polymer body is combined with the solvent system of the second polymerization reaction mixture; and polymerizing the monomer in the second polymerization reaction mixture to form a surface modification on the surface of the silicon-containing polymer.

Another aspect of the disclosure is directed to process for modifying the surface of a silicon-containing polymer, the process comprising the steps of: forming a silicon-containing polymer having a body in a first polymerization reaction mixture, the first polymerization reaction mixture comprising a photo-initiator whereby the photo-initiator initiates the polymerization and/or crosslinking of the silicon-containing polymer; forming a second polymerization reaction mixture comprising the silicon-containing polymer, a polymerization monomer, a free radical initiator system and a solvent system, the polymerization monomer comprising a zwitterionic monomer, wherein no additional photo-initiator is added to the silicon-containing polymer before the silicon-containing polymer body is combined with the solvent system of the second polymerization reaction mixture; and polymerizing the monomer in the second polymerization reaction mixture to form a surface modification on the surface of the silicon-containing polymer.

Yet another aspect of the disclosure is directed to a process for modifying the surface of a silicon-containing polymer, the process comprising the steps of: forming a silicon-containing polymer having a body in a first polymerization reaction mixture, the first polymerization reaction mixture comprising a photo-initiator whereby the photo-initiator initiates the polymerization and/or crosslinking of the silicon-containing polymer; forming a second polymerization reaction mixture comprising the silicon-containing polymer, a polymerization monomer, a free radical initiator system and a solvent system, the polymerization monomer comprising a zwitterionic monomer, wherein a residual amount of the photo-initiator per body that initiated the reaction forming the silicon-containing polymer body is present in the silicon-containing polymer when the silicon-containing polymer body is combined with the solvent system of the second polymerization reaction mixture; and polymerizing the monomer in the second polymerization reaction mixture to form a surface modification on the surface of the silicon-containing polymer.

Yet another aspect of the disclosure is directed to a process for modifying the surface of a silicon-containing polymer, the process comprising the steps of: forming a silicon-containing polymer having a body in a first polymerization reaction mixture, the first polymerization reaction mixture comprising two or more unique photo-initiators whereby a first photo-initiator initiates the polymerization and/or crosslinking of the silicon-containing polymer; forming a second polymerization reaction mixture comprising the silicon-containing polymer, a polymerization monomer, a free radical initiator system and a solvent system, the polymerization monomer comprising a zwitterionic monomer, wherein a second photo-initiator is present in the silicon-containing polymer when the silicon-containing polymer body is combined with the solvent system of the second polymerization reaction mixture; and polymerizing the monomer in the second polymerization reaction mixture to form a surface modification on the surface of the silicon-containing polymer.

Yet another aspect of the disclosure is directed to an article formed by the processes described herein. In one embodiment, the article is a contact lens.

Other objects and features will be in part apparent and in part pointed out hereinafter.

ABBREVIATIONS AND DEFINITIONS

Figure 1:
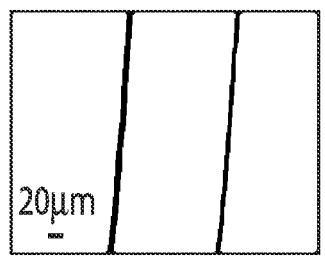
FIGS. 1-3 are images depicting various contact lenses stained with eosin and analyzed with EDS to show the boundaries for the region containing a surface modification as described in Example 9.

The following definitions and methods are provided to better define the present disclosure and to guide those of ordinary skill in the art in the practice of the subject matter of the present disclosure. Unless otherwise noted, terms are to be understood according to conventional usage by those of ordinary skill in the relevant art.

When introducing elements of the present invention or the preferred embodiment(s) thereof, the articles "a," "an," "the" and "said" are intended to mean that there are one or more of the elements. The terms "comprising," "including" and "having" are intended to be inclusive and mean that there may be additional elements other than the listed elements.

Aliphatic: unless otherwise indicated, "aliphatic" or "aliphatic group" means an optionally substituted, non-aromatic hydrocarbon moiety. The moiety may be, for example, linear, branched, or cyclic (e.g., mono or polycyclic such as fused, bridging, or spiro-fused polycyclic), or a combination thereof. Unless otherwise specified, aliphatic groups contain 1-20 carbon atoms.

Alkyl: unless otherwise indicated, the alkyl groups described herein are preferably lower alkyl containing from one to eight carbon atoms in the principal chain and up to 20 carbon atoms. They may be linear, branched or cyclic and include methyl, ethyl, propyl, butyl, hexyl and the like.

Amino: unless otherwise indicated, the term "amino" as used herein alone or as part of another group denotes the moiety —$NR^1R^2$ wherein $R^1$, and $R^2$ are independently hydrogen, hydrocarbyl, substituted hydrocarbyl or heterocyclo.

Ammonium: unless otherwise indicated, the term "ammonium" as used herein alone or as part of another group denotes the moiety —$N^+R^1R^2R^3$ wherein $R^1$, $R^2$ and $R^3$ are independently hydrogen, hydrocarbyl, substituted hydrocarbyl or heterocyclo.

Amide or Amido: unless otherwise indicated, the "amide" or "amido" moieties represent a group of the formula —$CONR^1R^2$ wherein $R^1$ and $R^2$ are as defined in connection with the term "amino." "Substituted amide," for example, refers to a group of the formula —$CONR^1R^2$ wherein at least one of $R^1$ and $R^2$ are other than hydrogen. "Unsubstituted amido," for example, refers to a group of the formula —$CONR^1R^2$, wherein $R^1$ and $R^2$ are each hydrogen.

Anionic Monomer, Anionic Monomeric Unit or Anionic Repeat Unit: unless otherwise indicated, an "anionic monomer," "anionic monomeric unit" or "anionic repeat unit" is a monomer or monomeric unit bearing an anion or other anionic species, e.g., a group that is present in a negatively charged state or in a non-charged state, but in the non-charged state is capable of becoming negatively charged, e.g., upon removal of an electrophile (e.g., a proton (H+), for example in a pH dependent manner) or a protecting group (e.g., a carboxylic acid ester), or the addition of a nucleophile. In certain instances, the group is substantially negatively charged at an approximately physiological pH but undergoes protonation and becomes substantially neutral at a weakly acidic pH. The non-limiting examples of such groups include carboxyl groups, barbituric acid and derivatives thereof, xanthine and derivatives thereof, boronic acids, phosphinic acids, phosphonic acids, sulfinic acids, sulfonic acids, phosphates, and sulfonamides.

Anionic species or Anionic moiety: unless otherwise indicated, an "Anionic species" or an "Anionic moiety" is a group, residue or molecule that is present in a negatively charged or non-charged state, but in the non-charged state is capable of becoming negatively charged, e.g., upon removal of an electrophile (e.g., a proton (H+), for example in a pH dependent manner) or other protecting group (e.g., a carboxylic acid ester), or the addition of a nucleophile. In certain instances, the group, residue or molecule is substantially negatively charged at an approximately physiological pH but undergoes protonation and becomes substantially neutral at a weakly acidic pH.

Antimicrobial: unless otherwise indicated, "antimicrobial" refers to molecules and/or compositions that kill (i.e., microbicidal), inhibit the growth of (i.e., microbistatic), and/or prevent fouling by, microorganisms including bacteria, yeast, fungi, mycoplasma, viruses or virus infected cells, and/or protozoa. Antimicrobial activity with respect to bacteria may be quantified, for example, using a standard assay. In one such assay, samples may be pre-incubated with 50% fetal bovine serum for 18-20 hours at 120 RPM at 37° C. Following pre-incubation, samples are placed in *Staphylococcus aureus* (*S. aureus*, ATCC 25923) which has been diluted from an overnight culture to a planktonic concentration of $1-3 \times 10^5$ CFU/mL in 1% tryptone soy broth (TSB) diluted in 1×PBS or other suitable media. Samples are incubated with bacteria for 24-26 hrs with agitation (120 rpm) at 37° C. The concentration of TSB or other media can vary with the organism being used. After incubation, the samples are placed in 3 mL PBS for 5 min at 240 RPM at 37° C. to remove bacteria not tightly attached to the material. Then, accumulated bacteria on materials are removed by sonication in a new solution of PBS and the total number of bacterial cells is quantified through dilution plating. Preferably at least a 1, 2, 3 or 4 log reduction in bacterial count occurs relative to colonization on a reference substrate, that is, the same or an otherwise functionally equivalent substrate lacking the non-fouling polymer layer. A surface that has a lower bacterial count on it than the reference substrate may be said to reduce microbial colonization.

Aryl: unless otherwise indicated, the term "aryl" or "aryl group" refers to optionally substituted monocyclic, bicyclic, and tricyclic ring systems having a total of five to fourteen ring members, wherein at least one ring in the system is aromatic and wherein each ring in the system contains three to seven ring members. The terms "aryl" or "ar" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

Attached: unless otherwise indicated, two moieties or compounds are "attached" if they are held together by any interaction including, by way of example, one or more covalent bonds, one or more non-covalent interactions (e.g., hydrogen bonds, ionic bonds, static forces, van der Waals interactions, combinations thereof, or the like), or a combination thereof.

Biocompatibility: unless otherwise indicated, "biocompatibility" is the ability of a material to perform with an appropriate host response in a specific situation. This can be evaluated using International Standard ISO 10993. Biocompatible compositions described herein are preferably substantially non-toxic.

Block Copolymer: unless otherwise indicated, a "block copolymer" comprises two or more homopolymer or copolymer subunits linked by covalent bonds. Block copolymers with two or three distinct blocks are called diblock copolymers and triblock copolymers, respectively. A schematic generalization of a diblock copolymer is represented by the formula $[A_aB_bC_c \ldots]_m\text{-}[X_xY_yZ_z \ldots]_n$, wherein each letter stands for a constitutional or monomeric unit, and wherein each subscript to a constitutional unit represents the mole fraction of that unit in the particular block, the three dots indicate that there may be more (there may also be fewer) constitutional units in each block and m and n indicate the molecular weight of each block in the diblock copolymer. As suggested by the schematic, in some instances, the number and the nature of each constitutional unit is separately controlled for each block. The schematic is not meant and should not be construed to infer any relationship whatsoever between the number of constitutional units or the number of different types of constitutional units in each of the blocks. Nor is the schematic meant to describe any particular number or arrangement of the constitutional units within a particular block. In each block the constitutional units may be disposed in a purely random, an alternating random, a regular alternating, a regular block or a random block configuration unless expressly stated to be otherwise. A purely random configuration, for example, may have the non-limiting form: X-X-Y-Z-X-Y-Y-Z-Y-Z-Z . . . . A non-limiting, exemplary alternating random configuration may have the non-limiting form: X-Y-X-Z-Y-X-Y-Z-Y-X-Z . . . , and an exemplary regular alternating configuration may have the non-limiting form: X-Y-Z-X-Y-Z-X-Y-Z . . . . An exemplary regular block configuration may have the following non-limiting configuration: . . . X-X-X-Y-Y-Y-Z-Z-Z-X-X-X . . . , while an exemplary random block configuration may have the non-limiting configuration: . . . X-X-X-Z-Z-X-X-Y-Y-Y-Y-Z-Z-Z-X-X-Z-Z-Z- . . . . In a gradient polymer, the content of one or more monomeric units increases or decreases in a gradient manner from the a end of the polymer to the ω end. In none of the preceding generic examples is the particular juxtaposition of individual constitutional units or blocks or the number of constitutional units in a block or the number of blocks meant nor should they be construed as in any manner bearing on or limiting the actual structure of block copolymers forming a micelle described herein. As used herein, the brackets enclosing the constitutional units are not meant and are not to be construed to mean that the constitutional units themselves form blocks. That is, the constitutional units within the square brackets may combine in any manner with the other constitutional units within the block, i.e., purely random, alternating random, regular alternating, regular block or random block configurations. The block copolymers described herein are, optionally, alternate, gradient or random block copolymers. In some embodiments, the block copolymers are dendrimer, star or graft copolymers.

Branched: unless otherwise indicated, "branched" refers to a polymer structure in which a polymer chain divides into two or more polymer chains.

Brushes/Polymer Brushes: unless otherwise indicated, "brushes" or "polymer brushes" are used herein synonymously and refer to polymer chains that are bound to a surface generally through a single point of attachment using graft-from techniques. The polymers can be end-grafted (attached via a terminal group) or attached via a side chain or a position in the polymer chain other than a terminal position. The polymers can be linear or branched. For example, the polymer chains described herein can contain a plurality of side chains that contain zwitterionic groups. The side chains can consist of a single non-fouling moiety or monomer and/or a non-fouling oligomer (e.g., 2-10 monomeric residues) or polymer (e.g., >10 monomeric residues).

Carboxyammonium: unless otherwise indicated, a "carboxyammonium" moiety is a zwitterionic moiety comprising carboxylate and ammonium functionality and includes, for example, carboxyammonium monomers, carboxyammonium oligomers, carboxyammonium polymers, carboxyammonium repeat units, and other carboxyammonium-containing materials. Carboxybetaine monomers, oligomers, polymers, repeat units and other carboxybetaine materials are exemplary carboxyammonium moieties.

Cationic Monomer, Cationic Monomeric Unit or Cationic Repeat Unit: unless otherwise indicated, a "cationic monomer," "cationic monomeric unit" or "cationic repeat unit" is a monomer or a monomeric or repeat unit (the terms "monomeric unit" and "repeat unit" being used interchangeably) bearing a cation or other cationic species, e.g., a moiety capable of having a positive charge upon addition of an electrophile (e.g., a proton (H+) or an alkyl cation, for example in a pH dependent manner) or removal of a protecting group or a nucleophile).

Cationic species or Cationic Moiety: unless otherwise indicated, a "Cationic species" or a "Cationic Moiety" is a group, residue or molecule that is present in a positively charged or non-charged state, but in the non charged state is capable of becoming positively charged, e.g., upon addition of an electrophile (e.g., a proton (H+), for example in a pH dependent manner) or removal of a protecting group or a nucleophile. In certain instances, the group, residue or molecule is permanently charged, e.g., comprises a quaternary nitrogen atom.

Clarity: unless otherwise indicated, "clarity" refers to the ability of light to pass through a material as measured by either a UV-vis instrumental technique and/or by visual inspection using a magnified optical comparator tool by a trained operator. Either opacity of the bulk material, which prevents the transmission of light, or surface irregularities, which scatter light, may contribute to the overall clarity of a material. For example, using a magnified optical comparator tool, materials may be assigned a clarity score 1-5 as follows: 1=>90% (of surface area inspected) opaque; 2=>50% (of surface area inspected) opaque; 3=>90% (of surface area inspected) transparent, some surface irregularities; 4=>99% (of surface area inspected) transparent, few surface irregularities observed; 5=100% transparent, no surface irregularities observed.

Coating: unless otherwise indicated, "coating" refers to any temporary, semi-permanent or permanent layer, or layers, treating or covering a surface. The coating may be a chemical modification of the underlying substrate or may involve the addition of new materials to the surface of the substrate. It includes any increase in thickness to the substrate or change in surface chemical composition of the substrate.

Contact Angle: unless otherwise indicated, the Contact Angle is a quantitative measure of the wetting of a solid by a liquid. It is defined geometrically as the angle formed by a liquid at the three phase boundary where a liquid, gas and solid intersect. If the three phase (liquid/solid/vapor) boundary is in motion, the angles produced are called Dynamic Contact Angles and are referred to as 'advancing' and 'receding' angles. Dynamic contact angles may be assayed at various rates of speed. Advancing angles are measured when the liquid phase is expanding. Receding angles are measured when the liquid phase is contracting. For an underwater measurement using an air bubble, the advancing angle occurs when the air bubble is contracting and the receding angle is measured when the air bubble is expanding. Unless otherwise indicated, "Advancing Contact Angle," as used herein, will refer to the initial angle measured after contracting an air bubble underwater (or appropriate buffer or simulated tear solution) that is in contact with the surface being examined at 1 ul/s to the point that the base length of the air bubble is no longer decreasing, but the air bubble begins to deform in shape. Unless otherwise indicated, "Receding Contact Angle, as used herein, will refer to the initial angle measured when an underwater air bubble that has been equilibrated for 3 seconds with the surface being examined is enlarged at 1 ul/s and the base length is observed to increase. The base length will change without substantially changing the air/solid/liquid interfacial angle as the air bubble is enlarged.

Contact Lens: unless otherwise indicated, a "contact lens" or "lens" refers to a structure that can be placed on or within a wearer's eye. A contact lens can correct, improve, or alter a user's eyesight, but that need not be the case. For example, the contact lens may additionally or alternatively provide optical correction, wound care, drug delivery, diagnostic functionality, cosmetic alterations or enhancement, or combinations thereof. A lens or contact lens can be of any appropriate material known in the art or later developed, and can be a soft lens (e.g., soft, hydrogel lens, soft, non-hydrogel lens and the like), a hard lens (e.g., hard, gas permeable lens materials and the like), a hybrid lens, intraocular lenses, overlay lenses, ocular inserts, optical inserts, and the like. As is understood by one skilled in the art, a lens is considered to be "soft" if it can be folded back upon itself without breaking. Any material known to produce a biomedical device including an ophthalmic device can be used herein. A "silicone hydrogel contact lens" refers to a contact lens comprising a silicone hydrogel material (including silicones, silicone derivatives such as fluorosilicones and their copolymers).

Copolymer: unless otherwise indicated, "copolymer" refers to a polymer derived from two, three or more monomeric species and includes alternating copolymers, periodic copolymers, random copolymers, statistical copolymers and block copolymers.

Degradation Products: unless otherwise indicated, "degradation products" are atoms, radicals, cations, anions, or molecules other than water formed as the result of hydrolytic, oxidative, enzymatic, or other chemical processes.

Dry Thickness: unless otherwise indicated, "Dry Thickness," as used herein in connection with a polymer layer, shall mean the thickness of the polymer layer using a scanning electron microscope (SEM). To measure dry thickness, the sample is dehydrated overnight, then freeze fractured for imaging by being submerged in liquid nitrogen then cracked with an ultra microtome blade. The freeze fracturing should break the article at a plane approximately orthogonal to the polymer modified surface in order to measure the thickness of the polymer layer normal to the substrate. The samples are sputter coated in gold for 90 seconds using a sputter coater and then imaged under high vacuum at 5 kV using an SE2 detector under a Field Emission Scanning Electron Microscope (FESEM). Exemplary microtome blades include the Leica Ultracut UCT Ultramicrotome, exemplary sputter coaters include the Cressington 208HR, exemplary SEMS include the Supra55VP FESEM, Zeiss. Dry thickness may be approximated by analyzing intensity of chemical signals in the grafted polymer, for instance, through the use of ATR-FTIR.

Fibrinogen Adsorption Assay: unless otherwise indicated, a "Fibrinogen Adsorption Assay" is an assay used to assess the capacity of a surface for fibrinogen. In the assay, test samples are placed in a suitable sized container, which may be a 96-well manifold, microcentrifuge tube, or other container. The volumes in the following are appropriate for a deep 96-well plate, but may be scaled to properly cover a device being tested. The samples are sterilized in an autoclave and the test groups run with an n per run of 3-4. The sample container is blocked with 20 mg/mL Bovine Serum Albumin (BSA) in 1×PBS for 1 hour at 4° C., followed by three rinses with 1×PBS before samples are added. The sample is exposed to a solution containing 70 µg/mL unlabeled human fibrinogen, 1.4 µg/mL 1-125 radiolabeled human fibrinogen, 35-55 µg/mL BSA in water, optionally tri-sodium citrate, and optionally sodium chloride. The BSA is a common agent co-lyophilized with the radiolabeled fibrinogen. Optionally, the BSA and radiolabeled fibrinogen may have been dissolved from a lyophilized form that contains tri-sodium citrate and sodium chloride. The samples are incubated for one hour at 37° C. on an orbital shaker at 150 RPM. The test solution is then removed and four 1-minute rinses with a 10 mM NaI and one 1-minute rinse with 1×PBS is performed. The samples are loaded into a gamma counter. The counter measures the radioactivity in 1-125 counts per minute for each sample and this data is used to calculate the absolute fibrinogen adsorption or a percent reduction of the non-fouling polymer layer samples versus a reference substrate, that is, the same or an otherwise functionally equivalent substrate lacking the non-fouling polymer layer. The percent reduction is equal to: (1−non-fouling sample CPM/Average CPM of the reference substrate)*100%.

Global Average Dry Thickness: unless otherwise indicated, "Global Average Dry Thickness," as used herein in connection with a polymer layer, shall mean the mean calculated by averaging the Local Average Dry Thickness of at least 3, and preferably at least 5, representative locations spaced approximately evenly across the portion of the article carrying the polymer layer. It is preferred to measure the thickness at representative points across the longest dimension of the portion of the article that is covered with the polymer layer. The standard deviation of the Global Average Dry Thickness is found by calculating the standard deviation of the Local Average Dry Thickness across at least 5, and preferably at least 10, representative locations spaced approximately evenly across the portion of the article carrying the polymer layer.

Global Average Humidified Thickness: unless otherwise indicated, "Global Average Humidified Thickness," as used herein in connection with a polymer layer, shall mean the mean calculated by averaging the Local Average Humidified Thickness of at least 3, and preferably at least 5, representative locations spaced approximately evenly across the portion of the article carrying the polymer layer. It is preferred to measure the thickness at representative points across the longest dimension of the portion of the article that is covered with the polymer layer. The standard deviation of the Global Average Humidified Thickness is found by calculating the standard deviation of the Local Average Humidified Thickness across at least 5, and preferably at least 10, representative locations spaced approximately evenly across the portion of the article carrying the polymer layer.

Global Average $R_{rms}$ Surface Roughness: unless otherwise indicated, "Global Average $R_{rms}$ Surface Roughness," as used herein in connection with a polymer layer, shall mean the mean calculated by averaging the $R_{rms}$ surface roughness of at least 5, and preferably at least 10, representative locations spaced approximately evenly across the portion of the article carrying the polymer layer. It is preferred to measure the thickness at representative points across the longest dimension of the portion of the article that is covered with the polymer layer. The standard deviation of the Global Average $R_{rms}$ Surface Roughness is found by calculating the standard deviation of the Local Average $R_{rms}$ Surface Roughness across at least 5, and preferably at least 10, representative locations spaced approximately evenly across the portion of the article carrying the polymer layer.

Graft: unless otherwise indicated, the term "graft," as used herein in connection with a polymer, means the modification of the surface of a material with a polymer by a "graft-from", "graft-through", or a "graft-to" approach, or a combination thereof to form a grafted polymer.

Graft-from method: unless otherwise indicated, the term "graft-from," as used herein in connection with a method for the modification of a material with a polymer, shall mean the in situ polymerization and growth of a polymer at the surface of, or within a material.

Graft-from polymer: unless otherwise indicated, the term "graft-from polymer," as used herein, shall mean a polymer formed by a graft-from method.

Graft-through method: unless otherwise indicated, the term "graft-through," as used herein in connection with a method for the modification of a material with a polymer, shall mean the in situ polymerization of monomers in the neighborhood of the material that may polymerize through functional groups presented from the material surface. For example, the material may have vinyl groups presented from the surface through which polymerization occurs.

Graft-through polymer: unless otherwise indicated, the term "graft-through polymer," as used herein, shall mean a polymer formed by a graft-through method.

Graft-to method: unless otherwise indicated, the term "graft-to," as used herein in connection with a method for the modification of a material with a polymer shall mean the modification of the surface of a material with a presynthesized polymer Graft-to polymer: unless otherwise indicated, the term "graft-to polymer," as used herein, shall mean a grafted polymer formed by a graft-to method.

Heteroaryl: unless otherwise indicated, the term "heteroaryl" means an aryl group wherein at least one of the ring members is a heteroatom, and preferably 5 or 6 atoms in each ring. The heteroaromatic group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heteroaromatics include furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto (i.e., =O), hydroxy, protected hydroxy, acyl, acyloxy, alkoxy, alkenoxy, alkynoxy, aryloxy, halogen, amido, amino, nitro, cyano, thiol, ketals, acetals, esters and ethers.

Heteroatom: unless otherwise indicated, the term "heteroatom" means an atom other than hydrogen or carbon, such as a chlorine, iodine, bromine, oxygen, sulfur, nitrogen, phosphorus, boron, arsenic, selenium or silicon atom.

Heterocyclo: unless otherwise indicated, the terms "heterocyclo" and "heterocyclic" as used herein alone or as part of another group denote optionally substituted, fully saturated or unsaturated, monocyclic or bicyclic, aromatic or nonaromatic groups having at least one heteroatom in at least one ring, and preferably 5 or 6 atoms in each ring. The heterocyclo group preferably has 1 or 2 oxygen atoms, 1 or 2 sulfur atoms, and/or 1 to 4 nitrogen atoms in the ring, and may be bonded to the remainder of the molecule through a carbon or heteroatom. Exemplary heterocyclo include heteroaromatics such as furyl, thienyl, pyridyl, oxazolyl, pyrrolyl, indolyl, quinolinyl, or isoquinolinyl and the like. Exemplary substituents include one or more of the following groups: hydrocarbyl, substituted hydrocarbyl, keto, hydroxy, protected hydroxy, acyl, acyloxy, alkoxy, alkenoxy, alkynoxy, aryloxy, halogen, amido, amino, nitro, cyano, thiol, ketals, acetals, esters and ethers.

Heterohydrocarbyl: unless otherwise indicated, the term "heterohydrocarbyl" means a hydrocarbyl group wherein at least one of the chain carbon atoms is replaced with a heteroatom.

Humidified Thickness: unless otherwise indicated, "humidified thickness," as used herein in connection with a polymer layer, shall mean the thickness of the polymer layer using an environmental scanning electron microscope (ESEM and approximately 26% relative humidity). To measure humidified thickness, the sample is freeze fractured for imaging by being submerged in liquid nitrogen then cracked with an ultra microtome blade. The freeze fracturing should break the article at a plane orthogonal to the polymer modified surface in order to measure the thickness of the polymer layer normal to the substrate. After fracturing, the samples are soaked in water for at least one hour and then submerged in liquid nitrogen and fixed to a cold stage at −8° C. to −12° C. The samples are then imaged using a VPSE detector at the highest resolvable humidity (approximately 26% or 81 Pa) under a Scanning Electron Microscope (SEM) with an Environmental Scanning Electron Microscope (E-SEM). Exemplary microtome blades include the Leica Ultracut UCT Ultramicrotome, exemplary SEMS include the Supra55VP FESEM, Zeiss, and exemplary E-SEMS include the Zeiss EVO 55.

Hydrocarbon or Hydrocarbyl: unless otherwise indicated, the terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms Hydrophilic: unless otherwise indicated, "hydrophilic" refers to solvents, molecules, compounds, polymers, mixtures, materials, or functional groups which have an affinity for water. Such materials typically include one or more hydrophilic functional groups, such as hydroxyl, zwitterionic, carboxy, amino, amide, phosphate, sulfonyl, hydrogen bond forming, and/or ether groups.

Hydrophilic polymer: unless otherwise indicated, "hydrophilic polymer" refers to a polymer surface that has an affinity for water. One method of determining a polymer surface's affinity to water is measuring the contact angle. For the purposes of this application, a surface will be defined as hydrophilic if it has an advancing contact angle less than 50 degrees. A super hydrophilic polymer will refer to a polymer surface with an advancing contact angle less than 30 degrees.

Hydrophobic: unless otherwise indicated, "hydrophobic" refers to solvents, molecules, compounds, polymers, mixtures, materials, or functional groups that are repelled by water. Such materials typically contain non-polar functional groups.

Hydrophobic polymer: unless otherwise indicated, "hydrophobic polymer" refers to a polymer surface that is repelled by water. One method of determining if a polymer surface is hydrophobic is by measuring a contact angle. For the purposes of this application, a polymer surface will be defined as hydrophobic if an advancing contact angle is greater than 50 degrees. A super hydrophobic polymer will refer to a polymer surface with an advancing contact angle greater than 80 degrees.

Immobilization/Immobilized: unless otherwise indicated, "immobilization" or "immobilized" refers to a material or bioactive agent that is covalently or non-covalently attached directly or indirectly to a substrate. "Co-immobilization" refers to immobilization of two or more agents.

Initiator: unless otherwise indicated, "initiator" refers to a substance or a combination of substances that can produce a radical or other species under relatively mild conditions and promote polymerization reactions. For example, redox pairs as described elsewhere herein may be an initiator.

Local Average Dry Thickness: unless otherwise indicated, "Local Average Dry Thickness" is the mean Dry Thickness calculated by averaging Dry Thickness measurements of at least 3, and preferably at least 5, representative locations spaced approximately evenly across a cross section of the article that spans approximately 80-120 micrometers. The standard deviation of the Local Average Dry Thickness is determined by calculating the standard deviation of the Dry Thickness across at least 5, and more preferably at least 10, representative locations spaced approximately evenly across a cross section of article that spans approximately 80-120 micrometers.

Local Average Humidified Thickness: unless otherwise indicated, "Local Average Humidified Thickness" is the mean Humidified Thickness calculated by averaging Humidified Thickness measurements of at least 3, and preferably at least 5, representative locations spaced approximately evenly across a cross section of the article that spans approximately 80-120 micrometers. The standard deviation of the Local Average Humidified Thickness may be determined by calculating the standard deviation of the Humidified Thickness across of at least 5, and preferably at least 10, representative locations spaced approximately evenly across a cross section of article that spans approximately 80-120 micrometers.

Lubricity: unless otherwise indicated, "lubricity" refers to the capacity of a surface modification for reducing friction. For example, a highly lubricious surface would be one that has a coefficient of friction of about 0.01 to about 0.03, whereas a poorly lubricous surface would be one that has a coefficient of friction of about 0.35 to about 0.6. One method of performing friction measurements utilizes a microtribometer (Basalt® Must, Tetra®, Germany) according to the method of Roba, et al. (Friction Measurements on contact Lenses in their Operating Environment, Tribol Lett (2011) 44:387-397). Cantilevers (Tetra®, Germany) with different ranges of spring stiffness (N/m) are used: kn=23, kt=23, +/−10% and kn=15, kt=15, +/−10% (kn is the normal force spring constant and kt is the tangential force spring constant). The contact lens is placed inside a Teflon® chamber on top of a sand-blasted rounded plastic holder (cyclo olefin polymer, Johnson & Johnson Vision Care inc., USA), matching the internal radius of curvature of the lens, and is held in position by a cast silicone-rubber cover (polyvinylsiloxane, provil Novo, Germany) and plastic ring (poly(methyl methacrylate), PMMA). Silicone cover and PMMA ring are screwed to the Teflon® chamber by two screws placed at 180° to one another. The anterior surface of the lens faces upward. The counter surface consists of a functionalized 5-mm diameter glass disk (cover glass, Thermo Scientific, Germany). A 6 mm long glass rod is glued onto the tip of the tribometer cantilever. The functionalized glass disk is glued to the glass rod with cyanoacrylate and mounted in the tribometer. A contact lens is brought into contact with the glass disk. Contact area and pressure between the flat glass disk and the soft contact lens are measured with a tear-mimicking solution as lubricant and mucin-coated silanized glass disk at 0, 50 and 100 cycles. Unmodified lenses measure average coefficient of friction about 0.4 whereas modified lenses measure about 0.02.

Macromer: unless otherwise indicated, "macromer" refers to a medium and high molecular weight compound or polymer that contains at least one crosslinkable group and can be polymerized and/or crosslinked to form a polymer. Medium and high molecular weight typically means average molecular weights greater than 700 Daltons.

Monomer: unless otherwise indicated, "monomer" means a low molecular weight compound that can be polymerized. Low molecular weight typically means average molecular weights less than 700 Daltons.

Non-Degradable: unless otherwise indicated, "non-degradable" refers to material compositions that do not react significantly within a biological environment either hydrolytically, reductively, enzymatically or oxidatively to cleave into smaller or simpler components.

Non-Fouling Composition/Non-Fouling Material/Non-Fouling Polymer/Non-Fouling Polymer Layer: unless otherwise indicated, a "non-fouling composition" or "non-fouling material" or "non-fouling polymer" or "Non-fouling polymer layer" as used interchangeably herein, is a composition that provides or increases the protein resistance of a surface of an article to which the composition is attached. For example, when attached to a substrate such a composition may resist the adhesion of proteins, including blood proteins, plasma, cells, tissue and/or microbes to the substrate relative to the amount of adhesion to a reference substrate, that is, the same or an otherwise functionally equivalent substrate lacking the composition. Preferably, a substrate surface will be substantially non-fouling in the presence of human blood. Preferably the amount of adhesion will be decreased 20%, 30%, 40%, 50%, 60%, 70%, 80%, or more, for example, 85%, 90%, 95%, 99%, 99.5%, 99.9%, or more, relative to the reference substrate. One particularly preferred measure of the non-fouling character or protein resistance of a surface is the amount of fibrinogen adsorbed in a Fibrinogen Adsorption Assay as described herein. Preferably, the amount of adsorbed fibrinogen using the Fibrinogen Adsorption Assay described herein is <125 ng/cm$^2$, <90 ng/cm$^2$, <70 ng/cm$^2$, <50 ng/cm$^2$, <30 ng/cm$^2$, <20 ng/cm$^2$, <15 ng/cm$^2$, <12 ng/cm$^2$, <10 ng/cm$^2$, <8 ng/cm$^2$, <6 ng/cm$^2$, <4 ng/cm$^2$, <2 ng/cm$^2$, <1 ng/cm$^2$, <0.5 ng/cm$^2$, or <0.25 ng/cm$^2$.

Ophthalmic device: unless otherwise indicated, an ophthalmic device refers to a contact lens (hard or soft), an intraocular lens, a corneal onlay, or other ophthalmic devices (e.g., stents, glaucoma shunt, or the like) used on or about the eye or ocular vicinity.

Oxygen Permeability: unless otherwise indicated, the "oxygen permeability" will refer to the rate at which oxygen will pass through a material. Intrinsic "oxygen permeability", Dk, of a lens material does not depend on lens thickness. Oxygen permeability is conventionally expressed in units of barrers, where "barrer" is defined as: $[(cm^3 oxygen)(mm)/(cm^2)(sec)(mm^2 Hg)] \times 10^{-10}$. These are the units commonly used in the art. Thus, in the interest of consistency, the unit "barrer" will have the meanings as defined above. For example, a lens having a Dk of 90 barrers ("oxygen permeability barrers") and a thickness of 90 microns (0.090 mm) would have a Dk/t of 100 barrers/mm: $[(90 \times 10^{-10}/0.09) = 100 \times 10^{-9}]$. In accordance with the disclosure, a high oxygen permeability in reference to a material or a contact lens characterized by apparent oxygen permeability of at least 40 barrers or larger measured with a sample (film or lens) of 100 microns in thickness according to a coulometric method. One particular coulometric method of determining oxygen permeability is by ASTM F1927-07—Standard Test Method for Determination of Oxygen Gas Transmission Rate, Permeability and Permeance at Controlled Relative Humidity Through Barrier Materials Using a Coulometric Detector.

Oxygen transmissibility: unless otherwise indicated, the "oxygen transmissibility" of a contact lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as: $[(cm^3 oxygen)/(cm^2)(sec)(mm^2 Hg)] \times 10^{-9}$.

Penetration Depth: unless otherwise indicated, the "penetration depth" will refer to the distance the surface modification polymer extends below the surface of the lens in a direction normal to the surface of the lens. The distance may be measured given a distinct chemical signal or selective staining for the surface modification polymer. The distance may be normalized to the body of the contact lens. The boundary for the region containing the surface modification may be defined as the distance that the polymer modification penetrates into the substrate as detected visually after staining with a dye that binds to the modification (e.g. eosin for sulfobetaine or osmium tetroxide for carboxybetaine), or by EDS, the region in which the atomic % signal is at least 2× baseline. See FIGS. 1-4. Representative chemical signal assessments include: SEM-EDS, FTIR-microscope, and XPS. The penetration depth profile can be determined, e.g., using eosin, acid molybdate reagent, orange B, EDS, SEM staining, osmium tetroxide, and hydrophobic staining. For example, a modified contact lens can be dehydrated under air overnight and then cut into a piece of 5×5 mm square. The sample is then observed under an SEM. The elemental composition of the cross-section surface, especially sulfur and silicon, is mapped using EDS. Alternatively, the sample can be embedded in paraffin wax prior to staining and analysis. Paraffin wax is melted in a glass container in a 60° C. oven (30 minutes to 1 hour). The sample is placed on the bottom of a metal mold and the melted wax poured into the mold. After cooling, the embedded lens in paraffin wax is microtomed to 10 µm-thick sections. The microtomed sections are then put on a glass slide heated to 60° C. After the paraffin is melted and cooled to room temperature, the paraffin wax is dissolved with Neo-Clear xylene substitute or other solvents. Then the sample is stained in 2% Eosin in $H_2O$ for two minutes and rinsed with water until no color changes are observed. The samples can be observed by optical or laser microscopy. An alternative method can be performed by staining a piece of 5 mm square from a contact lens in 2% Eosin in $H_2O$ for two minutes prior to embedding in paraffin wax. The samples are rinsed with water until no color changes are observed. The sample is then embedded in paraffin wax and microtomed to 10 µm-thick sections from the embedded sample. The sections are melted on a glass slide, cooled, and the paraffin wax is removed by Neo-Clear xylene substitute or other solvents. The samples can be observed by optical or laser microscopy. Another alternative method is to break the stained samples in liquid nitrogen and the fresh cross-section can be observed under an optical or laser microscope.

Photoinitiator: unless otherwise indicated, a "photoinitiator" refers to a chemical that initiates radical crosslinking/polymerizing reaction by the use of light (visible, ultraviolet or infrared). Suitable photoinitiators include, without limitation, benzoin methyl ether, diethoxyacetophenone, benzoylphosphine oxide, 1-hydroxycyclohexyl phenyl ketone, Darocure® types, and Irgacure® types, preferably Darocure® 1173, and Irgacure® 2959.

Polymer: unless otherwise indicated, "polymer" includes natural and synthetic, homopolymers and copolymers comprising multiple repeat units and, unless otherwise indicated, may be linear, branched, or dendritic. Examples of copolymers include, but are not limited to, random copolymers and block copolymers, smart polymers, temperature responsive (e.g., NIPAM), and pH responsive (e.g., pyridyl based) polymers.

Quaternary Nitrogen: unless otherwise indicated, "quaternary nitrogen," as used herein, refers to a nitrogen atom that is a member of a quaternary ammonium cation.

$R_{rms}$ Surface Roughness: unless otherwise indicated, "$R_{rms}$ Surface Roughness" refers to root mean squared roughness of a surface, which measures the vertical deviations of a real surface from its ideal form. The roughness refers to surface micro-roughness which may be different than measurements of large scale surface variations. Preferably, this may be measured using atomic force microscopy (MFP-3D, Asylum) across a field of approximately 1-30 µm by 1-30 µm, preferably 20 µm by 20 µm. The sample can be measured both in hydrated or dehydrated condition. Standard silicon cantilever (Olympus AC160TS, spring constant 42 N/m) is employed for the measurement with an AC/Tapping mode. The $R_{rms}$ surface roughness is calculated by the software (IGOR Pro) attached with the AFM machine. Alternatively the roughness can be measured using a stylus profilometer. For example, the sample surface roughness can be measured by a Tencor P-16+ profilometer with a 60 degree, 2 µm diamond tip stylus. Preferably, an 800 µm scan length is chosen with 20 µm/second scan rate, 50 Hz scan frequency, and 2 µg loading force. At least three different sites are measured for the same sample, and the surface roughness is averaged from at least three samples. Alternatively, the $R_{rms}$ surface roughness can be measured preferably by non-contact methods, including using optical profilometers. For example, the sample surface roughness is measured by a optical profilometer (Zeta Z20 or Olympus Lext OLS4000). Preferably a 3-D image is taken by the optical profilometer under a 50× objective lens, and the sample's surface roughness is then measured along at least three different lines cross the image. At least three different spots are measured and the surface roughness is averaged from at least three samples. In a preferred example an Olympus LEXT OLS4000 3D Laser Measuring Microscope is employed for roughness measurements and 3D imaging. A LEXT microscope utilizes low wavelength optical technology with a 408 nm laser in combination with confocal scanning can be used for the measurement. Samples to be measured are mounted on a glass slide by double-sided tape. Digital 3-D images are taken with the Olympus LEXT OLS4000 laser confocal microscope ("LEXT") under an Olympus MPLAPON 50× objective lens. The digital images taken in this way have a 256×256 µm field area. The Z-direction repeatability for this LEXT machine has been certified by Olympus to be less than 0.012 μm. To measure the roughness, at least three images have been taken from each sample and the $R_{rms}$ roughness is calculated by using a 9 μm cut-off length.

Silicate: unless otherwise indicated, "silicate" or "silicates" refers to a compound containing a silicon-bearing anion.

Silicon: unless otherwise indicated, "silicon" or "Si" refers to the chemical element with the symbol Si and atomic number 14.

Silicone: unless otherwise indicated, "silicone" or "silicones" are polymers that include silicon together with carbon, hydrogen, oxygen, and, optionally, other chemical elements (e.g., nitrogen, chlorine, and phosphorus).

Silicone hydrogel: unless otherwise indicated, "silicone hydrogel refers to a silicone-containing hydrogel obtained by copolymerization of a polymerizable composition comprising at least one silicone-containing monomer or at least one silicone-containing macromer or at least one crosslinkable silicone-containing prepolymer. Silicone hydrogels may include silicones, silicone derivatives such as fluorosilicones and their copolymers.

Siloxane: unless otherwise indicated, "siloxane" or "siloxanes" refers to any chemical compound composed of units having the formula $R_2SiO$, where R is hydrogen or hydrocarbyl.

Solvent Extractable Polymerization Initiator: unless otherwise indicated, "Solvent Extractable Polymerization Initiator" refers to any compound capable of starting radical polymerization that has been incorporated within the article, wherein either the initiator or its degradation products may be extracted from the article using a suitable solvent. In general, extractions can use nonpolar or polar solvents. For example, extraction solvents such as water, acetone or ethanol; and/or other extraction solvents in which the solubility of the initiator and/or its degradation products is at least 1 mg/L. The extraction should be carried out for a sufficient time such that the change in concentration of the extract is not increasing more than 5% per hour. Alternatively, extraction until the amount of extracted material in a subsequent extraction is less than 10% of that detected in the initial extraction, or until there is no analytically significant increase in the cumulative extracted material levels detected. Extraction conditions include: 37° C. for 72 h; 50° C. for 72 h; 70° C. for 24 h; 121° C. for 1 h. Extraction ratio includes 6 cm$^2$/mL surface area/volume and/or 0.2 g sample/mL. In some instances, complete dissolution of the substrate may be appropriate. Materials shall be cut into small pieces before extraction to enhance submersion in the extract media, for example, for polymeric substrates approximately 10 mm×50 mm or 5 mm×25 mm are appropriate. The instrumentation used includes high-performance liquid chromatography-photo-diode array detection-mass spectrometry (HPLC-PDA-MS) for organics analysis; gas chromatography-mass spectrometry (GC-MS) for organics analysis; inductively coupled plasma-optical emission spectroscopy or mass spectrometry (ICP-OES or ICP-MS) for metals analysis; and sometimes ion chromatography (IC) for inorganics and ion analysis. Sometimes more advanced MS detectors such as time-of-flight (TOF) are used to obtain accurate mass information. Hexane and alcohol extractions are analyzed by GC-MS. Water and alcohol extractions are analyzed by HPLC. The initiator or its degradation products may be quantified and/or detected in the substrate or grafted polymer by the previously described methods. These include FTIR-ATR, electron spectroscopy for chemical analysis (ESCA, also called X-ray photoelectron spectroscopy, XPS), Secondary Ion Mass Spectrometry (SIMS), and surface-enhanced Raman spectroscopy (SERS). For example, peroxide may be detected spectrophotometrically using any of the following three methods: the iodide method (oxidation of sodium iodide by peroxides in the presence of ferric chloride), the DPPH method (treatment with 1,1-diphenyl-2-picrylhydrazyl, a radical scavenger, to decompose the peroxides), or the peroxidase method (reduction with glutathione, catalyzed by glutathione peroxidase, followed by measuring the coupled oxidation of NADPH in the presence of glutathione reductase). See, for example, Fujimoto et al., Journal of Polymer Science Part A: Polymer Chemistry, Vol. 31, 1035-1043 (1993).

Stable: unless otherwise indicated, "stable," as used herein in reference to a material, means that the material retains functionality over extended periods of time. In one embodiment, the referenced material retains at least 90% of a referenced activity (or property) for at least 30 days at 37° C. in at least one of phosphate buffered saline containing protein, media, or serum, or in vivo. In one embodiment, the reference material retains at least 80% of a referenced activity (or property) for at least 90 days at 37° C. in at least one of phosphate buffered saline containing protein, media, or serum, or in vivo. In one embodiment, the referenced material retains at least 90% of the referenced activity (or property) for at least 30 days at 37° C. and at least 80% of the referenced activity (or property) for at least 90 days at 37° C. The referenced activity or property may include surface contact angle, non-fouling, anti-thrombogenic, and/or antimicrobial activity.

Static Contact Angle: Unless otherwise indicated, "Static Contact Angle" is the angle at which a water/vapor interface meets a solid substrate surface at or near equilibrium conditions. A drop of purified water (e.g., 1 μL) is deposited on the test surface, the shape of the "sessile" droplet is photographed by a microscope with a CCD camera using a video contact angle system (e.g., VCA 2000, AST Inc.), and the contact angle is then determined (using, for example, a VCA Optima XE). The size of the water droplet used to determine the contact angle may vary depending upon the substrate type and composition. For contact lenses an underwater captive bubble technique is often used instead of a sessile drop. The contact lens is submerged under water, a curved needle is used to deliver an air bubble to the surface of the contact lens, and the angle of the air/liquid/solid interface is measured. In some cases, if the surface is very hydrophilic, upon release from the needle the air bubble does not interact with the contact lens and floats away.

Substantially Non-Cytotoxic: unless otherwise indicated, "substantially non-cytotoxic" refers to a composition that does not substantially change the metabolism, proliferation, or viability of mammalian cells that contact the surface of the composition. These may be quantified by the International Standard ISO 10993-5 which defines three main tests to assess the cytotoxicity of materials including the extract test, the direct contact test and the indirect contact test.

Substantially Non-Toxic: unless otherwise indicated, "substantially non-toxic" means a surface that is substantially hemocompatible and substantially non-cytotoxic.

Substituted/Optionally Substituted: unless otherwise indicated, the term "substituted" and "optionally substituted" means that the referenced group is or may be substituted with one or more additional suitable group(s), which may be individually and independently selected, for example, from acetals, acyl, acyloxy, alkenoxy, alkoxy, alkylthio, alkynoxy, amido, amino, aryl, aryloxy, arylthio, azido, carbonyl, carboxamido, carboxyl, cyano, esters, ethers, hydrocarbyl, substituted hydrocarbyl, heterohydrocarbyl, substituted heterohydroalkyl, cycloalkyl, halogen, heteroalicyclic, heteroaryl, hydroxy, isocyanato, isothiocyanato, ketals, keto, mercapto, nitro, perhaloalkyl, silyl, sulfamoyl, sulfate, sulfhydryl, sulfonamido, sulfonate, sulfonyl, sulfoxido, thiocarbonyl, thiocyanato, thiol, and/or the protected derivatives thereof. It will be understood that "substitution" or "substituted" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc.

Substrate: unless otherwise indicated, "substrate" refers to the material from which a non-fouling polymer is grafted.

Sulfoammonium: unless otherwise indicated, a "sulfoammonium" moiety is a zwitterionic moiety comprising sulfate and ammonium functionality and includes, for example, sulfoammonium monomers, sulfoammonium oligomers, sulfoammonium polymers, sulfoammonium repeat units, and other sulfoammonium-containing materials. Sulfobetaine monomers, oligomers, polymers, repeat units, and other sulfobetaine materials are exemplary sulfoammonium moieties.

Surviving a digital rubbing test: unless otherwise indicated, "surviving a digital rubbing test" in reference to surface modification on a contact lens as described herein means that after digitally rubbing the lens with a nitrile-gloved hand in the presence of a contact lens wash solution or an equivalent, there is no noticeable increase in contact angle. Representative wash solutions include AQuify Multi-Purpose Solution (MPS) (Ciba Vision), Opti-Free Replenish Multi-Purpose Disinfecting Solution (Alcon), Renu Multi-Purpose Solution (Bausch & Lomb), Biotrue Multi-Purpose Solution (Bausch & Lomb), Complete Multi-Purpose Solution Easy Rub Formula, and Clear Care (Ciba Vision). Preferably, "surviving a digital rubbing test" in reference to surface modification on a contact lens as described herein means that after digitally rubbing the lens for 20 seconds as described above, the advancing contact angle does not increase by more than 5%, 10%, 15%, 20%, or 25% from the advancing contact angle prior to the test.

Tear-Film Break-Up: unless otherwise indicated, "tear-film break-up time" refers to the time between blinks that an observed intact film is maintained on the outside surface of the cornea in the absence of a contact lens, or the outside surface of a contact lens. In general, to obtain tear-film break-up times, patients are asked to hold both eyes open while the examiner times the interval from the last blink to the first break, dry spot, or distortion occurring in the tear pattern. Patients are encouraged to blink if they feel discomfort, to avoid reflex tearing. If a patient blinks during the test sequence before tear film break-up, he or she is instructed to rest briefly to allow the tear film to stabilize, and the measure is repeated with reinforcement of the instructions. Three measurements of the tear-film break-up time are taken, and an average is used in statistical analyses. One particular method of measuring tear-film break-up time is described in Nichols et al., Ophthalmology & Visual Science, April 2006, Vol. 47, No. 4, p. 1319-1328.

Thermal initiator: unless otherwise indicated, a "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

Undercoating Layer: unless otherwise indicated, "undercoating layer" refers to any coating, or combination of coatings, incorporated into a substrate from which a non-fouling polymer is grafted.

Zwitterion/Zwitterionic Material: unless otherwise indicated, "zwitterion" or "zwitterionic material" refers to a macromolecule, material, or moiety possessing both cationic and anionic groups. In most cases, these charged groups are balanced, resulting in a material with zero net charge.

Zwitterionic Polymers: unless otherwise indicated, "zwitterionic polymers" may be homopolymers or copolymers and include both polyampholytes (e.g., polymers with the charged groups on different monomer units) and polybetaine (polymers with the anionic and cationic groups on the same monomer unit). Exemplary zwitterionic polymers include alternating copolymers, statistical copolymers, random copolymers and block copolymers of two, three or more monomers.

DETAILED DESCRIPTION

One aspect of the present invention is directed to a medical device, such as a contact lens, with a surface modification. Where the medical device is a contact lens, for example, the contact lens is preferably a silicon-containing hydrogel (including silicones, silicone derivatives such as fluorosilicones and their copolymers). The modification creates a structure such that the surface modification polymer is covalently integrated to the surface of the bulk substrate material, e.g., a contact lens. Among other features, the surface modification is non-leaching and stable. For example, a surface modified contact lens is stable under various sterilization environments, including multiple autoclave cycles. Additionally, or alternatively, the modification is stable under oxidative solutions, contact lens washing solutions, and UV exposure. The modified article is also durable, withstanding mechanical challenges such as surviving a digital rubbing test and friction tests for contact lenses.

Processes described herein for preparing the articles involve the application of hydrophilic polymers to the surface of the article (e.g., contact lenses). In certain embodiments, the monomers are preferably zwitterionic compounds, including sulfobetaines, carboxybetaines, phosphorylcholines, and their derivatives. Without being bound to any particular theory, it is believed that these polymers provide high wettability, lubricity, and deposition resistance that can improve the comfort of contact lenses during daily and extended wear. The polymers may also reduce infection by resisting the adherence of microbes. Preferably, the surface modifications described herein do not substantially affect these and other mechanical properties of the medical device. With respect to contact lenses, for example, the shape of the lens is relevant to visual acuity and the edges are designed for comfort and the surface modifications do not adversely affect these properties.

In general, the surface modification may be applied through a wet chemistry method using relatively mild conditions as described herein. The methods described herein preferably utilize only liquid reactions. In preferred embodiments, a minimum number of steps are required, and the steps are amenable to current contact lens manufacturing processes. In preferred embodiments, five, four, three, two or one reaction step(s) are used. Advantageously, no plasma treatment is required.

In some embodiments, the surface modification polymer layer extends into the contact lens base material. Without being bound to any theory, the depth of surface modification on the surface of and into the bulk material may improve attachment of the surface modification polymer chains, which may, in turn, improve the resistance of the modified device to abrasion or chemical stresses. In one embodiment, the surface modification polymer extends at least a minimum penetration depth of 0.1%, 0.2%, 0.5%, 1%, 2%, 5%, 10%, 20%, 30%, 40% or 45% of the thickness of the lens below the surface of the lens in a direction normal to the surface of the lens. Thus, for example, the surface modification polymer may extend a minimum penetration depth of about 0.1% to about 0.5%, about 0.1% to about 2%, about 0.1% to about 10%, or about 0.1% to about 30%. By way of another example, the surface modification polymer may extend a minimum penetration depth of about 0.5% to about 1%, about 0.5% to about 5%, about 0.5% to about 20%, or about 0.5% to about 40%. By way of another example, the surface modification polymer may extend a minimum penetration depth of about 1% to about 5%, about 1% to about 10%, about 1% to about 20%, or about 1% to about 40%. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In some embodiments, it may be preferable to also have a maximum depth for the penetration of the surface modification polymer into the bulk material. Without being bound to any theory, limiting the penetration of the surface modification polymer may limit the degree to which the surface modification changes the bulk properties of the lens, such as water content and oxygen permeability. Thus, for example, it may be desirable to have a surface modification that does not change these bulk properties. In one embodiment, the surface modification polymer extends a maximum penetration depth of 1%, 2%, 5%, 10%, 15%, 20%, 30%, or 45% below the surface of the lens in a direction normal to the surface of the lens. Stated differently, in certain embodiments, the penetration depth of the surface modification polymer does not does not exceed 45% of the thickness of the lens measured from the surface and in a direction normal to the surface of the lens. In certain embodiments, the penetration depth of the surface modification polymer does not does not exceed 30% of the thickness of the lens measured from the surface and in a direction normal to the surface of the lens. In certain embodiments, the penetration depth of the surface modification polymer does not does not exceed 20% of the thickness of the lens measured from the surface and in a direction normal to the surface of the lens. In certain embodiments, the penetration depth of the surface modification polymer does not does not exceed 15% of the thickness of the lens measured from the surface and in a direction normal to the surface of the lens. In certain embodiments, the penetration depth of the surface modification polymer does not does not exceed 10% of the thickness of the lens measured from the surface and in a direction normal to the surface of the lens. In certain embodiments, the penetration depth of the surface modification polymer does not does not exceed 5% of the thickness of the lens measured from the surface and in a direction normal to the surface of the lens. In certain embodiments, the penetration depth of the surface modification polymer does not does not exceed 2% of the thickness of the lens measured from the surface and in a direction normal to the surface of the lens. In certain embodiments, the penetration depth of the surface modification polymer does not does not exceed 1% of the thickness of the lens measured from the surface and in a direction normal to the surface of the lens. Thus, for example, the surface modification polymer may extend a maximum penetration depth of from about 1% to about 5%, from about 1% to about 10%, from about 1% to about 20%, or from about 1% to about 30%. By way of another example, the surface modification polymer may extend a maximum penetration depth of from about 2% to about 5%, from about 2% to about 15%, from about 2% to about 30%, or from about 2% to about 45%. By way of another example, the surface modification polymer may extend a maximum penetration depth of from about 5% to about 10%, from about 5% to about 20%, from about 5% to about 30%, or from about 5% to about 45%. By way of another example, the surface modification polymer may extend a maximum penetration depth of from about 0.25% to about 2%, from about 0.25% to about 1.5%, from about 0.25% to about 1%, or from about 0.25% to about 0.75%. By way of another example, the surface modification polymer may extend a maximum penetration depth of from about 0.5% to about 2%, from about 0.5% to about 1.5%, from about 0.5% to about 1%, or from about 0.5% to about 0.75%. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In one embodiment, the penetration depth of the surface modification polymer into the bulk is greater than about 0.1 microns and less than about 100 microns. The penetration depth may be measured on a dehydrated lens or on a hydrated lens. Thus, for example, penetration depth can be at least about 0.1 microns, about 0.25 microns, about 0.5 microns, about 0.75 microns, about 1 microns, about 5 microns, about 10 microns, about 15 microns, about 20 microns, about 25 microns, about 30 microns, about 35 microns, about 40 microns, about 45 microns, about 50 microns, about 55 microns, about 60 microns, about 65 microns, about 70 microns, about 75 microns, about 80 microns, about 85 microns, about 90 microns, or about 95 microns. In another embodiment, for example, the penetration depth of the surface modification polymer is greater than about 0.1 microns and less than about 2 microns (e.g., from about 0.1 microns to about 1.5 microns; from about 0.1 microns to about 1 micron, or from about 0.1 microns to about 75 microns). In another embodiment, for example, the penetration depth of the surface modification polymer is greater than about 0.25 microns and less than about 2 microns (e.g., from about 0.25 microns to about 1.5 microns; from about 0.25 microns to about 1 micron, or from about 0.25 microns to about 75 microns). In another embodiment, for example, the penetration depth of the surface modification polymer is greater than about 0.5 microns and less than about 2 microns (e.g., from about 0.5 microns to about 1.5 microns; from about 0.5 microns to about 1 micron, or from about 0.5 microns to about 75 microns). In another embodiment, for example, the penetration depth of the surface modification polymer is greater than about 0.5 microns and less than about 50 microns (e.g., from about 1 microns to about 45 microns; from about 5 microns to about 35 microns, or from about 10 microns to about 25 microns). In another embodiment, the penetration depth of the surface modification polymer is greater than about 2 microns and less than about 30 microns (e.g., from about 5 microns to about 25 microns, from about 10 microns to about 20 microns, or from about 12.5 microns to about 17.5 microns). In another embodiment, the penetration depth of the surface modification polymer is greater than about 5 microns and less than about 20 microns (e.g., from about 10 microns to about 15 microns). In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In some embodiments, it is preferable to have at least a minimum mass of the surface modification polymer on or within the surface of the medical device. Creating a minimum mass reduces the likelihood that defects without modification are found or that the surface modification is removed from a portion of the device when stressed, washed with chemicals, or rubbed. In one embodiment, for example, the minimum weight percentage of the surface modification is at least 0.1%, at least 0.5%, at least 1%, at least 5%, or at least 10% of the total weight of the article. Thus, for example, the minimum weight percentage of the surface modification may be at least 0.1%, at least 0.5%, at least 1%, at least 1.5%, at least 2.0%, at least 2.5%, at least 3.0%, at least 3.5%, at least 4.0%, at least 4.5%, at least 5.0%, at least 5.5%, at least 6.5%, at least 7.0%, at least 7.5%, at least 8.0%, at least 8.5%, at least 9.0%, at least 9.5%, or at least 10%, of the total weight of the article. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

This mass fraction may be assessed, for example, by elemental analysis, XPS or SEM-EDS. Other quantitative methods include: Gravimetry, where the sample is dissolved and then the element of interest is precipitated and its mass measured or the element of interest is volatilized and the mass loss is measured; and optical atomic spectroscopy, such as flame atomic absorption, graphite furnace atomic absorption, and inductively coupled plasma atomic emission, which probe the outer electronic structure of atoms.

The concentration of the modified polymers can also be determined by a characteristic elemental analysis method. For sulfobetaine polymer-modified lenses, for example, a total sulfur analysis may be measured using a combustion and gas chromatography (GC) method. For modified polymer without any characteristic element, a broad survey analysis of total elements, such as C, N, H, S, and O, of both modified and un-modified lenses can be performed by combustion/GC, Coulometric, or chemical titration methods, and the relative modification concentration can be measured.

If a unique element exists in the surface modification polymer and not in the lens, the mass fraction of that element in the lens may be measured. This mass fraction of the single element may then be used to calculate the mass fraction of the surface modification polymer based on the mass percentage of that element in the surface modification polymer. For instance, for sulfobetaine, the mass fraction of sulfur in the total lens (or other article) may be measured experimentally. The mass fraction of sulfur within a homopolymer of sulfobetaine is known to be 0.109 g sulfur/g sulfobetaine, and therefore the mass fraction of the sulfobetaine in the article can be calculated based on the mass fraction of sulfur in the lens divided by 0.109 g sulfur/g sulfobetaine. In one embodiment, the total sulfur concentration in a contact lens, analyzed by ICP method, is 1 μg, 5 μg, 10 μg, 50 μg, 100 μg, 500 μg, 1 mg, 20 mg, or 50 mg/g contact lens; more preferably, the sulfur concentration is 1-20 mg/g contact lens.

Where the modified article is a contact lens, the modified lens preferably has an oxygen permeability greater than about 50 barrers. More preferably, the lens has an oxygen permeability greater than about 90 barrers. Still more preferably, the lens has an oxygen permeability greater than about 150 barrers. Still more preferably, the lens has an oxygen permeability greater than about 160 barrers. Thus, in various embodiments, the modified lens can have an oxygen permeability of about 55, about 60, about 65, about 70, about 75, about 80, about 85, about 90, about 95, about 100, about 105, about 110, about 115, about 120, about 125, about 130, about 135, about 140, about 145, about 150, about 155, about 160, about 165, about 170, about 175, about 180, about 185, about 190, about 195, or about 200 barrers. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material.

Articles including polymeric surface modifications as described herein preferably exhibit a static contact angle of less than 30 degrees. For example, in one embodiment modified surfaces of articles described herein exhibit a static contact angle of less than 25 degrees, less than 20 degrees, or less than 15 degrees. In one preferred embodiment, modified surfaces of articles described herein exhibit a static contact angle of less than 10 degrees; more preferably less than 5 degrees; still more preferably completely wettable, that is, unable to be measured by a sessile drop method and having no interaction with the surface using a captive bubble method. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

Articles including polymeric surface modifications as described herein preferably exhibit a reduction in static contact angle by greater than 5 degrees, greater than 10 degrees, greater than 15 degrees, greater than 20 degrees, greater than 25 degrees, greater than 30 degrees, greater than 35 degrees, greater than 40 degrees, greater than 45 degrees, greater than 50 degrees, greater than 55 degrees, or greater than 60 degrees. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

Articles including polymeric surface modifications as described herein preferably exhibit an advancing contact angle of less than 30 degrees. For example, in one embodiment modified surfaces of articles described herein exhibit an advancing contact angle of less than 25 degrees, less than 20 degrees, or less than 19 degrees. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

Articles including polymeric surface modifications as described herein preferably exhibit a reduction in advancing contact angle relative to unmodified lenses by greater than 5 degrees, greater than 10 degrees, greater than 15 degrees, greater than 20 degrees, greater than 25 degrees, greater than 30 degrees, greater than 35 degrees, greater than 40 degrees, greater than 45 degrees, greater than 50 degrees, greater than 55 degrees, or greater than 60 degrees. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

Articles including polymeric surface modifications as described herein preferably have a coefficient of friction of less than about 0.1, less than about 0.05, or less than about 0.02. Thus, for example, the articles may have a coefficient of friction of about 0.1, about 0.09, about 0.08, about 0.07, about 0.06, about 0.05, about 0.04, about 0.03, about 0.02, about 0.01, or less. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In a particular embodiment, articles including polymeric surface modifications as described herein have a static contact angle of less than 30 and an oxygen permeability of greater than 80. In another particular embodiment, articles including polymeric surface modifications as described herein have a static contact angle of less than 25 and an oxygen permeability of greater than 80. In another particular embodiment, articles including polymeric surface modifications as described herein have a static contact angle of less than 20 and an oxygen permeability of greater than 80. In another particular embodiment, articles including polymeric surface modifications as described herein have a static contact angle of less than 15 and an oxygen permeability of greater than 80. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In a particular embodiment, articles including polymeric surface modifications as described herein have a static contact angle of less than 30 and an oxygen permeability of greater than 100. In another particular embodiment, articles including polymeric surface modifications as described herein have a static contact angle of less than 25 and an oxygen permeability of greater than 100. In another particular embodiment, articles including polymeric surface modifications as described herein have a static contact angle of less than 20 and an oxygen permeability of greater than 100. In another particular embodiment, articles including polymeric surface modifications as described herein have a static contact angle of less than 15 and an oxygen permeability of greater than 100. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In a particular embodiment, articles including polymeric surface modifications as described herein have an advancing contact angle of less than 30 and an oxygen permeability of greater than 80. In another particular embodiment, articles including polymeric surface modifications as described herein have an advancing contact angle of less than 25 and an oxygen permeability of greater than 80. In another particular embodiment, articles including polymeric surface modifications as described herein have an advancing contact angle of less than 20 and an oxygen permeability of greater than 80. In another particular embodiment, articles including polymeric surface modifications as described herein have an advancing contact angle of less than 15 and an oxygen permeability of greater than 80. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In a particular embodiment, articles including polymeric surface modifications as described herein have an advancing contact angle of less than 30 and an oxygen permeability of greater than 100. In another particular embodiment, articles including polymeric surface modifications as described herein have an advancing contact angle of less than 25 and an oxygen permeability of greater than 100. In another particular embodiment, articles including polymeric surface modifications as described herein have an advancing contact angle of less than 20 and an oxygen permeability of greater than 100. In another particular embodiment, articles including polymeric surface modifications as described herein have an advancing contact angle of less than 15 and an oxygen permeability of greater than 100. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In a particular embodiment, articles including polymeric surface modifications as described herein have a coefficient of friction of less than 0.1 and an oxygen permeability of greater than 80. In another particular embodiment, articles including polymeric surface modifications as described herein have a coefficient of friction of less than 0.05 and an oxygen permeability of greater than 80. In another particular embodiment, articles including polymeric surface modifications as described herein have a coefficient of friction of less than 0.02 and an oxygen permeability of greater than 80. In another particular embodiment, articles including polymeric surface modifications as described herein have a coefficient of friction of less than 0.1 and an oxygen permeability of greater than 100. In another particular embodiment, articles including polymeric surface modifications as described herein have a coefficient of friction of less than 0.05 and an oxygen permeability of greater than 100. In another particular embodiment, articles including polymeric surface modifications as described herein have a coefficient of friction of less than 0.02 and an oxygen permeability of greater than 100. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

Where the article is a contact lens, for example, a patient using the article will exhibit a tear-film break up time of greater than 10 seconds, more preferably greater than 15 seconds, more preferably greater than 20 seconds. In one embodiment, for example, the tear-film break up time for an article in use in a patient is from about 7.5 seconds to about 20 seconds. In another embodiment, for example, the tear-film break up time for an article in use in a patient is from about 10 seconds to about 20 seconds. In another embodiment, for example, the tear-film break up time for an article in use in a patient is from about 10 seconds to about 15 seconds. In another embodiment, for example, the tear-film break up time for an article in use in a patient is from about 15 seconds to about 20 seconds. In one embodiment, the polymeric surface modification material in each of the foregoing embodiments and examples recited in this paragraph is a zwitterionic polymer. In one embodiment, the polymeric surface modification material in each of the foregoing examples and embodiments recited in this paragraph is a polymer containing carboxyammonium or sulfoammonium repeat units. In one embodiment, the polymeric surface modification material in each of the foregoing examples and embodiments recited in this paragraph is a polymer containing sulfobetaine or carboxybetaine repeat units. In one embodiment, the polymeric surface modification material in each of the foregoing examples and embodiments recited in this paragraph is a zwitterionic polymer and the zwitterionic polymer is grafted from a silicone hydrogel material. In one embodiment, the polymeric surface modification material in each of the foregoing examples and embodiments recited in this paragraph is a carboxyammonium or sulfoammonium polymer and the carboxyammonium or sulfoammonium polymer is grafted from a silicone hydrogel material. In one embodiment, the polymeric surface modification material in each of the foregoing examples and embodiments recited in this paragraph is a polymer containing sulfobetaine or carboxybetaine repeat units and the polymer containing sulfobetaine or carboxybetaine repeat units is grafted from a silicone hydrogel material. In one embodiment, the article of each of the foregoing examples and embodiments in this paragraph is a contact lens.

In another particular embodiment, the polymeric surface modification material is a zwitterionic polymer, the advancing contact angle is less than about 30 degrees, and exhibits a tear film break-up time in use of greater than 10 seconds. In another particular embodiment, the polymeric surface modification material is a zwitterionic polymer, the advancing contact angle is less than about 25 degrees, and exhibits a tear film break-up time in use of greater than 10 seconds. In another particular embodiment, the polymeric surface modification material is a zwitterionic polymer, the advancing contact angle is less than about 20 degrees, and exhibits a tear film break-up time in use of greater than 10 seconds. In another particular embodiment, the polymeric surface modification material is a zwitterionic polymer, the advancing contact angle is less than about 19 degrees, and exhibits a tear film break-up time in use of greater than 10 seconds. In another particular embodiment, the polymeric surface modification material is a zwitterionic polymer, the advancing contact angle is less than about 30 degrees, and exhibits a tear film break-up time in use of greater than 15 seconds. In another particular embodiment, the polymeric surface modification material is a zwitterionic polymer, the advancing contact angle is less than about 25 degrees, and exhibits a tear film break-up time in use of greater than 15 seconds. In another particular embodiment, the polymeric surface modification material is a zwitterionic polymer, the advancing contact angle is less than about 20 degrees, and exhibits a tear film break-up time in use of greater than 15 seconds. In another particular embodiment, the polymeric surface modification material is a zwitterionic polymer, the advancing contact angle is less than about 19 degrees, and exhibits a tear film break-up time in use of greater than 15 seconds. In another particular embodiment, the polymeric surface modification material is a zwitterionic polymer, the advancing contact angle is less than about 30 degrees, and exhibits a tear film break-up time in use of greater than 20 seconds. In another particular embodiment, the polymeric surface modification material is a zwitterionic polymer, the advancing contact angle is less than about 25 degrees, and exhibits a tear film break-up time in use of greater than 20 seconds. In another particular embodiment, the polymeric surface modification material is a zwitterionic polymer, the advancing contact angle is less than about 20 degrees, and exhibits a tear film break-up time in use of greater than 20 seconds. In another particular embodiment, the polymeric surface modification material is a zwitterionic polymer, the advancing contact angle is less than about 19 degrees, and exhibits a tear film break-up time in use of greater than 20 seconds. In one embodiment, the article of each of the foregoing examples and embodiments in this paragraph is a contact lens.

In another particular embodiment, the polymeric surface modification material is a zwitterionic polymer, the coefficient of friction is less than 0.1, and exhibits a tear film break-up time in use of greater than 10 seconds. In another particular embodiment, the polymeric surface modification material is a zwitterionic polymer, the coefficient of friction is less than 0.05, and exhibits a tear film break-up time in use of greater than 10 seconds. In another particular embodiment, the polymeric surface modification material is a zwitterionic polymer, the coefficient of friction is less than 0.02, and exhibits a tear film break-up time in use of greater than 10 seconds. In another particular embodiment, the polymeric surface modification material is a zwitterionic polymer, the coefficient of friction is less than 0.1, and exhibits a tear film break-up time in use of greater than 15 seconds. In another particular embodiment, the polymeric surface modification material is a zwitterionic polymer, the coefficient of friction is less than 0.05, and exhibits a tear film break-up time in use of greater than 15 seconds. In another particular embodiment, the polymeric surface modification material is a zwitterionic polymer, the coefficient of friction is less than 0.02, and exhibits a tear film break-up time in use of greater than 15 seconds. In another particular embodiment, the polymeric surface modification material is a zwitterionic polymer, the coefficient of friction is less than 0.1, and exhibits a tear film break-up time in use of greater than 20 seconds. In another particular embodiment, the polymeric surface modification material is a zwitterionic polymer, the coefficient of friction is less than 0.05, and exhibits a tear film break-up time in use of greater than 20 seconds. In another particular embodiment, the polymeric surface modification material is a zwitterionic polymer, the coefficient of friction is less than 0.02, and exhibits a tear film break-up time in use of greater than 20 seconds. In one embodiment, the article of each of the foregoing examples and embodiments in this paragraph is a contact lens.

In another particular embodiment, the polymeric surface modification material is a zwitterionic polymer, the advancing contact angle is less than 30 degrees, the coefficient of friction is less than 0.1, and exhibits a tear-film break-up time in use of greater than 10 seconds. In another particular embodiment, the polymeric surface modification material is a zwitterionic polymer, the advancing contact angle is less than 25 degrees, the coefficient of friction is less than 0.1, and exhibits a tear-film break-up time in use of greater than 10 seconds. In another particular embodiment, the polymeric surface modification material is a zwitterionic polymer, the advancing contact angle is less than 20 degrees, the coefficient of friction is less than 0.1, and exhibits a tear-film break-up time in use of greater than 10 seconds. In another particular embodiment, the polymeric surface modification material is a zwitterionic polymer, the advancing contact angle is less than 19 degrees, the coefficient of friction is less than 0.1, and exhibits a tear-film break-up time in use of greater than 10 seconds. In some of these embodiments, the coefficient of friction is less than 0.05, or less than 0.02. In these and other embodiments, the tear-film break-up time in use may be greater than 15 seconds, or greater than 20 seconds. In one embodiment, the article of each of the foregoing examples and embodiments in this paragraph is a contact lens.

In another particular embodiment, the polymeric surface modification is zwitterionic polymer, the advancing contact angle is less than about 30 degrees, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 25 degrees, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 20 degrees, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens.

In another particular embodiment, the polymeric surface modification is zwitterionic polymer, the advancing contact angle is less than about 19 degrees, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification is zwitterionic polymer, the coefficient of friction is less than 0.1, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.05, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.02, and the surface modification has a depth of penetration of at least about 0.1% of the thickness of the lens below the surface of the lens in a direction normal to the surface of the lens. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification is zwitterionic polymer, the surface modification has a depth of penetration of at least about 0.1% of the thickness of the lens below the surface of the lens in a direction normal to the surface of the lens, and in use exhibits a tear-film break-up time of greater than 10 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the surface modification has a depth of penetration of at least about 0.1% of the thickness of the lens below the surface of the lens in a direction normal to the surface of the lens, and in use exhibits a tear-film break-up time of greater than 15 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the surface modification has a depth of penetration of at least about 0.1% of the thickness of the lens below the surface of the lens in a direction normal to the surface of the lens, and in use exhibits a tear-film break-up time of greater than 20 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification material is a zwitterionic polymer, the advancing contact angle is less than 30 degrees, the coefficient of friction is less than 0.1, and the surface modification has a depth of penetration of at least about 0.1% of the thickness of the lens below the surface of the lens in a direction normal to the surface of the lens. In another particular embodiment, the polymeric surface modification material is a zwitterionic polymer, the advancing contact angle is less than 25 degrees, the coefficient of friction is less than 0.1, and the surface modification has a depth of penetration of at least about 0.1% of the thickness of the lens below the surface of the lens in a direction normal to the surface of the lens. In another particular embodiment, the polymeric surface modification material is a zwitterionic polymer, the advancing contact angle is less than 20 degrees, the coefficient of friction is less than 0.1, and the surface modification has a depth of penetration of at least about 0.1% of the thickness of the lens below the surface of the lens in a direction normal to the surface of the lens. In another particular embodiment, the polymeric surface modification material is a zwitterionic polymer, the advancing contact angle is less than 19 degrees, the coefficient of friction is less than 0.1, and the surface modification has a depth of penetration of at least about 0.1% of the thickness of the lens below the surface of the lens in a direction normal to the surface of the lens. In some of these embodiments, for example, the coefficient of friction is less than 0.05, or less than 0.02. In these and other embodiments, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification material is a zwitterionic polymer, the advancing contact angle is less than about 30 degrees, the surface modification has a depth of penetration of at least about 0.1% of the thickness of the lens below the surface of the lens in a direction normal to the surface of the lens, and exhibits a tear film break-up time in use of greater than 10 seconds. In another particular embodiment, the polymeric surface modification material is a zwitterionic polymer, the advancing contact angle is less than about 25 degrees, the surface modification has a depth of penetration of at least about 0.1% of the thickness of the lens below the surface of the lens in a direction normal to the surface of the lens, and exhibits a tear film break-up time in use of greater than 10 seconds. In another particular embodiment, the polymeric surface modification material is a zwitterionic polymer, the advancing contact angle is less than about 20 degrees, the surface modification has a depth of penetration of at least about 0.1% of the thickness of the lens below the surface of the lens in a direction normal to the surface of the lens, and exhibits a tear film break-up time in use of greater than 10 seconds. In another particular embodiment, the polymeric surface modification material is a zwitterionic polymer, the advancing contact angle is less than about 19 degrees, the surface modification has a depth of penetration of at least about 0.1% of the thickness of the lens below the surface of the lens in a direction normal to the surface of the lens, and exhibits a tear film break-up time in use of greater than 10 seconds. In another particular embodiment, the polymeric surface modification material is a zwitterionic polymer, the advancing contact angle is less than about 30 degrees, the surface modification has a depth of penetration of at least about 0.1% of the thickness of the lens below the surface of the lens in a direction normal to the surface of the lens, and exhibits a tear film break-up time in use of greater than 15 seconds. In another particular embodiment, the polymeric surface modification material is a zwitterionic polymer, the advancing contact angle is less than about 25 degrees, the surface modification has a depth of penetration of at least about 0.1% of the thickness of the lens below the surface of the lens in a direction normal to the surface of the lens, and exhibits a tear film break-up time in use of greater than 15 seconds. In another particular embodiment, the polymeric surface modification material is a zwitterionic polymer, the advancing contact angle is less than about 20 degrees, the surface modification has a depth of penetration of at least about 0.1% of the thickness of the lens below the surface of the lens in a direction normal to the surface of the lens, and exhibits a tear film break-up time in use of greater than 15 seconds. In another particular embodiment, the polymeric surface modification material is a zwitterionic polymer, the advancing contact angle is less than about 19 degrees, the surface modification has a depth of penetration of at least about 0.1% of the thickness of the lens below the surface of the lens in a direction normal to the surface of the lens, and exhibits a tear film break-up time in use of greater than 15 seconds. In another particular embodiment, the polymeric surface modification material is a zwitterionic polymer, the advancing contact angle is less than about 30 degrees, the surface modification has a depth of penetration of at least about 0.1% of the thickness of the lens below the surface of the lens in a direction normal to the surface of the lens, and exhibits a tear film break-up time in use of greater than 20 seconds. In another particular embodiment, the polymeric surface modification material is a zwitterionic polymer, the advancing contact angle is less than about 25 degrees, the surface modification has a depth of penetration of at least about 0.1% of the thickness of the lens below the surface of the lens in a direction normal to the surface of the lens, and exhibits a tear film break-up time in use of greater than 20 seconds. In another particular embodiment, the polymeric surface modification material is a zwitterionic polymer, the advancing contact angle is less than about 20 degrees, the surface modification has a depth of penetration of at least about 0.1% of the thickness of the lens below the surface of the lens in a direction normal to the surface of the lens, and exhibits a tear film break-up time in use of greater than 20 seconds. In another particular embodiment, the polymeric surface modification material is a zwitterionic polymer, the advancing contact angle is less than about 19 degrees, the surface modification has a depth of penetration of at least about 0.1% of the thickness of the lens below the surface of the lens in a direction normal to the surface of the lens, and exhibits a tear film break-up time in use of greater than 20 seconds. In some of these embodiments, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification is zwitterionic polymer, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 10 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 10 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 10 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 15 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 15 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 15 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 20 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 20 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 20 seconds. In this embodiment, for example, the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In another particular embodiment, the polymeric surface modification is zwitterionic polymer, the advancing contact angle is less than about 30 degrees, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 10 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 10 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 10 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 15 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 15 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 15 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.1, the surface modification has a depth of penetration of at least about 0.1% of the thickness of the lens below the surface of the lens in a direction normal to the surface of the lens, and exhibits a tear film break-up time in use of greater than 20 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.05, the surface modification has a depth of penetration of at least about 0.1% of the thickness of the lens below the surface of the lens in a direction normal to the surface of the lens, and exhibits a tear film break-up time in use of greater than 20 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In another particular embodiment, the polymeric surface modification is zwitterionic polymer, the advancing contact angle is less than about 30 degrees, the coefficient of friction is less than 0.02, the surface modification has a depth of penetration of at least about 0.1% of the thickness of the lens below the surface of the lens in a direction normal to the surface of the lens, and exhibits a tear film break-up time in use of greater than 20 seconds. In various embodiments, for example, the contact angle can be less than about 25 degrees, less than about 20 degrees, or less than about 19 degrees, and/or the depth of penetration can be 0.1%, 0.2%, 0.5%, 1%, 2%, 5%, 10%, 20%, 30%, 40% or 45% of the thickness of the lens below the surface of the lens in a direction normal to the surface of the lens. In one embodiment, the article of each of the foregoing examples and embodiments in this paragraph is a contact lens.

In general, grafted polymeric material may be detected in a near-surface zone of the substrate using EDS mapping, XPS, or TOF-SIMS. The sample may be freeze fractured in liquid nitrogen to expose the coating/substrate interface. Fractured surface may then be coated with a thin layer of Au/Pt and observed under a scanning electron microscope with Energy Dispersive X-ray Analyser (EDAX) for element analysis. Suitable instruments include a FEI/Philips XL30 FEG ESEM. In order to assess if the polymeric material extends into the near-surface zone, at least 25, and preferably at least 50, representative locations spaced approximately evenly across the portion of the article carrying the grafted polymer layer should be analyzed to identify a detectable enhancement of polymeric material in the near-surface zone. It is preferred to measure the thickness at representative points across the longest dimension of the portion of the article that is covered with the grafted polymer layer.

As described in greater detail elsewhere herein, incorporation of initiator into the substrate enables polymeric material to be grafted from surface and from within near-surface zone of the substrate. In general, however, it is preferred that polymeric material not extend too far into the substrate; thus, in one embodiment polymeric material is present in the near-surface zone but not at greater depths, i.e., not in the bulk. The maximum depth to which near-surface zone extends is, at least in part, a function of the initiator and the technique used to incorporate initiator in the substrate. Typically, however, it is generally preferred that lower boundary of the near-surface zone not be greater than 20 micrometers from the substrate surface as measured in a direction normal to the surface. By way of example, the lower boundary may not be greater than 15 micrometers from the substrate surface as measured in a direction normal to the surface. By way of further example, the lower boundary may not be greater than 10 micrometers from the substrate surface as measured in a direction normal to the surface. Similarly, the minimum depth of near-surface zone, i.e., the distance of the upper boundary from the substrate surface is, at least in part, also a function of the initiator and the technique used to incorporate initiator in the substrate. Typically, however, the upper boundary will be at least 0.1 micrometers from the substrate surface as measured in a direction normal to the surface. By way of example, the upper boundary may be at least 0.2 micrometers from the substrate surface as measured in a direction normal to the surface. By way of further example, the upper boundary may be at least 0.3 micrometers from the substrate surface as measured in a direction normal to the surface.

Because polymeric material may be grafted from the surface and from within the near-surface zone of the substrate, the original surface of substrate may be difficult to precisely delineate after the polymer is grafted in such embodiments. Nevertheless, a concentration gradient of the grafted polymer (relative to the polymeric material of the substrate) may be observable with the shape of the gradient curve depending upon such variables as the chemical composition of the substrate polymer, the monomer being polymerized, the polymerization initiator, the solvent system and polymerization reaction conditions. In some embodiments, for example, the concentration gradient of the grafted polymer may be approximately linear. In other embodiments, the concentration gradient of the grafted polymer will be exponential. In other embodiments, the concentration gradient of the grafted polymer may be sigmoidal.

Although the shape of the concentration gradient curve for grafted polymer (relative to the polymeric material of the substrate) may vary somewhat for each embodiment, it will generally and gradually decrease as a function of increasing distance from the surface of the modified article in a direction normal to the surface. At a penetration depth of 10% of the maximum penetration depth of the grafted polymer in one embodiment, for example, the concentration of the grafted polymer is at least 50% of the maximum concentration of the grafted polymer (at or near the surface of the modified substrate). Thus, for example, the concentration of the grafted polymer at a penetration depth of 10% of the maximum penetration depth may be at least 60%, at least 70%, at least 80%, or even at least 90% of the maximum concentration of the grafted polymer (at or near the surface of the modified substrate). In general, however, the concentration of the grafted polymer at a penetration depth of 10% of the maximum penetration depth will typically not exceed 95% of the maximum concentration of the grafted polymer (at or near the surface of the modified substrate). Thus, for example, the concentration of the grafted polymer at a penetration depth of 10% of the maximum penetration depth will be less than 85%, less than 75%, less than 65%, or even less than 55% of the maximum concentration of the grafted polymer (at or near the surface of the modified substrate). In each of the foregoing embodiments and examples in this paragraph, the grafted polymer may have a minimum penetration depth of at least 50 nm, 100 nm, 150 nm, 200 nm, 250 nm or more. In general, however, however, the grafted polymer may have a maximum penetration depth of 10 microns, 5 microns, 1 micron, or even less than 500 nm.

At a penetration depth of 25% of the maximum penetration depth of the grafted polymer in one embodiment, for example, the concentration of the grafted polymer is at least 20% of the maximum concentration of the grafted polymer (at or near the surface of the modified substrate). Thus, for example, the concentration of the grafted polymer at a penetration depth of 25% of the maximum penetration depth may be at least 30%, at least 30%, at least 40%, at least 50%, at least 60%, at least 70% or even at least 80% of the maximum concentration of the grafted polymer (at or near the surface of the modified substrate). In general, however, the concentration of the grafted polymer at a penetration depth of 25% of the maximum penetration depth will typically not exceed 85% of the maximum concentration of the grafted polymer (at or near the surface of the modified substrate). Thus, for example, the concentration of the grafted polymer at a penetration depth of 25% of the maximum penetration depth will be less than 85%, less than 75%, less than 65%, or even less than 55% of the maximum concentration of the grafted polymer (at or near the surface of the modified substrate). In each of the foregoing embodiments and examples in this paragraph, the grafted polymer may have a minimum penetration depth of at least 50 nm, 100 nm, 150 nm, 200 nm, 250 nm or more. In general, however, however, the grafted polymer may have a maximum penetration depth of 10 microns, 5 microns, 1 micron, or even less than 500 nm.

At a penetration depth of 50% of the maximum penetration depth of the grafted polymer in one embodiment, for example, the concentration of the grafted polymer is at least 5% of the maximum concentration of the grafted polymer (at or near the surface of the modified substrate). Thus, for example, the concentration of the grafted polymer at a penetration depth of 50% of the maximum penetration depth may be at least 10%, at least 20%, at least 30%, at least 40% or even at least 50% of the maximum concentration of the grafted polymer (at or near the surface of the modified substrate). In general, however, the concentration of the grafted polymer at a penetration depth of 50% of the maximum penetration depth will typically not exceed 55% of the maximum concentration of the grafted polymer (at or near the surface of the modified substrate). Thus, for example, the concentration of the grafted polymer at a penetration depth of 50% of the maximum penetration depth will be less than 45%, less than 35%, less than 25%, or even less than 15% of the maximum concentration of the grafted polymer (at or near the surface of the modified substrate). In each of the foregoing embodiments and examples in this paragraph, the grafted polymer may have a minimum penetration depth of at least 50 nm, 100 nm, 150 nm, 200 nm, 250 nm or more. In general, however, however, the grafted polymer may have a maximum penetration depth of 10 microns, 5 microns, 1 micron, or even less than 500 nm.

At a penetration depth of 75% of the maximum penetration depth of the grafted polymer in one embodiment, for example, the concentration of the grafted polymer is at least 1% of the maximum concentration of the grafted polymer (at or near the surface of the modified substrate). Thus, for example, the concentration of the grafted polymer at a penetration depth of 75% of the maximum penetration depth may be at least 5%, at least 10%, at least 15%, at least 20% or even at least 25% of the maximum concentration of the grafted polymer (at or near the surface of the modified substrate). In general, however, the concentration of the grafted polymer at a penetration depth of 75% of the maximum penetration depth will typically not exceed 30% of the maximum concentration of the grafted polymer (at or near the surface of the modified substrate). Thus, for example, the concentration of the grafted polymer at a penetration depth of 75% of the maximum penetration depth will be less than 25%, less than 20%, less than 15%, or even less than 10% of the maximum concentration of the grafted polymer (at or near the surface of the modified substrate). In each of the foregoing embodiments and examples in this paragraph, the grafted polymer may have a minimum penetration depth of at least 50 nm, 100 nm, 150 nm, 200 nm, 250 nm or more. In general, however, however, the grafted polymer may have a maximum penetration depth of 10 microns, 5 microns, 1 micron, or even less than 500 nm.

Medical Devices

In general, the medical device substrate material comprises any of a wide range of materials selected, for example, from one or more metals, ceramics, glasses, polymers, biological tissues, living or dead, woven and non-woven fibers, semi-metals such as silicon, and combinations thereof. In one embodiment, the substrate is a composite of two or more materials. For example, the substrate may comprise a polymeric coating, also sometimes referred to herein as an "undercoating," or a "precoating" over a metallic, ceramic, glass, polymeric, woven or non-woven fiber or semi-metal core. Alternatively, the substrate may comprise a polymeric material throughout, i.e., from its surface and into its bulk. By way of further example, the substrate may comprise a polymeric coating, overlying a metallic, ceramic, glass, polymeric, woven or non-woven fiber or semi-metal core inner layer which, in turn, overlies a metallic, ceramic, glass, polymeric, woven or non-woven fiber or semi-metal core.

The substrate may be in the form of, or form part of, gels, liquids, films, particles (nanoparticles, microparticles, or millimeter diameter beads), fibers (wound dressings, bandages, gauze, tape, pads, sponges, including woven and non-woven sponges and those designed specifically for dental or ophthalmic surgeries), blood storage bags, surgical, medical or dental instruments, blood oxygenators, stents (including coronary, ureteral, renal, biliary, colorectal, esophageal, pulmonary, urethral, vascular, peripheral, neurovascular), stent grafts (including abdominal, thoracic, neurovascular and peripheral vascular), vena cava filters, endovascular coils, catheters (including central venous, peripheral central, midline, peripheral, tunneled, dialysis access, urinary, neurological, peritoneal, intra-aortic balloon pump, angioplasty balloon, diagnostic, interventional, drug delivery, etc.), catheter connectors and valves (including needleless connectors), intravenous delivery lines and manifolds, drug delivery bags and tubing, implantable sensors (e.g., intravascular, transdermal, intracranial, glucose sensors), diagnostic devices (e.g., microfluidic, microelectromechanical, and optical), ophthalmic devices including contact lenses, intraocular lenses and phacoemulsification devices, or other medical devices used within or in contact with the body or any portion of any of these.

In one particular embodiment, the substrate is an ophthalmic device; more preferably in this embodiment the substrate is a contact lens. It is particularly useful to employ biocompatible materials herein including both soft and rigid materials commonly used for ophthalmic lenses, including contact lenses. The preferred substrates are hydrogel materials, including silicone hydrogel materials. Particularly preferred materials include vinyl functionalized polydimethylsiloxanes copolymerized with hydrophilic monomers as well as fluorinated methacrylates and methacrylate functionalized fluorinated polyethylene oxides copolymerized with hydrophilic monomers. Representative examples of substrate materials for use herein include those disclosed in U.S. Pat. Nos. 5,310,779; 5,387,662; 5,449,729; 5,512,205; 5,610,252; 5,616,757; 5,708,094; 5,710,302; 5,714,557 and 5,908,906, the contents of which are incorporated by reference herein.

A wide variety of materials can be used herein, and silicone hydrogel contact lens materials are particularly preferred. Hydrogels in general are a well known class of materials that comprise hydrated, cross-linked polymeric systems containing water in an equilibrium state. Silicone hydrogels generally have a water content greater than about 5 weight percent and more commonly between about 10 to about 80 weight percent. Such materials are usually prepared by polymerizing a mixture containing at least one silicone-containing monomer and at least one hydrophilic monomer. Typically, either the silicone-containing monomer or the hydrophilic monomer functions as a crosslinking agent (a crosslinker being defined as a monomer having multiple polymerizable functionalities) or a separate crosslinker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; 5,358,995; 5,760,100; 6,039,913; 7,919,136; and 8,044,112; the contents of which are incorporated by reference herein.

Particular examples of bulky monomers are methacryloxypropyl tris(trimethyl-siloxy)silane or tris(trimethylsiloxy)silylpropyl methacrylate, sometimes referred to as TRIS and tris(trimethylsiloxy)silylpropyl vinyl carbamate, sometimes referred to as TRIS-VC and the like. Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like and mixtures thereof.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as HEMA. Examples of such silicone urethanes are disclosed in a variety or publications, including Lai, Yu-Chin, "The Role of Bulky Polysiloxanylalkyl Methacryates in Polyurethane-Polysiloxane Hydrogels," Journal of Applied Polymer Science, Vol. 60, 1193-1199 (1996). PCT Published Application No. WO 96/31792 discloses examples of such monomers, which disclosure is hereby incorporated by reference in its entirety.

Further examples of silicone-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, and tris(pentamethyldisiloxyanyl)-3-methacrylatopropylsilane (T2).

Any suitable siloxane-containing macromer with ethylenically unsaturated group(s) can also be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Still other contact lens formulations are disclosed in U.S. Pat. No. 5,710,302, WO 9421698, EP 406161, JP 2000016905, U.S. Pat. Nos. 5,998,498, 6,087,415, 5,760,100, 5,776,999, 5,789,461, 5,849,811, and 5,965,631, each of which is hereby incorporated by reference in their entireties.

Still other contact lens formulations are disclosed in U.S. Pat. App. Pub. No. 2010/0048847 (e.g., "Filcon II 3"), which disclosure is hereby incorporated by reference in its entirety.

In one particular embodiment, the core polymeric bulk material of the contact lens comprises a silicone elastomer, a silicone hydrogel, a fluorohydrogel, a fluorosilicone hydrogel, poly-2-hydroxyethyl methacrylate (p-HEMA), or combinations thereof.

Representative examples of suitable bulk hydrophilic materials include, but are not limited to, the following materials known by the United States Approved Names of: abafilcon A, acofilcon A, acofilcon B, acquafilcon A, alofilcon A, alphafilcon A, amfilcon A, astifilcon A, atlafilcon A, balafilcon A, bisfilcon A, bufilcon A, comfilcon A, crofilcon A, cyclofilcon A, darfilcon A, delefilcon A, deltafilcon A, deltafilcon B, dimefilcon A, droxifilcon A, efrofilcon A, elastofilcon A, enfilcon A, epsifilcon A, esterifilcon A, etafilcon A, focofilcon A, galyfilcon A, genfilcon A, govafilcon A, hefilcon A, hefilcon B, hefilcon C, hefilcon D, hilafilcon A, hilafilcon B, hioxifilcon A, hioxifilcon B, hioxifilcon C, hioxifilcon D, hydrofilcon A, iberfilcon A, lenefilcon A, licryfilcon A, licryfilcon B, lidofilcon A, lidofilcon B, lotrafilcon A, lotrafilcon B, mafilcon A, mesifilcon A, methafilcon B, mipafilcon A, narafilcon A, narafilcon B, nelfilcon A, nesofilcon A, netrafilcon A, ocufilcon A, ocufilcon B, ocufilcon C, ocufilcon D, ocufilcon E, ocufilcon F, ofilcon A, omafilcon A, oxyfilcon A, pentafilcon A, perfilcon A, petrafocon A-hemlarafilcon A, pevafilcon A, phemfilcon A, phemfilcon B, polymacon A, polymacon B, senofilcon A, shofilcon A, sifilcon A, silafilcon A, siloxyfilcon A, surfilcon A, tasfilcon A, tefilcon A, tetrafilcon A, trifilcon A, uvifilcon A, vasurfilcon A, vifilcon A, vifilcon B, and xylofilcon A.

Representative examples of suitable bulk hydrophobic materials include, but are not limited to, the following materials known by the United States Approved Names of: amefocon A, amsilfocon A, aquilafocon A, arfocon A, cabufocon A, cabufocon B, carbosilfocon A, crilfocon A, crilfocon B, dimefocon A, enflufocon A, enflufocon B, erifocon A, filofocon A, fluorofocon A, flusilfocon A, flusilfocon B, flusilfocon C, flusilfocon D, flusilfocon E, hermafocon A, hexafocon A, hexafocon B, hirafocon A, hofocon A, hybufocon A, itabisfluorofocon A, itafluorofocon A, itafocon A, itafocon B, kolfocon A, kolfocon B, kolfocon C, kolfocon D, lotifocon A, lotifocon B, lotifocon C, melafocon A, migafocon A, nefocon A, nefocon B, nefocon C, onsifocon A, onsifocon B, oprifocon A, oxyflufocon A, paflufocon A, paflufocon B, paflufocon C, paflufocon D, paflufocon E, paflufocon F, paflufocon D-hem-iberfilcon A, pahrifocon A, pasifocon A, pasifocon B, pasifocon C, pasifocon D, pasifocon E, pemufocon A, petrafocon A-hemlarafilcon A, porofocon A, porofocon B, roflufocon A, roflufocon B, roflufocon C, roflufocon D, roflufocon E, rosilfocon A, satafocon A, siflufocon A, silafocon A, sterafocon A, sulfocon A, sulfocon B, telafocon A, tisilfocon A, tolofocon A, trifocon A, unifocon A, vinafocon A, and wilofocon A.

Where the medical device is a contact lens, for example, such lenses can be manufactured employing various conventional techniques, to yield a shaped article having the desired posterior and anterior lens surfaces. Spincasting methods are disclosed in U.S. Pat. Nos. 3,408,429 and 3,660,545 (herein incorporated by reference in their entireties); and static casting methods are disclosed in U.S. Pat. Nos. 4,113,224, 4,197,266 and 5,271,876 (herein incorporated by reference in their entireties). Curing of the monomeric mixture may be followed by a machining operation in order to provide a contact lens having a desired final configuration. As an example, U.S. Pat. No. 4,555,732 (herein incorporated by reference in its entirety) discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge-finishing operations.

For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711; U.S. Pat. No. 4,460,534; U.S. Pat. No. 5,843,346; and U.S. Pat. No. 5,894,002, which are also incorporated herein by reference in their entireties.

Virtually all materials known in the art for making molds can be used to make molds for making contact lenses. For example, polymeric materials, such as polyethylene, polypropylene, polystyrene, PMMA, Topas® COO grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

Reusable molds may also be used and the silicone-hydrogel lens-forming material can be cured actinically under a spatial limitation of actinic radiation to form a silicone hydrogel contact lens. Examples of reusable molds are those disclosed in U.S. Pat. No. 6,627,124; U.S. Pat. No. 6,800,225; and U.S. Pat. No. 7,384,590; which are incorporated herein by reference in their entireties.

In another embodiment, where a lens-forming material is a solution (e.g., dissolved in water, a mixture of water and a water miscible organic solvent, or an organic solvent), solvent-free liquid, or melt of one or more silicone-containing prepolymers with ethylenically unsaturated groups optionally in presence of other components, reusable molds are used and the lens-forming material is cured actinically under a spatial limitation of actinic radiation to form a colored contact lens. Examples of silicone-containing prepolymers include without limitation those disclosed in U.S. Pat. No. 6,039,913; and U.S. Pat. No. 7,091,283, which are incorporated herein by references in their entireties.

In general, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively off the uncrosslinked prepolymer and other residues, using water or a suitable solvent, and can be dried with air. Reusable molds can also be made of Topas® COO grade 8007-S10 (clear amorphous copolymer of ethylene and norbornene) from Ticona GmbH of Frankfurt, Germany and Summit, N.J. Because of the reusability of the mold halves, a relatively high outlay can be expended at the time of their production in order to obtain molds of extremely high precision and reproducibility. Since the mold halves do not touch each other in the region of the lens to be produced, i.e., the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such methods of making contact lenses are described in U.S. Pat. No. 6,627,124; U.S. Pat. No. 6,800,225; and U.S. Pat. No. 7,384,590; which are incorporated by reference in their entireties.

A spatial limitation of actinic radiation (or the spatial restriction of energy impingement) can be effected by masking for a mold that is at least partially impermeable to the particular form of energy used, as illustrated in U.S. Pat. No. 6,627,124; and U.S. Pat. No. 6,800,225 (herein incorporated by reference in their entireties) or by a mold that is highly permeable, at least at one side, to the energy form causing the crosslinking and that has mold parts being impermeable or of poor permeability to the energy, as illustrated in U.S. Pat. No. 6,627,124; U.S. Pat. No. 6,800,225; and U.S. Pat. No. 7,384,590; (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

Surface Modifications

In general, a non-fouling polymeric material is grafted from a medical device substrate, such as a contact lens. Various processes and process steps can be employed in applying the surface modification. The particular process(es) and process step(s) chosen may depend, at least in part, upon the substrates being modified, the polymeric materials being applied and their monomeric precursors, the polymerization technique(s), and/or the desired properties of the modified surface. In some embodiments, for example, a redox initiator is used to graft from functional groups contained within the lens material, such as grafting from hydroxyl groups in the presence of Ce(IV). In some embodiments, for example, a UV initiator present in the lens that is residual from the lens molding process is used to graft a non-fouling polymeric material. In some embodiments, for example, a UV initiator is added to the contact lens during the lens molding process that is, in turn, used to graft a non-fouling polymeric material. In some embodiments, for example, a non-fouling polymeric material is grafted from a contact lens substrate into which one or more polymerization initiators have been incorporated. In some embodiments, for example, the non-fouling polymeric material is grafted from a substrate that is a composite of two or more materials. Combinations of these and other processes and process steps may also be employed.

Preferably, the non-fouling polymeric material that is grafted from the substrate comprises a chain-growth polymer (that is, a polymer or polymer block formed by addition polymerization), or a combination thereof. The chain-growth polymer may be, for example, an addition polymer derived from monomer(s) incorporating double or triple bonds, e.g., an olefin. By way of further example, the chain-growth polymer may comprise an addition polymer derived from a cyclic monomer by means of a ring-opening polymerization reaction. Thus, the polymer may be a chain-growth homopolymer or copolymer. In a preferred embodiment, the polymer is a chain growth addition homopolymer or a chain growth addition copolymer comprising the residue of two or more monomers.

In accordance with one aspect of the present invention, it is generally preferred that the non-fouling polymeric material be prepared without inordinate use of a polyfunctional crosslinking agent. For example, it is generally preferred that the non-fouling polymeric material contain less than 50 mole % of the residue of a polyvalent crosslinker. In one such embodiment, the non-fouling polymeric material contains less than 25 mole % of the residue of a polyvalent crosslinker. In one such embodiment, non-fouling polymeric material contain less than 10 mole % of a polyvalent crosslinker. In one such embodiment, the non-fouling polymeric material contains less than 5 mole % of the residue of a polyvalent crosslinker. In one such embodiment, non-fouling polymeric material contain less than 3 mole % of a polyvalent crosslinker. In one such embodiment, the non-fouling polymeric material contains less than 0.1 mole % of the residue of a polyvalent crosslinker. In one such embodiment, the non-fouling polymeric material contains no residue of a polyvalent crosslinker.

Through grafting, step-growth or chain-growth techniques, the non-fouling polymeric material may comprise any of a range of polymer types or combinations thereof. The polymer backbone may be neutral (e.g., polyalkylene or polyether) or contain permanently charged moieties (e.g., cyclic or acyclic quaternized nitrogen atoms), or even zwitterionic backbones (e.g., phosphorylcholine backbones). In one embodiment, therefore, the non-fouling polymeric material comprises a polymer or copolymer selected from the group consisting of polyamide, polyamine, polyanhydride, polyazine, poly(carbonate), polyester, polyether, polyetheretherketone (PEEK), polyguanidine, polyimide, polyketal, poly(ketone), polyolefin, poly(orthoester), polyphosphazine, polysaccharide, polysiloxane, polysulfone, polyurea, polyurethane, halogenated polymer, silicone, hydrocarbon, ether-ester, ether-amide or ionized polyethylene and combinations thereof.

The polymer may also contain a wide range of pendant (side-chain) groups, hydrophilic and hydrophobic, neutral, anionic, cationic, or mixed charged. For example, the pendant groups may include neutral hydrophilic groups such as hydroxy, oligo(ethylene glycol) and/or poly(ethylene glycol) moieties, or it may include charged groups such as anionic moieties, cationic moieties, and zwitterionic moieties.

Zwitterionic Groups

Zwitterions are molecules that carry formal positive and negative charges on non-adjacent atoms within the same molecule and molecules that may be ionized by addition or removal of an electrophile or a nucleophile, or by removal of a protecting group. Both natural and synthetic polymers, containing zwitterion functionality, have been shown to resist protein adhesion. In one embodiment, the zwitterionic monomer contains a phosphorylcholine moiety, a carboxyammonium moiety, a sulfoammonium moiety, derivatives thereof, or combinations thereof. In one embodiment, the zwitterionic monomer contains a carboxyammonium moiety, a sulfoammonium moiety, derivatives thereof, or combinations thereof. In one embodiment, the zwitterionic monomer contains a sulfobetaine moiety or a carboxybetaine moiety. The zwitterionic polymer may be formed by initiating polymerization with radicals present in the polymeric substrate, in the presence of one or more monomers, such as sulfobetaine methacrylate or carboxybetaine methacrylate monomers.

Polysulfoammonium polymers such as polysulfobetaines, polycarboxyammonium polymers such as polycarboxybetaines and other natural and synthetic zwitterion chemistries can be used to design non-fouling materials for the biomedical applications described herein. Some examples of natural zwitterions chemistries that could be used for non-fouling materials include, but are not limited to, amino acids, peptides, natural small molecules including, but not limited to, N,N,N-trimethylglycine (glycine betaine), trimethylamine oxide (TMAO), dimethylsulfoniopropionate sarcosine, lysergic acid and psilocybin. Additional synthetic zwitterions that could be used to create non-fouling materials, include, but are not limited to, amino-carboxylic acids (carboxybetaines), amino-sulfonic acids (sulfo betaines), cocamidopropyl betaine, quinonoid based zwitterions, decaphenylferrocene, and non-natural amino acids. Natural and synthetic polymers also include mixed charged structures with both positive charged and negative charged moieties on the pendant groups, in the main chains, or at the terminal groups.

Materials containing, or composed of, these natural or synthetic zwitterions, can be grafted from surfaces, particularly the surfaces of medical devices, in order to improve biocompatibility, reduce thrombogenesis (such as on the surface of stents or venous valves), and reduce fouling by proteins or bacteria present in solution. This is particularly applicable for surfaces where non-specific binding of proteins in solution could negatively impact the desired or necessary mechanics of a device.

In one embodiment, the non-fouling polymer contains zwitterionic pendant groups covalently attached, directly or indirectly to the polymer back bone. The zwitterionic pendant groups may have an overall net charge, for instance, by having a divalent center of anionic charge and monovalent center of cationic charge or vice versa, or by having two centers of cationic charge and one center of anionic charge or vice versa. Preferably, however, the zwitterion has no overall net charge and most preferably has a center of monovalent cationic charge and a center of monovalent anionic charge. Additionally, the center(s) of cationic charge are preferably permanent; that is, it is preferably a quaternary nitrogen, quaternary phosphonium or tertiary sulfonium group. Additionally, the center(s) of anionic charge are also permanent; that is, they are completely ionized at physiological pH and are preferably carboxylate, phosphate, phosphonic, phosphonate, sulfate, sulfinic, or sulfonate.

In another embodiment, the polymer contains zwitterionic pendant groups covalently attached, directly or indirectly, to the polymer back bone, and the zwitterion corresponds to Formula ZI-3:

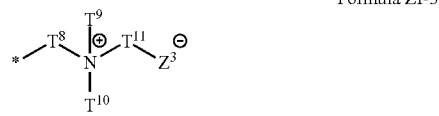

Formula ZI-3 wherein $T^8$ is a bond, hydrocarbylene, substituted hydrocarbylene, heterocyclo, or in combination with $T^9$ and $T^{10}$ and the nitrogen atom to which they are attached form a nitrogen-containing heteroaromatic ring, $T^9$ and $T^{10}$ are independently hydrogen, hydrocarbyl, substituted hydrocarbyl or heterocyclo, or, $T^9$ and $T^{10}$, in combination with $T^8$ and the nitrogen atom to which they are attached form a nitrogen-containing heteroaromatic ring, $T^{11}$ is hydrocarbylene, substituted hydrocarbylene, ether, or oxylated alkylene, $Z^3$ is carboxylate, phosphate, phosphonic, phosphonate, sulfate, sulfinic, or sulfonate, and

* designates the point of covalent attachment, direct or indirect, of the zwitterion of Formula ZI-3 to the polymer backbone.

In certain preferred embodiments in which the polymer contains zwitterionic pendant group corresponding to Formula ZI-3, $T^8$, $T^9$, $T^{10}$, and $T^{11}$ are selected from a more narrow range of substituents, $Z^3$ is carboxylate or sulfate, and the zwitterion corresponds to Formula ZI-4:

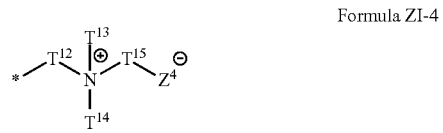

Formula ZI-4 wherein * designates the point of covalent attachment, direct or indirect, of the zwitterion of Formula ZI-4 to the polymer backbone; $T^{12}$ is a bond or —$(CH_2)_m$— with m being 1 to 3; $T^{13}$ and $T^{14}$ are independently hydrogen, alkyl, or substituted alkyl; $T^{15}$ is optionally substituted alkylene, phenylene, ether, or oxylated alkylene; and $Z^4$ is carboxylate or sulfate. For example, in this embodiment, $T^{13}$ and $T^{14}$ may independently be hydrogen or lower alkyl, e.g., methyl, ethyl, or propyl. By way of further example, in this embodiment, $T^{13}$ and $T^{14}$ may independently be hydrogen or lower alkyl, e.g., methyl, ethyl, or propyl. By way of further example, in this embodiment, $T^{15}$ may be —$(CH_2)_n$— with n being 1-8. By way of further example, in this embodiment, $T^{15}$ may be —$(CH_2)_2$— or —$(CH_2)_3$— and $T^{13}$ and $T^{14}$ may be methyl. By way of further example, in this embodiment, $T^{15}$ may be —$(CH_2)_2$— or —$(CH_2)_3$—, $T^{13}$ and $T^{14}$ may be hydrogen or alkyl. By way of further example, in this embodiment, $T^{12}$ may be —$(CH_2)_2$—, $T^{13}$ and $T^{14}$ may be methyl, $T^{15}$ may be —$(CH_2)_2$— and $Z^4$ may be carboxylate. By way of further example, in this embodiment, $T^{12}$ may be —$(CH_2)_2$—, $T^{13}$ and $T^{14}$ may be methyl, $T^{15}$ may be —$(CH_2)_3$— and $Z^4$ may be sulfate.

In certain preferred embodiments in which the polymer contains zwitterionic pendant group corresponding to Formula ZI-3, $T^8$, $T^9$ and $T^{10}$ and the nitrogen atom to which they are attached form a nitrogen-containing heteroaromatic ring. For example, $T^8$, $T^9$ and $T^{10}$ and the nitrogen atom to which they are attached may form an optionally substituted heterocycle, containing a quaternary nitrogen atom. One such embodiment corresponds to Formula ZI-5:

Formula ZI-5 wherein * designates the point of covalent attachment, direct or indirect, of the zwitterion of Formula ZI-5 to the polymer backbone; HET is a heterocycle containing a quaternary nitrogen atom, $T^{15}$ is optionally substituted alkylene, phenylene, ether, or oxylated alkylene; and $Z^4$ is carboxylate or sulfate. For example, in this embodiment, $T^{15}$ may be $-(CH_2)_n-$ with n being 1-8. By way of further example, in this embodiment, $T^{15}$ may be $-(CH_2)_2-$ or $-(CH_2)_3-$ and $Z^4$ may be carboxylate or sulfate. By way of further example, in this embodiment, $T^{15}$ may be $-(CH_2)_3-$ and $Z^4$ may be sulfate. By way of further example, in this embodiment, $T^{15}$ may be $-(CH_2)_2-$ and $Z^4$ may be carboxylate. Exemplary zwitterions corresponding to Formula ZI-5 include zwitterions corresponding to Formulae ZI-6A and ZI-6B:

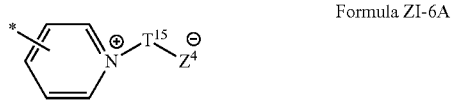

Formula ZI-6A

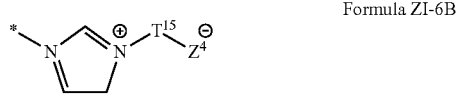

Formula ZI-6B wherein * designates the point of covalent attachment, direct or indirect, of the zwitterion of Formulae ZI-6A and ZI-6B to the polymer backbone; $T^{15}$ is optionally substituted alkylene, phenylene, ether, or oxylated alkylene; and $Z^4$ is carboxylate or sulfate. For example, in this embodiment, $T^{15}$ may be $-(CH_2)_n-$ with n being 1-8. By way of further example, in this embodiment, $T^{15}$ may be $-(CH_2)_2-$ or $-(CH_2)_3-$ and $Z^4$ may be carboxylate or sulfate. By way of further example, in this embodiment, $T^{15}$ may be $-(CH_2)_3-$ and $Z^4$ may be sulfate. By way of further example, in this embodiment, $T^{15}$ may be $-(CH_2)_2-$ and $Z^4$ may be carboxylate.

In one embodiment, the polymer contains zwitterionic pendant groups covalently attached, directly or indirectly, to the polymer back bone, and the zwitterion corresponds to Formula ZI-7

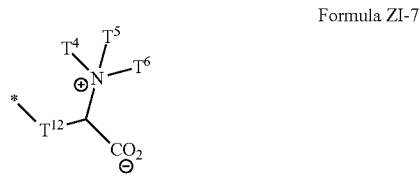

Formula ZI-7 wherein $T^4$, $T^5$ and $T^6$ are independently hydrogen, hydrocarbyl, substituted hydrocarbyl or heterocyclo; $T^{12}$ is a bond, hydrocarbylene, substituted hydrocarbylene, or heterocyclo, and * designates the point of covalent attachment, direct or indirect, of the zwitterion of Formula ZI-7 to the polymer backbone.

In one embodiment, the polymer contains zwitterionic pendant groups covalently attached, directly or indirectly, to the polymer back bone, and the zwitterion corresponds to Formula ZI-1:

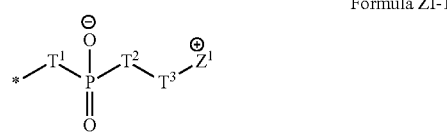

Formula ZI-1 wherein $T^1$ and $T^2$ are independently oxygen, sulfur, NH or a bond, $T^3$ is hydrocarbylene, substituted hydrocarbylene, ether, or oxylated alkylene, $Z^1$ is a moiety comprising a quaternary nitrogen, phosphonium or sulfonium cationic group, and

* designates the point of covalent attachment, direct or indirect, of the zwitterion of Formula ZI-1 to the polymer backbone.

In certain preferred embodiments in which the polymer contains zwitterionic pendant group corresponding to Formula ZI-1, $T^1$ and $T^2$ are oxygen, $Z^1$ is quaternary nitrogen, and the zwitterion corresponds to Formula ZI-2:

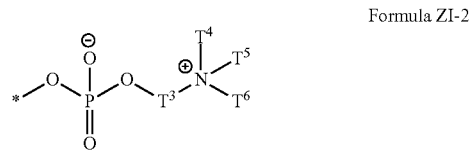

Formula ZI-2 wherein * designates the point of covalent attachment of the zwitterion of Formula ZI-2 to the polymer backbone, $T^3$ is hydrocarbylene, substituted hydrocarbylene, or oxylated alkylene, and $T^4$, $T^5$ and $T^6$ are independently hydrogen, hydrocarbyl, substituted hydrocarbyl or heterocyclo. For example, in this embodiment, $T^3$ may be $-(CH_2)_n-$ with n being 1-8. By way of further example, in this embodiment, $T^4$, $T^5$ and $T^6$ may independently be lower alkyl, e.g., methyl, ethyl or propyl. By way of further example, in this embodiment, $T^3$ may be $-(CH_2)_n-$ with n being 1-3, and $T^4$, $T^5$ and $T^6$ may independently be lower alkyl, e.g., methyl, ethyl or propyl. By way of further example, in this embodiment, $T^3$ may be $-(CH_2)_n-$ with n being 1-3, and one or more of $T^4$, $T^5$ and $T^6$ may be substituted hydrocarbyl such as oligomeric phosphorylcholine (e.g., Formula 9).

Neutral Hydrophilic Pendant Groups

In one embodiment, the polymer contains neutral hydrophilic pendant groups covalently attached, directly or indirectly, to the polymer backbone. Exemplary neutral hydrophilic groups include hydroxy, thiol, oxylated alkyls (e.g., oligoethylene glycol, polyethylene glycol and/or polypropylene glycol), ether, thioether, and the like. In one such specific embodiment, the polymer contains pendant groups comprising alkoxylated moieties corresponding to Formula POA-1:

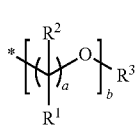

Formula POA-1 wherein a is 1-3, b is 1-8, each $R^1$ and $R^2$ is independently selected from the group consisting of hydrogen, halogen, and optionally substituted lower alkyl, $R^3$ is hydrocarbyl, substituted hydrocarbyl or heterocyclo, and * designates the point of attachment of the moieties corresponding to Formula POA-1 to the remainder of the pendant group and the backbone. By way of example, in one such embodiment, each $R^1$ and $R^2$ are hydrogen, n is 2 or 3. By way of further example, in one such embodiment, each $R^1$ and $R^2$ is hydrogen, n is 2 or 3, and b is 3-5. By way of further example, in one such embodiment, each $R^1$ and $R^2$ is hydrogen, n is 2 or 3, b is 3-5, and $R^3$ is alkyl. In one embodiment, the repeat units are derived from macromonomers containing 2-20 alkylene oxide units.

Repeat Units

In general, homopolymers or copolymers comprising zwitterionic pendant groups, neutral hydrophilic pendant groups, cationic pendant groups and/or anionic pendant groups may be prepared by polymerization of any of a wide range of monomers. In one preferred embodiment, the non-fouling polymeric material is a homopolymer or copolymer comprising repeat units derived from an olefinic monomer. Thus, for example, in one embodiment the non-fouling polymeric material comprises repeat units derived from an olefinic monomer and corresponding to Formula 1:

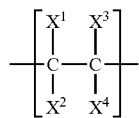

Formula 1 wherein $X^1$ and $X^2$ are independently hydrogen, hydrocarbyl, substituted hydrocarbyl, heterocyclo, or substituted carbonyl, provided, however, $X^1$ and $X^2$ are not each selected from the group consisting of aryl, heteroaryl, and heterosubstituted carbonyl, $X^3$ is hydrogen, alkyl or substituted alkyl, $X^4$ is —$OX^{40}$, —$NX^{41}X^{42}$, —$N^+X^{41}X^{42}X^{43}$, —$SX^{40}$, aryl, heteroaryl or acyl, $X^{40}$ is hydrogen, hydrocarbyl, substituted hydrocarbyl, heterocyclo or acyl, and $X^{41}$, $X^{42}$ and $X^{43}$ are independently hydrogen, hydrocarbyl, substituted hydrocarbyl or heterocyclo.

In certain embodiments in which the non-fouling polymeric material comprises repeat units corresponding to Formula 1, it is preferred that $X^4$ of at least a fraction of the repeat units comprise alkoxylated moieties, zwitterionic moieties, anionic moieties, or cationic moieties. In such embodiments, for example, $X^1$ and $X^2$ may be hydrogen, and the polymer comprises repeat units corresponding to Formula 2:

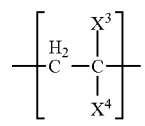

Formula 2 wherein $X^3$ is hydrogen, alkyl or substituted alkyl, and $X^4$ is a pendant group comprising an oxylated alkylene moiety, a zwitterionic moiety, an anionic moiety, or a cationic moiety. For example, $X^3$ may be hydrogen or lower alkyl. By way of further example, $X^4$ may be a pendant group comprising an oxylated alkylene moiety corresponding to Formula POA-1. By way of further example, the repeat unit of Formula 2 may be zwitterionic repeat unit comprising a zwitterionic moiety corresponding to Formula ZI-1, ZI-2, ZI-3, ZI-4, ZI-5, ZI-6A, ZI-6B, or ZI-7. By way of further example, the repeat unit of Formula 2 may be a cationic repeat unit. By way of further example, the repeat unit of Formula 2 may be an anionic repeat unit. By way of further example, $X^3$ may be hydrogen or methyl and $X^4$ may be a pendant group comprising an oxylated alkylene moiety corresponding to Formula POA-1 or a zwitterionic moiety corresponding to Formula ZI-1, ZI-2, ZI-3, ZI-4, ZI-5, ZI-6A, ZI-6B, or ZI-7.

In one presently preferred embodiment, the non-fouling polymeric material comprises repeat units corresponding to Formula 2 wherein $X^4$ is acyl and the repeat units correspond to Formula 3:

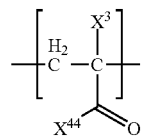

Formula 3 wherein $X^{44}$ comprises an oxylated alkylene moiety, a zwitterionic moiety, an anionic moiety, or a cationic moiety. For example, $X^{44}$ may be —$OX^{45}$, —$NX^{45}X^{46}$ or —$SX^{45}$, wherein $X^{45}$ is a substituted hydrocarbyl or heterocyclo moiety comprising an oxylated alkylene moiety, a zwitterionic moiety, an anionic moiety, or a cationic moiety, and $X^{46}$ is hydrogen, hydrocarbyl, substituted hydrocarbyl or heterocyclo. For example, $X^3$ may be hydrogen or lower alkyl. By way of further example, $X^{44}$ may be —$OX^{45}$, or —$NHX^{45}$. By way of further example, $X^{44}$ may be —$OX^{45}$, or —$NHX^{45}$ wherein $X^{45}$ comprises an oxylated alkylene moiety corresponding to Formula POA-1. By way of further example, $X^{44}$ may be —$OX^{45}$, or —$NHX^{45}$ wherein $X^{45}$ comprises a zwitterionic moiety corresponding to Formula ZI-1, ZI-2, ZI-3, ZI-4, ZI-5, ZI-6A, ZI-6B, or ZI-7. By way of further example, the repeat unit of Formula 3 may be a cationic repeat unit. By way of further example, the repeat unit of Formula 3 may be an anionic repeat unit. By way of further example, $X^3$ may be hydrogen or methyl and $X^{44}$ may comprise an oxylated alkylene moiety corresponding to Formula POA-1 or a zwitterionic moiety corresponding to Formula ZI-1, ZI-2, ZI-3, ZI-4, ZI-5, ZI-6A, ZI-6B, or ZI-7. In one particularly preferred embodiment, the polymer contains repeat units corresponding to Formula 3 and $X^{44}$ is —$O(CH_2)_2N^+(CH_3)_2(CH_2)_nSO_3^-$, —$O(CH_2)_2N^+(CH_3)_2(CH_2)_nCO_2^-$, —$NH(CH_2)_3N^+(CH_3)_2(CH_2)_nCO_2^-$, or —$NH(CH_2)_3N^+(CH_3)_2(CH_2)_nSO_3$, wherein n is 1-8. In one embodiment, the polymer contains repeat units corresponding to Formula 3 and $X^{44}$ is —$NH(CH_2)_mN(CH_2)_nCH_3(CH_2)_pSO_3$, —$NH(CH_2)_mN(CH_2)_n$ $CH_3(CH_2)_pCO_2$, $-NH(CH_2)_mN^+[(CH_2)_nCH_3]_2(CH_2)_pSO_3$, $-NH(CH_2)N^+[(CH_2)_nCH_3]_2(CH_2)_pCO_2$, $-NH(CH_2)_mN$-cyclo-$(CH_2)_pCO_2$, or $-NH(CH_2)_m$Ncyclo-$(CH_2)_pSO_3$, (Ncyclo is a heterocyclic structure or a heterocyclic derivative containing at least one nitrogen element), wherein m is 1-8; n is 0-5; and p is 1-8. In one embodiment, the polymer contains repeat units corresponding to Formula 3 and $X^{44}$ is $-O(CH_2)_mN(CH_2)_nCH_3(CH_2)_pSO_3$, $-O(CH_2)_mN(CH_2)_nCH_3(CH_2)_pCO_2$, $-O(CH_2)_mN^+[(CH_2)_nCH_3]_2(CH_2)_pSO_3$, $-O(CH_2)N^+[(CH_2)_nCH_3]_2(CH_2)_pCO_2$, $-O(CH_2)_m$Ncyclo-$(CH_2)_pCO_2$, or $-O(CH_2)_m$Ncyclo-$(CH_2)_pSO_3$ wherein m is 1-8; n is 0-5; and p is 1-8. In one embodiment, the polymer contains repeat units corresponding to Formula 3 and $X^{44}$ is $-O(CH_2)_2N^+(CH_3)_2(CH_2)_3SO_3$, $-O(CH_2)_2N^+(CH_3)_2(CH_2)_2CO_2$, $-NH(CH_2)_2N^+(CH_3)_2(CH_2)_3SO_3$, $-NH(CH_2)_2N^+(CH_3)_2(CH_2)_2CO_2$, $-NH(CH_2)_3N^+(CH_3)_2(CH_2)_3SO_3$, $-NH(CH_2)_3N^+(CH_3)_2(CH_2)_2CO_2$, $-O(CH_2)_2N^+(CH_2CH_3)_2(CH_2)_3SO_3$, $-O(CH_2)_2N^+(CH_2CH_3)_2(CH_2)_2CO_2$, $-O(CH_2)_2N^+(CH_2CH_2CH_2CH_3)_2(CH_2)_3SO_3$, $-O(CH_2)_2N^+(CH_2CH_2CH_2CH_3)_2(CH_2)_2CO_2$ or $-NH(CH_2)_3$Ncyclo-$(CH_2)_3SO_3$.

In one preferred embodiment, the non-fouling polymeric material is a zwitterionic polymer or copolymer. For example, the non-fouling polymeric material may comprise carboxybetaine repeat units and/or sulfobetaine repeat units. Alternatively, the non-fouling polymeric material may be a polyampholyte, containing anionic and cationic repeat units. Optionally, the non-fouling polymer may contain poly(ethylene oxide) repeat units and/or other neutral olefinic repeat units. Thus, for example, in one preferred embodiment, the non-fouling polymeric material is a zwitterionic polymer or copolymer comprising the repeat units of Formula 4:

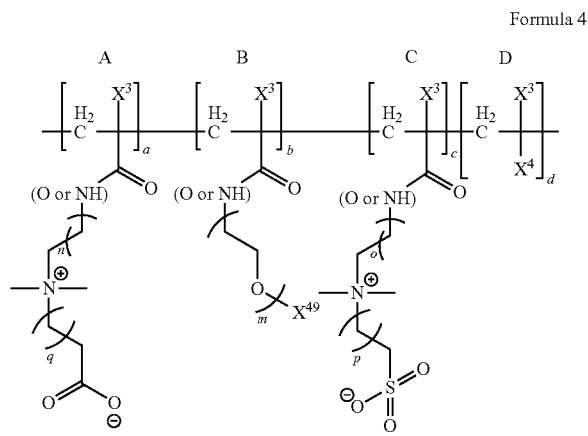

Formula 4 a is 0-1; b is 0-1; c is 0-1; d is 0-1; m is 1-20; n and o are independently 0-11; p and q are independently 0-11; $X^3$ is hydrogen, alkyl or substituted alkyl, $X^4$ is $-OX^{40}$, $-NX^{41}X^{42}$, $-SX^{40}$, aryl, heteroaryl or acyl; $X^{40}$ is hydrogen, hydrocarbyl, substituted hydrocarbyl, heterocyclo or acyl; $X^{41}$ and $X^{42}$ are independently hydrogen, hydrocarbyl, substituted hydrocarbyl or heterocyclo; and $X^{49}$ is hydrogen, hydrocarbyl or substituted hydrocarbyl, provided the sum of a, b, c and d is greater than 0 and $X^4$ of repeat unit D differs from the corresponding pendant group of repeat units A, B and C. In one such embodiment, $X^3$ is hydroxy-substituted alkyl such as hydroxypropyl.

In certain embodiments, the non-fouling polymeric material is a homopolymer or copolymer comprising repeat units corresponding to Formula 5, Formula 6, Formula 7, Formula 8, or Formula 9:

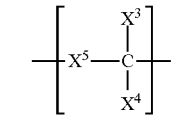

Formula 5

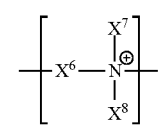

Formula 6

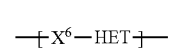

Formula 7

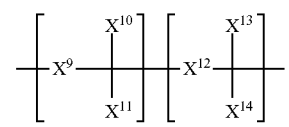

Formula 8

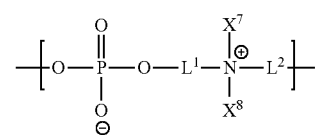

Formula 9

HET is part of a heterocyclic structure, $X^3$ is hydrogen, alkyl or substituted alkyl, $X^4$ is $-OX^{40}$, $-NX^{41}X^{42}$, $-SX^{40}$, aryl, heteroaryl or acyl, $X^5$ is ester, anhydride, imide, amide, ether, thioether, thioester, hydrocarbylene, substituted hydrocarbylene, heterocyclo, urethane, or urea;

$X^6$ is hydrocarbylene, substituted hydrocarbylene, heterocyclo, amide, anhydride, ester, imide, thioester, thioether, urethane, or urea;

$X^7$ is hydrogen, alkyl or substituted alkyl;

$X^8$ is an anionic moiety;

$X^9$ is hydrocarbylene, substituted hydrocarbylene, heterocyclo, amide, anhydride, ester, imide, thioester, thioether, urethane, or urea;

$X^{10}$ is hydrogen, alkyl or substituted alkyl;

$X^{11}$ is a cationic moiety;

$X^{12}$ is hydrocarbylene, substituted hydrocarbylene, heterocyclo, amide, anhydride, ester, imide, thioester, thioether, urethane, or urea;

$X^{13}$ is hydrogen, alkyl or substituted alkyl;

$X^{14}$ is an anionic moiety;

$L^1$ and $L^2$ are independently hydrocarbylene, substituted hydrocarbylene, heterocyclo, amide, anhydride, ester, imide, thioester, thioether, urethane, or urea; and $X^{40}$ is hydrogen, hydrocarbyl, substituted hydrocarbyl, heterocyclo or acyl, and $X^{41}$ and $X^{42}$ are independently hydrogen, hydrocarbyl, substituted hydrocarbyl or heterocyclo.

In one embodiment, the non-fouling polymeric material comprises repeat units corresponding to Formula 7 wherein the heterocycle, HET corresponds to Formulae 10, 11 or 12:

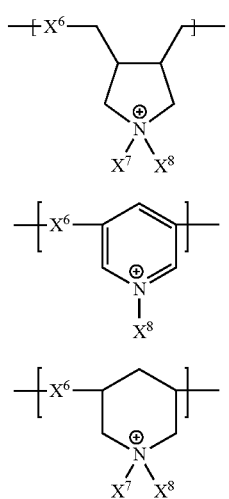

Formula 10

Formula 11

Formula 12 wherein $X^6$ is hydrocarbylene, substituted hydrocarbylene, heterocyclo, amide, anhydride, ester, imide, thioester, thioether, urethane, or urea; $X^7$ is hydrogen, alkyl or substituted alkyl; and $X^8$ is an anionic moiety.

Suitable comonomers include, but are not limited to, acrylates, acrylamides, vinyl compounds, multifunctional molecules, such as di-, tri-, and tetraisocyanates, di-, tri-, and tetraols, di-, tri-, and tetraamines, and di-, tri-, and tetrathiocyanates; cyclic monomers, such as lactones and lactams, and combination thereof. In the interests of brevity, exemplary methacrylate monomers are listed below (but it should be understood that analogous acrylate, acrylamide and methacrylamide monomers may be similarly listed and are similarly included):

Charged methacrylates or methacrylates with primary, secondary or tertiary amine groups, such as, 3-sulfopropyl methacrylate potassium salt, (2-dimethylamino)ethyl methacrylate) methyl chloride quaternary salt, [2-(methacryloyloxy)ethyl]trimethyl-ammonium chloride, methacryloyl chloride, [3-(methacryloylamino)propyl]-trimethylammonium chloride), 2-aminoethyl methacrylate hydrochloride, 2-(diethylamino)ethyl methacrylate, 2-(dimethylamino)ethyl methacrylate, 2-(tert-butylamino)ethyl methacrylate, and 2-(tert-butylamino-ethyl methacrylate.

Alkyl methacrylates or other hydrophobic methacrylates, such as ethyl methacrylate, butyl methacrylate, hexyl methacrylate, 2-ethylhexyl methacrylate, methyl methacrylate, lauryl methacrylate, isobutyl methacrylate, isodecyl methacrylate, phenyl methacrylate, decyl methacrylate, 3,3,5-trimethylcyclohexyl methacrylate, benzyl methacrylate, cyclohexyl methacrylate, stearyl methacrylate, tert-butyl methacrylate, tridecyl methacrylate, 2-naphthyl methacrylate, 2,2,3,3-tetrafluoropropyl methacrylate, 1,1,1,3,3,3-hexafluoroisopropyl methacrylate, 2,2,2-trifluoroethyl methacrylate, 2,2,3,3,3-pentafluoropropyl methacrylate, 2,2,3,4,4,4-hexafluorobutyl methacrylate, 2,2,3,3,4,4,4-heptafluorobutyl methacrylate, 2,2,3,3,4,4,5,5-octafluoropentyl methacrylate, 3,3,4,4,5,5,6,6,7,7,8,8,8-tridecafluorooctyl methacrylate, and 3,3,4,4,5,5,6,6,7,7,8,8,9,9,10,10,10-heptadecafluorodecyl methacrylate.

Reactive or crosslinkable methacrylates, such as 2-(trimethylsilyloxy)ethyl methacrylate, 3-(trichlorosilyl)propyl methacrylate, 3-(trimethoxysilyl)propyl methacrylate, 3-[tris(trimethylsiloxy)silyl]propyl methacrylate, trimethylsilyl methacrylate, allyl methacrylate, vinyl methacrylate, 3-(acryloyloxy)-2-hydroxypropyl methacrylate, 3-(diethoxymethylsilyl)propyl methacrylate 3-(dimethylchlorosilyl)propyl methacrylate 2-isocyanatoethyl methacrylate, glycidyl methacrylate, 2-hydroxyethyl methacrylate, 3-chloro-2-hydroxypropyl methacrylate, Hydroxybutyl methacrylate, glycol methacrylate, hydroxypropyl methacrylate, and 2-hydroxypropyl 2-(methacryloyloxy)ethyl phthalate.

Other methacrylates, such as ethylene glycol methyl ether methacrylate, di(ethylene glycol) methyl ether methacrylate, ethylene glycol phenyl ether methacrylate, 2-butoxyethyl methacrylate, 2-ethoxyethyl methacrylate, and ethylene glycol dicyclopentenyl ether methacrylate.

Multifunctional monomers, such as di, tri, or tetraacrylates and di, tri, or tetraacrylamides can be used to form highly branched structures which can provide a higher concentration of non-fouling groups on the surface. As previously noted, the non-fouling polymeric material may contain a non-zwitterionic non-fouling material, alone or in combination with a zwitterionic material. These non-fouling groups may have varying degrees of non-fouling performance in a range of environments. Suitable non-zwitterionic materials include, but are not limited to, polyethers, such as polyethylene glycol, poly(ethylene oxide-co-propylene oxide) (PEO-PPO) block copolymers, polysaccharides such as dextran, hydrophilic polymers such as polyvinylpyrrolidone (PVP) and hydroxyethyl-methacrylate (HEMA), acrylonitrile-acrylamide copolymers, heparin, heparin fragments, derivatized heparin fragments, hyaluronic acid, mixed charge materials, and materials containing hydrogen bond accepting groups, such as those described in U.S. Pat. No. 7,276,286 (herein incorporated by reference in its entirety). Suitable polymer structures included, but are not limited to, polymers or copolymers containing monomers of Formula I wherein ZI is replaced by a non-zwitterionic, non-fouling head group.

In one embodiment, the non-fouling material is a polymer containing repeat units derived from sulfobetaine-containing and/or carboxybetaine-containing monomers. Examples of monomers include sulfobetaine methacrylate (SBMA), sulfobetaine acrylamide, sulfobetaine methacrylamide, carboxybetaine methacrylate (CBMA), carboxybetaine acrylamide and carboxybetaine methacrylamide. Examples of such polymers include, but are not limited to, poly(carboxy betaine methacrylate) (polyCBMA), poly(carboxybetaine acrylamide), poly(carboxybetaine methacrylamide) poly(sulfobetaine methacrylate) (polySBMA), poly(sulfobetaine acrylamide), and poly(sulfobetaine methacrylamide). In another embodiment, the non-fouling material polymer is a polymer containing the residue of CBMA or SBMA and one or more additional monomers. The additional monomers can be zwitterionic or non-zwitterionic monomers.

In some embodiments, it is preferred to have use zwitterionic polymers that possess permanently charged groups, which, without being bound by any theory, may improve non-fouling performance because the charged groups are ionically solvated with water. The presence of commonly used groups which can have permanent charges in the zwitterionic polymers can be detected by using XPS to analyze the elements present in the top approximately 1-50 nm of the surface. One representative group commonly used in zwitterions is nitrogen in quaternary amine groups. In sulfobetaine, elemental signal of nitrogen may be approximately equivalent to a signal for sulfur. Further, techniques such as TOF-SIMS may be used to identify zwitterionic groups in the grafted polymer layer. In some preferred embodiments, the grafted polymer layer contains XPS signals of nitrogen, and optionally sulfur.

In general, the grafted polymeric material may comprise repeat units corresponding to any of Formulae 1 to 12. By way of further example, the grafted polymeric material may comprise a zwitterionic polymer. By way of further example, polymeric material may comprise repeat units corresponding to Formula 1. By way of further example, the grafted polymeric material may comprise repeat units corresponding to Formula 2. By way of further example, the grafted polymeric material may comprise repeat units corresponding to Formula 3. By way of further example, the grafted polymeric material may comprise repeat units corresponding to Formula 4. Additionally, the grafted polymeric material may comprise, as pendant groups, any of the pendant groups disclosed herein. Thus, for example, the grafted polymeric material may comprise pendant groups corresponding to any of Formulae ZI-1 to ZI-7 or POA-1. In one particularly preferred embodiment, the grafted polymeric material corresponds to Formula 1 and comprises zwitterionic pendant groups. In another particularly preferred embodiment, the grafted polymeric material corresponds to Formula 3 and comprises sulfobetaine or carboxybetaine pendant groups. In one especially preferred embodiment, the grafted polymeric material comprises repeat units derived from sulfobetaine methacrylate, sulfobetaine acrylate, sulfobetaine acrylamide, sulfobetaine methacrylamide, carboxybetaine methacrylate, carboxybetaine acrylate, carboxybetaine acrylamide, or carboxybetaine methacrylamide monomers. In general, the height and any branching of the grafted polymeric material can help to overcome surface irregularities and defects, and increased branching may reduce the ability of fouling materials to penetrate the non-fouling layer.

Polymerization

The polymeric surface modifications of the present disclosure may be formed by synthetic means including, but not limited to, free radical polymerization, ionic polymerization, atom transfer radical polymerization (ATRP), nitroxide mediated polymerization (NMP), reversible addition-fragmentation polymerization (RAFT), ring opening metathesis polymerization (ROMP), telluride mediated polymerization (TERP) or acyclic diene metathesis polymerization (ADMET), and UV, thermal, or redox free radical initiated polymerization. In a preferred embodiment, the polymer is formed using an oxidizing agent and a reducing agent, in combination, i.e., a redox pair, as the polymerization initiator in a redox free radical polymerization.

In some embodiments, it is preferable that initiators and ligands often used in ATRP such as bromine- and chlorine-containing initiators and ligands such as bipyridine are not used in the process as they may be non-biocompatible or toxic at certain levels. Representative bromide or chloride containing compounds or residues to be avoided include tert-butyl 2-bromopropionate, tert-butyl 2-bromoisobutyrate, hydroxyethyl 2-bromopropionate, hydroxyethyl 2-bromoisobutyrate, vinyl chloroacetate, allyl chloroacetate, glycidyl 2-bromopropionate, glycidyl 2-bromoisobutyrate, 4-cyanobenzyl bromide, bromoacetonitrile and 2-bromocyanopropane. In further embodiments, it is preferred not to have a detectable level of bipyridine in the polymer modified article or in aqueous or organic extractions of the polymer modified article. In further embodiments, it is preferred not to have a detectable level of bromine in the polymer modified article or in aqueous or organic extractions of the polymer modified article. Bipyridine and bromine can be detected, for example, with HPLC or UV analysis. In some embodiments, it is preferable to have a surface modified contact lens that does not contain any residual bromide. Preferably, the concentration of bromide or chloride is less than 1 ppm, 5 ppm, 10 ppm, or 50 ppm. Preferably, no bromide or chloride could be detected by XPS, SEM-EDS, and other elemental analysis methods.

As noted above, the general procedure described herein can be modified as necessary to accommodate different substrate materials, initiators systems, and/or monomer compositions. In some embodiments, for example, it may be desirable to incorporate high concentrations of the initiator into and/or onto the substrate or undercoating layer. High initiator concentrations may result in highly densely coated surfaces which improves the non-fouling activity of the composition. For example, highly densely coated surfaces contain polymer chains that reduce penetration of fouling molecules into the coating. Without being bound to any particular theory it is presently theorized that a reservoir of initiator incorporated in the substrate may enhance re-initiation and branching of non-fouling polymer from the surface and near the surface of the substrate. This re-initiation, in turn, may increase the thickness of the non-fouling polymer (in other words, the distance the non-fouling polymer stretches above the substrate in a direction normal to the substrate surface) as well as the degree of branching.

In accordance with the present disclosure, processes described herein involve applying a surface modification to medical device, such as a contact lens (e.g., a silicone hydrogel contact lens). For instance, the processes generally involve contacting the contact lens with a polymerization solution as described herein. In one embodiment, contacting of a contact lens with a polymeric surface modification solution can occur by dipping or submerging the lens into the solution or by spraying the lens with the solution. One exemplary surface modification process involves solely dip-modification and optionally dip-rinsing steps. Another exemplary surface modification process involves solely spray-modification and spray-rinsing steps. However, a number of alternatives involve various combinations of spray- and dip-modification and/or rinsing steps may be designed by a person having ordinary skill in the art.

For example, a solely dip-modification process for forming a surface modification as described herein involves the steps of: (a) immersing a contact lens in a surface modification solution; and (b) optionally rinsing the mold half by immersing it in water; and (c) optionally repeating steps (a) to (b) for a number of times. A thicker surface modification can be produced by repeating steps (a) to (b) preferably for a number of times. Other steps may also be involved.

In some embodiments, incorporation of initiator into the substrate enables polymeric material to be grafted from the substrate surface and from within a near-surface zone beneath the substrate surface. The maximum depth to which near-surface zone extends, i.e., the distance of the lower boundary of the near-surface zone as measured from the substrate surface is, at least in part, a function of the initiator and the technique used to incorporate initiator in the substrate. Typically, however, it is generally preferred that the lower boundary not be greater than 1%, 5%, 10%, 20%, 30%, 45% of the thickness of the contact lens. Similarly, the minimum depth of near-surface zone, i.e., the distance of the upper boundary of the near-surface zone from the substrate surface is, at least in part, also a function of the initiator and the technique used to incorporate initiator in the substrate. By way of example, the upper boundary may be at least 1% from the substrate surface. By way of further example, the upper boundary may be at least 45% from the substrate surface.

Typically, however, it is generally preferred that the lower boundary not be greater than 1 micrometer as a dry material or 20 micrometers as a hydrated material from the substrate surface. By way of example, the lower boundary may not be greater than 15 micrometers from the hydrated substrate surface. By way of further example, the lower boundary may not be greater than 10 micrometers from the hydrated substrate surface. Similarly, the minimum depth of near-surface zone, i.e., the distance of the upper boundary of the near-surface zone from the substrate surface is, at least in part, also a function of the initiator and the technique used to incorporate initiator in the substrate. Typically, however, the upper boundary will be at least 0.1 micrometers from the substrate surface. By way of example, the upper boundary may be at least 0.2 micrometers from the substrate surface. By way of further example, the upper boundary may be at least 0.3 micrometers from the substrate surface.

To induce small polymerization initiator molecules to concentrate at or near the substrate surface, where polymerization is initiated and propagated, polymerization mixture solvent systems with surface tensions of a magnitude differing from the surface energy of the substrate and one or more polymerization initiators having limited solubility in the polymerization mixture solvent system are selected. The surfaces of the substrate from which the non-fouling material is to be grafted surfaces may be hydrophobic or hydrophilic, and the polymerization mixture solvent system may be aqueous, comprise polar organic solvents, aqueous mixtures of polar organic solvents, or aqueous mixtures of any organic compound designed to modify the surface tension of aqueous solutions. Optionally, for hydrophobic substrates, hydrophobic initiator(s) and hydrophilic solvent systems, e.g., aqueous media are selected. Preferably, if the substrate is hydrophilic, at least one hydrophilic initiator and a non-polar organic solvent system is selected.

In the embodiments in which the initiator(s) are incorporated into the substrate, they preferably have limited solubility in the solvent system comprised by the polymerization mixture and include any of the initiators identified herein. In general, it is preferred that the incorporated initiator(s) have a 10 hour T1/2 decomposition temperature of 25-175° C. In one particular embodiment, the incorporated initiator(s) have a 10 hour T1/2 decomposition temperature of 70-130° C. Advantageously, having a 10 hour T1/2 decomposition temperature of 70-130° C. tends to increase the density of interfacial initiation events from the redox reaction and effectively outcompete thermal initiation.

As described elsewhere herein, the initiator may comprise a redox pair; in such embodiments, at least one member of such pair has such a limited solubility in the polymerization mixture solvent system. In one embodiment, both members of the redox pair have limited solubility in the polymerization mixture solvent system. In an alternative embodiment, one member of the pair is soluble in the polymerization mixture solvent system but the other has limited solubility in the polymerization mixture solvent system. Without being bound to any particular theory, it is presently believed that when one member of a redox pair is soluble in the polymerization mixture solvent system and the other has limited solubility in the polymerization mixture solvent system, the two are phase separated and initiation is enhanced at the interface of the two phases which tends to decrease solution polymerization and increase grafting at or near the substrate surface. Thus, for example, either member of the redox pair may be hydrophobic and either member of the pair may be hydrophilic, provided at least one of the members has limited solubility in the polymerization mixture solvent system. In one preferred embodiment, a hydrophobic oxidizer is paired with a hydrophilic reducing agent. In another preferred embodiment, a hydrophilic oxidizer is paired with a hydrophobic reducing agent. For example, in one embodiment, the redox pair comprises a peroxide and a reducing agent wherein the peroxide has limited solubility in the polymerization solvent system and the reducing agent has high solubility in the polymerization solvent system. By way of further example, in certain embodiments, the peroxide has a log P partition coefficient greater than or equal to 3 for hydrophobic substrates and phases and a log P partition coefficient less than 3 for hydrophilic substrates and phases. By way of further example, in certain embodiments, the peroxide has a log P partition coefficient greater than or equal to 5 for hydrophobic substrates and phases and a log P partition coefficient less than 1 for hydrophilic substrates and phases. By way of further example, in certain embodiments, the peroxide has a log P partition coefficient greater than or equal to 7 for hydrophobic substrates and phases and a log P partition coefficient less than −1 for hydrophilic substrates and phases. By way of further example, in certain embodiments, the peroxide has a log P partition coefficient greater than or equal to 9 for hydrophobic substrates and phases and a log P partition coefficient less than −3 for hydrophilic substrates and phases.

In one embodiment, an initiator is incorporated into the substrate by initially incorporating an initiator-precursor into the substrate and activating the initiator-precursor to an initiator.

Imbibing with Initiator

In accordance with one aspect of the present invention, the polymerization initiator(s) may be incorporated into and/or onto the substrate by various techniques. In one such method, the substrate (including, in some embodiments, substrates having precoat or undercoat as previously described) is imbibed with the polymerization initiator; that is, the polymerization initiator is absorbed into the substrate. In one embodiment, the initiator(s), i.e., an initiator or a mixture of different initiators, is introduced into and/or onto the substrate's surface by physio-adsorption, wherein the initiator is dissolved in a solvent or combination of solvents and the substrate (with or without an undercoating layer) is submerged in the mixture for a time and at a temperature to achieve sufficient absorption by the substrate. The substrate is allowed to swell ultimately imbibing initiator into the substrate. In general, the amount of initiator incorporated into a substrate during the soak will, at least in part, be a function of the, solubility of the initiator in the solvent system, solubility of the initiator in the substrate as well as the soak time, temperature and concentration of the initiator in the solution, as well as the chemical composition of the substrate and the initiator. In some embodiments, the substrate is imbibed with the initiator and also imbibed with the monomer (as described below); for example, the initiator and the monomer can be combined in a single solution (optionally, but preferably, including a solvent or solvent system) and the substrate immersed in the solution.

In a preferred embodiment, the surface of the substrate to be imbibed with the polymerization initiator(s) comprises a polymer, natural or synthetic. In an alternative embodiment, the substrate is an imbibable material selected from among polymers, natural or synthetic, biological tissues, living or dead, woven non-woven fibers, and combinations thereof. Certain (uncoated) substrates such as a metal, ceramic, glass, and semi-metallic substrates lack the capacity to absorb sufficient initiator. In general, therefore, for these substrates it is preferred to precoat the surface of the metal, ceramic, glass or semi-metallic substrate with an undercoating or precoating, from which the polymeric material may be grafted. For example, metal, ceramic, glass, and semi-metallic substrates may be precoated with a polymer selected from polyamide, polyamine, polyanhydride, polyazine, poly(carbonate), polyester, polyether, polyetheretherketone (PEEK), polyguanidine, polyimide, polyketal, poly(ketone), polyolefin, poly(orthoester), polyphosphazine, polysaccharide, polysiloxane, polysulfone, polyurea, polyurethane, halogenated polymer, silicone, aldehyde crosslinked resin, epoxy resin, phenolic resin, latex, or a copolymer or blend thereof, and the precoated substrate is then imbibed as previously described.

The quantity of initiator introduced to the substrate can be controlled by changing the concentration of the initiator in the solvent solution and/or by changing the amount of time the substrate is allowed to soak in the initiator solution during one initiator imbibing period or by repeating any number of initiator imbibing periods as required. Temperature is not narrowly critical, with temperatures in the range of room temperature to elevated temperatures being typical. When utilizing multiple periods of initiator imbibing, the initiator used in the subsequent imbibing periods can be the same as, different from, or a mixture with the initiator used in the previous initiator imbibing period. In general, the substrate is immersed in the initiator-containing solution for at least several seconds before polymerization is initiated. In some embodiments, the substrate is immersed in the initiator-containing solution for longer times. For example, the substrate may be immersed in the initiator-containing solution for at least several minutes. By way of further example, the substrate may be immersed in the initiator-containing solution for at least about 15 minutes before polymerization is initiated. In some embodiments, the substrate will be immersed in the initiator-containing solution for at least 1 hour at room temperature or elevated temperatures for initiators having a 10 hour T1/2 decomposition temperature of 70-130° C. before polymerization is initiated. In further embodiments, the substrate will be immersed in the initiator-containing solution for at least 2 hours before polymerization is initiated. In yet further embodiments, the substrate will be immersed in the initiator-containing solution for at least 16 hours before polymerization is initiated. Depending upon the time, temperature and concentration of initiator in the initiator-containing solution, a concentration gradient of initiator in the substrate may be established. In some embodiments, it may be preferable to have a higher concentration of initiator in the substrate nearer to the surface. As noted, the initiator may be present in a range of concentrations in the initiator-containing solution. In general, the concentration of the initiator in the initiator-containing solution will be at least 0.01% by weight. For example, in some embodiments, the concentration of the initiator will generally be at least 0.1% by weight. In some embodiments, the concentration will be even greater, e.g., at least 0.5% by weight. In some embodiments, the concentration will be even greater, e.g., at least 1% by weight. In some embodiments, the concentration will be even greater, e.g., at least 10% by weight. In certain exemplary embodiments, the concentration of the initiator in the initiator-containing solution will be in the range of about 0.2 to about 1% by weight. In certain exemplary embodiments, the concentration of the initiator in the initiator-containing solution will be in the range of about 0.2 to about 10% by weight. In certain exemplary embodiments, the concentration of the initiator in the initiator-containing solution will be in the range of about 0.5 to about 5% by weight. In certain exemplary embodiments, the concentration of the initiator in the initiator-containing solution will be in the range of about 0.75 to about 3% by weight. In each of these embodiments, the initiator is preferably one of the UV, thermal or redox initiators described elsewhere herein.

In some embodiments, the initiator is dissolved in a solvent; preferably, the solvent is an aqueous solvent. A solvent can be water, any appropriate organic solvent, a mixture of water and one or more water soluble or water miscible organic solvents, or a mixture of several organic solvents. Any known suitable solvents can be used, so long as they can dissolve the initiator. Exemplary solvents include, without limitation, water, acetone, alcohols (e.g., methanol, ethanol, propanol, isopropanol, etc.), glycols, ketones, esters, cyclopentanone, cyclohexanone, tetrahydrofuran (THF), acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide. Examples of water soluble or water miscible organic components include without limitation, ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, tetrahydrofuran (THF), imidazole, betaine, and other water soluble or water miscible materials, as well as mixtures thereof.

As a result of the imbibing process, the imbibed substrate may contain about 0.001% by weight initiator. In some embodiments, the imbibed substrate will contain greater amounts of initiator, e.g., at least about 0.01% by weight. For example, in some embodiments the imbibed substrate will contain at least about 0.1% by weight. By way of further example, in some embodiments the imbibed substrate will contain about 0.05% to about 2% by weight initiator. By way of further example, in some embodiments the imbibed substrate will contain about 0.1% to about 1% by weight initiator. By way of further example, in some embodiments the imbibed substrate will contain about 0.2% to about 0.5% by weight initiator. By way of further example, in some embodiments the imbibed substrate will contain about 1% to about 10% by weight initiator. Typically, however, the imbibed substrate will contain less than about 20% by weight initiator. In each of these embodiments, the initiator is preferably one of the UV, thermal or redox initiators described elsewhere herein. The solvent used to imbibe the substrate with initiator may have the capacity to swell the substrate (or at least the portion of the substrate to be imbibed with initiator) to various degrees. Typically, the imbibing solvent has a capacity to swell the substrate (or at least the portion of the substrate to be imbibed with initiator) less than 900% by volume at room temperature and ambient pressure. For example, in one such embodiment, the imbibing solvent has a capacity to swell the substrate (or at least the portion of the substrate to be imbibed with initiator) less than 750% by volume. By way of further example, in one such embodiment, the imbibing solvent has a capacity to swell the substrate (or at least the portion of the substrate to be imbibed with initiator) less than 500% by volume. By way of further example, in one such embodiment, the imbibing solvent has a capacity to swell the substrate (or at least the portion of the substrate to be imbibed with initiator) less than 250% by volume. By way of further example, in one such embodiment, the imbibing solvent has a capacity to swell the substrate (or at least the portion of the substrate to be imbibed with initiator) less than 100% by volume. By way of further example, in one such embodiment, the imbibing solvent has a capacity to swell the substrate (or at least the portion of the substrate to be imbibed with initiator) less than 100% by volume. By way of further example, in one such embodiment, the imbibing solvent has a capacity to swell the substrate (or at least the portion of the substrate to be imbibed with initiator) less than 25% by volume.

In a preferred embodiment, the imbibed substrate is preferably washed using a solvent, optionally with a solvent that swells that substrate, and optionally dried. In other embodiments, the substrate is washed with solvents, which may be the same or different from the imbibing solvents, or the substrate may not be washed. For example, the wash solvent may swell the substrate, shrink the substrate, or neither. In one embodiment, the substrate is dried, partially dried or not dried. Optionally, there may be a solvent exchange.

Imbibing with Monomer

In accordance with another aspect of the present invention, interfacial grafting of a monomer (e.g., a hydrophilic monomer) to the surface of a contact lens is facilitated by saturating the lenses with monomer prior to initiation of the polymerization reaction. This method involves the use of two reaction solutions. After saturating the lenses with monomer, a new solution is created with a lesser amount of monomer. This aspect controls the reaction to the surface of contact lenses and decreases the amount of monomer required to achieve modification of the lens surface. During the surface modification reaction, monomer can polymerize in solution to form ungrafted homopolymer. The homopolymer generally has a low solubility in pure water and can precipitate in the reaction solution, creating cloudiness both in solution and on the surface of the lens. The use of a minimum amount of monomer is preferred to limit homopolymer precipitation, as well as to reduce cost and chemical waste. By saturating the contact lens with a hydrophilic monomer solution prior to the initiation of the polymerization reaction, the polymerization proceeds at the lens surface which is the interface of monomer (within the lens) and initiator (outside the lens), facilitating a surface reaction. Alternately, for UV-initiated surface modification reactions, a lens pre-saturated with the hydrophilic monomer solution can be directly irradiated after removal from the monomer solution to initiate the polymerization reaction without using unreacted initiator. Preferably, there is no excess monomer in the bulk reaction solution, thereby limiting homopolymer precipitation and cloudiness in solution and on the surface of the lens. In some embodiments, the substrate is imbibed with the monomer and also imbibed with the initiator (as described above); for example, the monomer and the monomer can be combined in a single solution (optionally, but preferably, including a solvent or solvent system) and the substrate immersed in the solution.

The monomers may be incorporated into and/or onto the substrate by various techniques. In one such method, the substrate (e.g., a contact lens as previously described) is imbibed with the monomer; that is, the polymerization initiator is absorbed into the substrate. In one embodiment, the monomer(s), i.e., a monomer or a mixture of different monomers, is introduced into and/or onto the substrate's surface by physio-adsorption, wherein the monomer is dissolved in a solvent or combination of solvents and the substrate is submerged in the mixture for a time and at a temperature to achieve sufficient absorption by the substrate. The substrate is allowed to swell ultimately imbibing monomer into the substrate. In general, the amount of monomer incorporated into a substrate during the soak will, at least in part, be a function of the, solubility of the monomer in the solvent system, solubility of the monomer in the substrate as well as the soak time, temperature and concentration of the monomer in the solution, as well as the chemical composition of the substrate and the monomer.

In some embodiments, the monomer is dissolved in a solvent; preferably, the solvent is an aqueous solvent. A solvent can be water, any appropriate organic solvent, a mixture of water and one or more water soluble or water miscible organic solvents, or a mixture of several organic solvents. Any known suitable solvents can be used, so long as they can dissolve the electrolyte (and/or the monomers and/or the initiator). Exemplary solvents include, without limitation, water, acetone, alcohols (e.g., methanol, ethanol, propanol, isopropanol, etc.), glycols, ketones, esters, cyclopentanone, cyclohexanone, tetrahydrofuran (THF), acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide. Examples of water soluble or water miscible organic components include without limitation, ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, tetrahydrofuran (THF), imidazole, betaine, and other water soluble or water miscible materials, as well as mixtures thereof.

The quantity of monomer introduced to the substrate can be controlled by changing the concentration of the monomer in the solvent solution and/or by changing the amount of time the substrate is allowed to soak in the monomer solution during one monomer imbibing period or by repeating any number of monomer imbibing periods as required. Temperature is not narrowly critical, with temperatures in the range of room temperature to elevated temperatures being typical (e.g., $-15°$ C. to $80°$ C.). When utilizing multiple periods of monomer imbibing, the monomer used in the subsequent imbibing periods can be the same as, different from, or a mixture with the monomer used in the previous monomer imbibing period. Thus, the monomer-containing solution can be re-used for multiple or serial applications, typically until the polymer concentration is greater than 1%, greater than 2%, greater than 10%, or greater than 20% by weight of the solution. In general, the substrate is immersed in the monomer-containing solution for at least several seconds (e.g., 30 seconds). In some embodiments, the substrate is immersed in the monomer-containing solution for longer times. For example, the substrate may be immersed in the monomer-containing solution for at least several minutes. By way of further example, the substrate may be immersed in the monomer-containing solution for at least about 5 minutes, 10 minutes, or 15 minutes. In some embodiments, the substrate will be immersed in the monomer-containing solution for at least 1 hour, 2 hours, 4 hours, or 6 hours. In further embodiments, the substrate will be immersed in the monomer-containing solution for at least 6 hours, 8 hours, or 12 hours. In yet further embodiments, the substrate will be immersed in the monomer-containing solution for at least 14 hours, 16 hours, 18 hours, 20 hours, 22 hours, or 24 hours. In one preferred embodiment, the substrate is immersed in the monomer-containing solution for 1 hour. In some embodiments, the initiator is present during the monomer imbibing (i.e., the monomer and the initiator are co-imbibed). In other embodiments, the initiator is added after the monomer imbibing period of time.

As a result of the imbibing process, the imbibed substrate may contain from about 0.01% to about 50% by weight monomer. In some embodiments, for example, the imbibed substrate will contain greater amounts of monomer, e.g., at least about 0.1% by weight, at least about 0.5% by weight, or at least about 1% by weight monomer. By way of further example, in some embodiments the imbibed substrate will contain at least about 2% by weight, at least about 5% by weight, or at least about 10% by weight monomer. By way of further example, in some embodiments, the imbibed substrate will contain about 0.01% to about 2% by weight monomer. By way of further example, in some embodiments the imbibed substrate will contain about 0.1% to about 1% by weight monomer. By way of further example, in some embodiments the imbibed substrate will contain about 0.2% to about 0.5% by weight monomer. By way of further example, in some embodiments the imbibed substrate will contain about 1% to about 10% by weight monomer. By way of further example, in some embodiments the imbibed substrate will contain about 1% to about 20% by weight monomer. By way of further example, in some embodiments the imbibed substrate will contain about 5% to about 25% by weight monomer. By way of further example, in some embodiments the imbibed substrate will contain about 10% to about 50% by weight monomer. Typically, however, the imbibed substrate will contain less than about 20% by weight monomer.

By way of example, a contact lens can be pre-equilibrated in 10%, 25%, or 50% SBMA aqueous solution for 30 seconds to 2 hours (preferably 1 hour) before putting it into a reaction mixture including an initiator (e.g., 0.5 to 200 mM Ce(IV), preferably about 5 mM). The reaction is then performed at 25-80° C. (e.g., 40-60° C.) for 1 hour. The contact lens is also preferably be pre-soaked in water for 40-60 minutes before adding to the reaction; this can help retain the shape and clarity of the lens, as dry lenses placed directly into the reaction mixture tend to exhibit poor clarity and shape upon completion of the reaction. By way of another example, pre-soaking in 5% SBMA in 0.15M NaCl prior to reaction with 5% SBMA and 1 mM Ce(IV) in 0.15M NaCl at 60° C. for 2.5 h, the lens exhibited good shape and clarity after rinse, while the lens without pre-equilibrium was not good in shape and clarity. The soaking solution could be reused until higher than 1%, 2%, 10%, or 20% polymer was found in the solution by NMR.

Ionic Strength

In accordance with another aspect of the present disclosure, the surface modification is carried out in the presence of an electrolyte. In one embodiment, for example, electrolytes such as monovalent salts are added to the reaction solution to increase the ionic strength and minimize zwitterionic polymer precipitation. Moreover, some salts, such as KCl, can additionally act to reduce the formation of high molecular weight homopolymer, which will also maintain a homogenous reaction solution and prevent cloudiness both in solution and on the surface of the lens.

In one embodiment, for example, the surface modification solution includes an electrolyte along with the monomer and the initiator as described herein. In general, the electrolyte can be added at any stage of the reaction or may be present throughout the reaction and any pre-conditioning of the substrate. By way of example, the electrolyte may be present during a monomer imbibing period, an initiator imbibing period, a combination monomer-initiator imbibing period, or may be added after a monomer and/or initiator imbibing period (e.g., at or shortly after the commencement of the polymerization reaction). Suitable electrolytes are those that increase the ionic strength and minimize or prevent precipitation of other solution components (e.g., a zwitterionic polymer). The electrolyte typically comprises a salt having a cationic component and an anionic component. Suitable cations may be monovalent or multivalent, may be organic or inorganic, and include, for example, sodium, potassium, lithium, calcium, magnesium, cesium, and lithium cations, as well as mono-, di-tri- or quaternary ammonium or pyridinium cation. Suitable anions may be a monovalent or multivalent, may be organic or inorganic, and include, for example, chloride, sulfate, nitrate, nitrite, carbonate, citrate, cyanate acetate, benzoate, tartarate, oxalate, phosphate, and phosphonate anions. Suitable electrolytes include, for example, salts of multivalent anions with monovalent cations, such as potassium pyrophosphate, potassium tripolyphosphate, and sodium citrate, salts of multivalent cations with monovalent anions, such as calcium chloride, calcium bromide, zinc halides, barium chloride, and calcium nitrate, and salts of monovalent cations with monovalent anions, such as sodium chloride, potassium chloride, potassium iodide, sodium bromide, ammonium bromide, alkali metal nitrates, and ammonium nitrates. In one preferred embodiment, the electrolyte comprises a monovalent cationic component and a monovalent anionic component, such as, for example, sodium chloride or potassium chloride.

The electrolyte may additionally or alternatively comprise a buffer. Representative buffers include acetates, phosphates, and citrates and a nonexclusive list of these and other particular buffers is as follows: phosphate buffered saline (PBS), borate, Na-Acetate; N-2-Hydroxyethylpiperazine-N'-2-ethanesulfonic acid (HEPES); Na-Cacodylate; Na-Citrate; Na-Succinate; Na-K-Phosphate; Tris(hydroxymethyl)aminomethane (TRIS); TRIS-Maleate; Imidazole-Maleate; Bis-TrisPropane; N-cyclohexyl-3-aminopropanesulfonic acid (CAPS); N-cyclohexyl-2-hydroxyl-3-aminopropanesulfonic acid (CAPSO); 3-[(3-Cholamidopropyl)dimethylammonio] propanesulfonic acid (CHAPS), 2-(N-morpholino)ethanesulfonic acid (MES), and imidizole buffers.

Typically, the electrolyte (and/or other reactants, such as the monomer and/or the initiator) is dissolved in a solvent. A solvent can be water, any appropriate organic solvent, a mixture of water and one or more water soluble or water miscible organic solvents, or a mixture of several organic solvents. Any known suitable solvents can be used, so long as they can dissolve the electrolyte (and/or the monomers and/or the initiator). Exemplary solvents include, without limitation, water, acetone, alcohols (e.g., methanol, ethanol, propanol, isopropanol, etc.), glycols, ketones, esters, cyclopentanone, cyclohexanone, tetrahydrofuran (THF), acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide. Examples of water soluble or water miscible organic components include without limitation, ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, tetrahydrofuran (THF), imidazole, betaine, and other water soluble or water miscible materials, as well as mixtures thereof. In one embodiment, the solvent is water. In another embodiment, the solvent is a mixture of solvents comprising 5%, 10%, or 20% methanol in water.

In some embodiments, for example, the reaction solution comprises from about 10 mM to about 10 M of the electrolyte (or a combination of electrolytes). For example, the reaction solution may comprise from about 100 mM to about 5 M electrolyte. By way of another example, the reaction solution may comprise 150 mM, 200 mM, 250 mM, 300 mM, 350 mM, 400 mM, 450 mM, 500 mM, 750 mM, 1M, 2 M, 3 M, 4 M, or 5 M electrolyte. In one particular embodiment, the electrolyte is present in the reaction solution at a concentration of 150 mM to about 5 M. In another particular embodiment, the electrolyte is 150 mM sodium chloride.

In preferred embodiments, the reaction solution is clear and free of homopolymer. By one method to quantify the cloudiness of the reaction solution, the optical density at 600 nm of the reaction solution around the contact lens is less than about 0.2. For example, the optical density at 600 nm may be less than about 0.1, less than about 0.05, or less than about 0.01. In one embodiment, the optical density measurements in each of the foregoing examples and embodiments recited in this paragraph are taken at the UV polymerization reaction conditions discussed herein or at a reaction temperature of about 60° C. In another embodiment, the optical density measurements in each of the foregoing examples and embodiments recited in this paragraph are taken at room temperature. In another embodiment, the optical density measurements in each of the foregoing examples and embodiments recited in this paragraph are taken at 0° C. after placing the sample vial in an an ice-water bath.

The polymer surface modification reaction is initiated through the use of an initiator. In general, any known suitable initiators can be used in the processes described herein, which involve contacting or mixing the initiator, monomer, and the substrate, or otherwise including initiator in the reaction mixture. A person skilled in the art will know well how to select an initiator for initiating a polymerization. For example, one or more species of ultraviolet (UV) initiators, one or more species of thermal initiators, and/or one or more species of redox initiators may be employed.

In accordance with one embodiment, initiator is incorporated into the substrate by imbibing the substrate or depositing a coating containing the initiator onto the substrate. The incorporated initiator may comprise one initiator species, or more than one initiator species. For example, one or more species of ultraviolet (UV) initiators, one or more species of thermal initiators, and/or one or more species of redox initiators may be incorporated into the substrate. More specifically, in one presently preferred embodiment, the initiator(s) are/is incorporated into the near-surface zone between its upper and lower boundaries as described elsewhere herein. Based upon experimental evidence to date, and without being bound to any particular theory, it appears that the incorporated initiator permits a grafting of the polymeric material from within the near-surface zone as well as the substrate surface.

Regardless of the theory, it is generally preferred that the amount of initiator incorporated into the substrate be sufficient to enable its detection in the substrate, prior to polymerization, and detection of it or a degradation product thereof in the substrate post-polymerization. In general, extractions can use both nonpolar and polar solvents. For example, extraction solvents such as water, acetone or ethanol; and/or other extraction solvents in which the solubility of the initiator and/or its degradation products is at least 1 mg/L. The extraction should be carried out for a sufficient time such that the change in concentration of the extract is not increasing more than 5% per hour. Alternatively, extraction until the amount of extracted material in a subsequent extraction is less than 10% of that detected in the initial extraction, or until there is no analytically significant increase in the cumulative extracted material levels detected. Exemplary extraction conditions include: 37° C. for 72 h; 50° C. for 72 h; 70° C. for 24 h; and 121° C. for 1 h. Exemplary extraction ratio includes 6 cm$^2$/mL surface area/volume and/or 0.2 g sample/mL. In some instances, complete dissolution of the substrate may be appropriate. Materials shall be cut into small pieces before extraction to enhance submersion in the extract media, for example, for polymeric substrates approximately 10 mm×50 mm or 5 mm×25 mm are appropriate.

Examples of the instrumentation used for analysis includes high-performance liquid chromatography-photo-diode array detection-mass spectrometry (HPLC-PDA-MS) for organics analysis; gas chromatography-mass spectrometry (GC-MS) for organics analysis; inductively coupled plasma-optical emission spectroscopy or mass spectrometry (ICP-OES or ICP-MS) for metals analysis; and ion chromatography (IC) for inorganics and ion analysis. More advanced MS detectors such as time-of-flight (TOF) can also be used to obtain accurate mass information. Hexane and alcohol extractions are analyzed, for example by GC-MS and HPLC. Water and alcohol extractions are analyzed, for example by HPLC.

The initiator or its degradation products may be quantified and/or detected in the substrate or grafted polymer by the previously described methods. These include FTIR-ATR, electron spectroscopy for chemical analysis (ESCA, also called X-ray photoelectron spectroscopy, XPS), Secondary Ion Mass Spectrometry (SIMS), and surface-enhanced Raman spectroscopy (SERS). For example, peroxide may be detected spectrophotometrically using any of the following three methods: the iodide method (oxidation of sodium iodide by peroxides in the presence of ferric chloride), the DPPH method (treatment with 1,1-diphenyl-2-picrylhydrazyl, a radical scavenger, to decompose the peroxides), or the peroxidase method (reduction with glutathione, catalyzed by glutathione peroxidase, followed by measuring the coupled oxidation of NADPH in the presence of glutathione reductase). See, for example, Fujimoto et al., Journal of Polymer Science Part A: Polymer Chemistry, Vol. 31, 1035-1043 (1993).

Similarly, the initiator(s) and/or the degradation products thereof may also be extracted from the substrate/grafted polymer using a suitable solvent such as water, acetone or ethanol, and quantified and/or detected in the substrate or grafted polymer by the previously described methods. These include FTIR-ATR, electron spectroscopy for chemical analysis (ESCA, also called X-ray photoelectron spectroscopy, XPS), Secondary Ion Mass Spectrometry (SIMS), and surface-enhanced Raman spectroscopy (SERS). For example, peroxide may be detected spectrophotometically using any of the following three methods: the iodide method (oxidation of sodium iodide by peroxides in the presence of ferric chloride), the DPPH method (treatment with 1,1-diphenyl-2-picrylhydrazyl, a radical scavenger, to decompose the peroxides), or the peroxidase method (reduction with glutathione, catalyzed by glutathione peroxidase, followed by measuring the coupled oxidation of NADPH in the presence of glutathione reductase). See, for example, Fujimoto et al., Journal of Polymer Science Part A: Polymer Chemistry, Vol. 31, 1035-1043 (1993).

In another embodiment, quantification and/or detection of the initiator in the substrate pre-polymerization, or quantification and/or detection of the initiator or its degradation product(s) in the substrate post-polymerization may be accomplished by extraction followed by any of a range of analytical techniques. For example, quantifying and/or detecting the amount of initiator or its degradation product(s) in the extract can be accomplished using spectroscopy and chromatography; including, UV/VIS, FTIR, nuclear magnetic spectroscopy, thin layer chromatography, gas chromatography, and liquid chromatography.

Monomers can be selected such that their reactivity ratios give alternating copolymers, periodic copolymers with a pre-specified ratio of each monomer, random copolymers, block copolymers or homopolymers. Inclusion of more than two reactive groups on each monomer unit allows for the formation of star polymers, dendrimers, regularly branched polymers, randomly branched polymers, and brush polymers. In general, the monomer may be selected from any of the monomers disclosed herein. Thus, for example, the monomers may contain any of the pendant groups corresponding to Formulae ZI-1 to ZI-7. By way of further example, upon polymerization the monomers may provide the polymer with repeat units corresponding to any of Formula 1-12. In a preferred embodiment, the monomers are miscible with the polymerization mixture solvent system.

In processes for modification of the surface of a hydrophobic substrate, a hydrophilic solvent system preferably is employed. Aqueous solutions preferably are used as the solvent system, optionally containing ions or buffers, such as sodium, ammonium, potassium, chloride, phosphate, or acetate. In processes for modifying hydrophilic substrates, a hydrophobic solvent system preferably is used. In such processes, the preferred media is an organic solvent, typically a non-polar organic solvent, or a mixture thereof. Exemplary organic solvents include one or more of toluene, hexane, cyclohexane, benzene, xylene, tetrahydrofuran, and aliphatic alcohols. In a preferred embodiment, the solvent system does not swell the substrate (or at least that portion of the substrate from which the polymer will be grafted) by more than 25% by volume. For example, in one such embodiment, the solvent system does not swell the substrate (or at least that portion of the substrate from which the polymer will be grafted) by more than 10% by volume. In a preferred embodiment, the solvent system does not swell the substrate (or at least that portion of the substrate from which the polymer will be grafted) by more than 5% by volume. In one embodiment, the solvent system may even shrink the substrate (or at least that portion of the substrate from which the polymer will be grafted).

In one particularly preferred embodiment, the non-fouling polymeric materials are grafted from the substrate by chain growth addition polymerization. The polymerization conditions described herein are generally mild compared to other methods of polymerization and thus do not significantly alter the mechanical properties, flexibility, or dimensional properties of the underlying substrate. In one preferred embodiment, for example, polymerization is carried out at a temperature not in excess of 60° C. The polymerization may be carried out over a relatively wide pH range, e.g., about 0-10. In one embodiment, the polymerization reaction is carried out at a pH of about 2-8. For example, when DCP and ferrous gluconate are used as redox pair, the polymerization reaction may be carried out at a pH of about 6-8. By way of further example, when benzoyl peroxide and ferrous gluconate are used as redox pair, the polymerization reaction may be carried out at a pH of about 4-6. By way of further example, when O,O-t-Butyl-O-(2-ethylhexyl)mono-peroxycarbonate ("TBEC") and ferrous gluconate are used as redox pair, the polymerization reaction may be carried out at a pH of about 5-7.

Examples of radical polymerization processes include, but are not limited to, UV, thermal, and redox initiated processes. In particular embodiments, the polymer is grafted from the substrate, optionally by first imbibing with one or more monomers and/or initiators (such as an ultraviolet (UV), thermal, or redox initiator) into the substrate and initiating polymerization of one or more monomers from the surface. In one embodiment, the initiator is incorporated into the substrate by imbibing the substrate with initiator or coating the substrate with a layer, e.g., an undercoating layer (sometimes referred to herein as the co-deposited layer), comprising the initiator. In another embodiment, the monomer is incorporated into the substrate by imbibing the substrate with monomer. The polymerization is typically initiated by exposing the substrate with a solution or suspension of the monomer or monomers to be polymerized and an initiator. The quantity of polymer introduced to the substrate can be controlled by changing the concentration of the polymer in the solvent solution, surface tension of the polymer solution, polymerization temperature, pH of the polymer solution, polymerization solution agitation or flow conditions, by changing the amount of time the substrate is allowed to be in the polymer solution during one polymerization period, and/or by repeating any number of polymerization periods as required. When utilizing multiple polymerization periods, the polymer(s) used in the subsequent polymerization periods can be the same as, different from, or a mixture with the polymer(s) used in the previous polymerization period.

Chain transfer agents can be added to the monomer solution to mediate the graft-from radical polymerization reaction kinetics. Chain transfer agents include, but are not limited to, molecules containing halocarbons, thiols, dithiocarbamates, trithiocarbonates, dithioesters, xanthates, primary or secondary alcohols. Examples of chain transfer agents are bromotrichloromethane, 4-methylbenzenethiol, benzyl alcohol, methanol, ethanol, ethyleneglycol, glycerol, and isopropanol. In one embodiment the radical polymerization graftings are mediated using 2,2,6,6-tetramethylpiperidinie-1-oxyl (TEMPO). In one embodiment the radical polymerization graftings are mediated using reversible addition fragmentation transfer (RAFT) agents. Examples of RAFT agents include 2-(Dodecylthiocarbonothioylthio)-2-methylpropionic acid, 2-Cyano-2-propyl benzodithioate, 2-Cyano-2-propyl dodecyl trithiocarbonate, 4-Cyano-4-(phenylcarbonothioylthio)pentanoic acid, 4-Cyano-4-[(dodecylsulfanylthiocarbonyl)sulfanyl]pentanoic acid, Bis (dodecylsulfanylthiocarbonyl)disulfide, Bis(thiobenzoyl) disulfide, Cyanomethyl dodecyl trithiocarbonate, Cyanomethyl methyl(phenyl)carbamodithioate, and their analogues and derivatives Oxygen can act as an inhibitor in free radical polymerization as it can react quickly with the free radicals generated by the initiator to form stable radical species, which in turn can react with other radical species to form unreactive species which terminate the polymerization. Therefore, creating an oxygen-free environment by degassing with nitrogen or argon or vacuum is typically used to remove oxygen before and during polymerization. However, for certain embodiments, it would preferable not to require such degassing steps in commercial production. In one preferred embodiment, the polymerization method is other than ATRP, which typically requires stringent control of oxygen levels that may be difficult to achieve during manufacturing.

Alternatively, oxygen in the system can be minimized by filling the reactor with the reaction mixtures thus physically displacing the oxygen in the reactor. In another embodiment, reagents which scavenge oxygen can be added to the reaction mixture. Suitable oxygen-scavenging reagents include, but are not limited to, sodium (meta) periodate, riboflavin, and ascorbic acid. These agents may improve the efficacy of the resulting polymer if the polymerization does not employ an inert atmosphere.

In addition to monomer and a solvent system, the polymerization mixture may optionally contain a free radical inhibitor to encourage surface grafting. Without being bound to any particular theory, it is presently believed that the addition of a free radical inhibitor, including, hydroquinone, hydroquinone monomethyl ether, phenothiazine, 3,7-bis(dimethylamino)phenazathionium chloride, triethylene diamine, t-butylcatechol, butylated hydroxytoluene, and 4-t-butylphenol to the grafting solution decreases solution polymerization, thereby allowing more monomer to be available for grafting at or near the substrate surface/polymerization mixture interface.

Plasticizers can be incorporated into the grafted polymer at any time during and/or subsequent to surface polymerization. In the preferred embodiment, a hydrophilic plasticizer (such as citrated esters, ethylene glycol, propylene glycol, and/or polyethylene glycol [<2000 $M_w$]) is incorporated into the grafted polymer in a post-polymerization aqueous wash period.

i. UV Initiators

In one embodiment, the initiator is an ultraviolet (UV) initiator. The substrate and initiator are typically placed into an aqueous, degassed, solution containing a zwitterionic monomer and exposed to UV light, initiating the radical polymerization. Typically, the UV light has a wavelength of from about 220-400 nm and an intensity of 100 W. The distance of the reaction solution can vary, for example, at distances from about 2 cm to about 50 cm. The UV exposure time can also vary, e.g., from 30 seconds to about 4 hours. In one exemplary embodiment, the UV light has a peak wavelength of 365 nm, generated by a 100 W UV.

In accordance with one aspect of the disclosure, unreacted initiator residue in non-extracted lenses can be used to facilitate surface modification via UV reaction. Lenses polymerized via UV and/or visible light energy use compounds excitable with UV-visible light to generate radicals and initiate the curing polymerization process. Excess initiator is preferably used to ensure adequate reaction; the excess initiator residue can be later extracted from the lens before packaging and sterilization.

In one embodiment, the surface modification reaction is performed using UV-initiated polymerization of the hydrophilic monomer to the surface of the contact lens, using only the residual initiator from the lens formation. Without the need to introduce other initiators, this method conveniently fits within current contact lens manufacturing processes, reduces cost and chemical waste, and simplifies the surface modification. For example, the current process for manufacturing a contact lens may include extraction steps wherein the cured contact lens is exposed to aqueous solutions, solvents and/or alcohol to extract the residual initiator and unreacted monomer. Without extracting the unreacted initiator, a separate reaction can be initiated using UV-initiated polymerization after the hydrophilic monomer is added. One surface of the lens may be exposed solely to the UV by controlling the wavelength and intensity of the UV. This may produce a contact lens that has been modified on only the inner or outer surface. Both surfaces may also be modified by this method. In another embodiment, the process comprises manufacturing contact lenses from monomers consisting of: introducing the contact lens substrate monomers with a UV initiator into a mold, polymerizing within a mold, adding monomers for surface modification, and continuing UV exposure without introducing new initiator. In certain embodiments, a greater level of initiator is used in the initial polymerization of the contact lens to allow for residual initiator in the surface modification step. By way of example, an initiator weight percent of at least about 1 ppm to about 50,000 ppm of the weight of the reaction mixture is present for the UV initiation stage. Different intensities and wavelengths of UV may be used for the polymerization of the contact lens body and the surface modification. After the surface modification, the contact lens may be exposed to the extraction steps of the current process for manufacturing an unmodified contact lens.

In an alternate embodiment, two separate UV initiators are simultaneously introduced with the contact lens monomers in the first stage of the process. In another alternate embodiment, two separate UV initiators are introduced, one during the first stage of the process (i.e., curing the lens) and another during the second stage of the process (i.e., applying the surface modification). In some of these embodiments, these separate initiators are capable of being initiated under different conditions from each other, such as at unique wavelengths. Stated differently, one type of initiator could be initiated during the contact lens molding steps and the second type of initiator could be initiated during the surface modification step. Preferably in the embodiments and examples in this paragraph, the UV light has a wavelength of from about 250-400 nm (e.g., 360 nm) and an intensity of 100 W, and the range of exposure is from about 15 minutes to about 2 hours (e.g., 30 minutes)

Representative UV radical initiators for use in the embodiments and examples described herein include, but are not limited to, 1-Hydroxycyclohexyl phenyl ketone, 2,2-Diethoxyacetophenone, 2-Benzyl-2-(dimethylamino)-4'-morpholinobutyrophenone, 2-Hydroxy-2-methylpropiophenone, 2-Hydroxy-4'-(2-hydroxyethoxy)-2-methylpropiophenone, 2-Methyl-4'-(methylthio)-2-morpholinopropiophenone, 3'-Hydroxyacetophenone, 4'-Ethoxyacetophenone, 4'-Hydroxyacetophenone, 4'-Phenoxyacetophenone, 4'-tert-Butyl-2',6'-dimethylacetophenone, Diphenyl(2,4,6-trimethylbenzoyl)phosphine oxide/2-hydroxy-2-methylpropiophenone, 2,2-Dimethoxy-2-phenylacetophenone, 4,4'-Dimethoxybenzoin, 4,4'-

Dimethylbenzil, Benzoin ethyl ether, Benzoin isobutyl ether, Benzoin methyl ether, Benzoin, 2-Methylbenzophenone, 3,4-Dimethylbenzophenone, 3-Hydroxybenzophenone, 3-Methylbenzophenone, 4,4'-Bis(diethylamino)benzophenone, 4,4'-Dihydroxybenzophenone, 4,4'-Bis[2-(1-propenyl)phenoxy] benzophenone, 4-(Diethylamino)benzophenone, 4-Benzoylbiphenyl, 4-Hydroxybenzophenone, 4-Methylbenzophenone, Benzophenone-3,3',4,4'-tetracarboxylic dianhydride, Benzophenone, Methyl benzoylformate, Michler's ketone, Sulfoniums, iodiums, 2-(4-Methoxystyryl)-4,6-bis(trichloromethyl)-1,3,5-triazine, Diphenyliodonium p-toluenesulfonate, N-Hydroxy-5-norbornene-2,3-dicarboximide perfluoro-1-butanesulfonate, N-Hydroxynaphthalimide triflate, 2-tert-Butylanthraquinone, 9,10-Phenanthrenequinone, Anthraquinone-2-sulfonic acid sodium salt monohydrate, Camphorquinone, Diphenyl(2,4,6-trimethylbenzoyl)phosphine oxide, 10-Methylphenothiazine, thioxanthones, and IRGACURE 2959.

ii. Thermal Initiators

In another embodiment a heat activated (thermal) initiator is used, in place of, or in addition to, the UV initiator described above, and the graft-from polymerization is initiated by heating the aqueous monomer solution temperature to a desired temperature and holding the temperature constant until the desired degree of polymerization is achieved.

Suitable thermal initiators include, but are not limited to, tert-Amyl peroxybenzoate, 4,4-Azobis(4-cyanovaleric acid), 2,2'-Azobis[(2-carboxyethyl)-2-methylpropionamidine], 2,2'-Azobis(4-methoxy-2,3,-dimethylvaleronitrile), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

The temperature to which the solution is heated is dependent, among other things, on the monomer and/or the initiator, and/or the substrate. Examples of thermal radical initiators include, but are not limited to, azo-compounds such as azobisisobutyronitrile (AIBN) and 1,1'-Azobis(cyclohexanecarbonitrile) (ABCN). Preferable grafting temperatures are near the 10 hour T1/2 of the initiator selected. The graft-from radical polymerization reaction can be thermally quenched by heating beyond the initiators half life.

iii. Redox Initiators

In another embodiment, a redox initiator system is used to initiate polymerization from the surface of the substrate. The redox initiator system typically includes a pair of initiators: an oxidant and a reducing agent. The redox chemistry described herein can be modified to prepare non-fouling polymeric materials, for example, such as zwitterionic polymeric materials. Redox initiation is regarded as a one-electron transfer reaction to effectively generate free radicals under mild conditions. Suitable oxidants include, but are not limited to, peroxide, hydroperoxide, persulfates, peroxycarbonates, peroxydisulfates, peroxydiphosphate, permanganate, salts of metals such as Mn(III), Ce(IV), V(V), Co(III), Cr(VI) and Fe(III).

Suitable reducing agents include, but are not limited to, metal salts such as Fe(II), Cr(II), V(II), Ti(III), Cu(II), and Ag(I) salts, and oxyacids of sulfur, hydroxyacids, alcohols, thiols, ketones, aldehydes, amine, and amides. For example, in some embodiments, the reducing agent is an iron(II) salt, such as iron(II) L-ascorbate, ferrous sulfate, iron(II) acetate, iron(II) acetylacetonate, iron(II) ethylenediammonium sulfate, iron(II) gluconate, iron(II) lactate, iron(II) oxalate, or iron(II) sulfate.

Polymerization can be initiated by radicals formed directly from the redox reaction and/or by macroradicals formed by the abstraction of a hydrogen atom from the substrate by the transient radicals formed during the redox reaction.

In one embodiment, the substrate is coated with a undercoating coating and the non-fouling material is grafted from the undercoating layer by redox polymerization. The undercoating coating contains oxidants or reducing agents. In a preferred embodiment, the undercoating layer contains one or more reducing agents, such as acids, alcohol, thiols, ketones, aldehydes, amines and amides. An oxidant is used to react with one or more functional groups of the undercoating layer to form radicals which initiate the graft-from polymerization.

In a particular embodiment, the undercoating layer is a copolymer with pendant groups of aliphatic chains containing silanol and/or hydroxyl groups. Such materials can be used to form a undercoating layer on polymeric substrates, such as polyurethane (PU). An oxidant, such as a salt of Ce(IV), reacts with the hydroxyl group under mild conditions to form hydroxyl radicals in the undercoating layer to grow the zwitterionic polymers.

In still another embodiment, a pair of peroxides and metal salts (such as Fe(II) as used in the Fenton Reaction) is used in the redox polymerization to graft zwitterionic polymers from polymers. Peroxides for use in the redox polymerization include hydrogen peroxide, diacyl peroxides, dialkyl peroxides, diperoxyketals, hydroperoxides, ketone peroxides, peroxydicarbonates, and peroxyesters. Exemplary diacyl peroxides include decanoyl peroxide, lauroyl peroxide, succinic acid peroxide, and benzoyl peroxide, Exemplary dialkyl peroxides include dicumyl peroxide, 2,5-di(t-butylperoxy)-2,5-dimethylhexane, t-butyl cumyl peroxide, a,a'-bis(t-butylperoxy)diisopropylbenzene mixture of isomers, di(t-amyl) peroxide, di(t-butyl)peroxide and 2,5-di(t-butylperoxy)-2,5-dimethyl-3-hexyne. Exemplary diperoxyketals include 1,1-di(t-butylperoxy)-3,3,5-trimethylcyclohexane, 1,1-di(t-butylperoxy)cyclohexane, 1,1-di(t-amylperoxy)cyclohexane, n-butyl 4,4-di(t-butylperoxy)valerate, ethyl 3,3-di-(t-amylperoxy)butanoate and ethyl 3,3-di-(t-butylperoxy)butyrate. Exemplary hydroperoxides include cumene hydroperoxide and t-butyl hydroperoxide. Exemplary ketone peroxides include methyl ethyl ketone peroxide mixture and 2,4-pentanedione peroxide. Exemplary peroxydicarbonates include di(n-propyl)peroxydicarbonate, di(sec-butyl)peroxydicarbonate, and di(2-ethylhexyl)peroxydicarbonate. Exemplary peroxyesters include 3-hydroxy-1,1-dimethylbutyl peroxyneodecanoate alpha-cumyl peroxyneodecanoate, t-amyl peroxyneodecanoate, t-butyl peroxyneodecanoate, t-amyl peroxypivalate, t-butyl peroxypivalate, 2,5-di(2-ethylhexanoylperoxy)-2,5-dimethylhexane, t-amyl peroxy-2-ethyl hexanoate, t-butyl peroxy-2-ethyl hexanoate, t-amyl peroxyacetate, t-butyl peroxyacetate, t-butyl peroxyacetate, t-butyl peroxybenzoate, OO-(t-amyl) O-(2-ethylhexyl) monoperoxycarbonate, OO-(t-butyl)-O-isopropyl monoperoxycarbonate, OO-(t-butyl)-O-(2-ethylhexyl)monoperoxycarbonate, polyether poly-t-butylperoxy carbonate, and t-butyl peroxy-3,5,5-trimethylhexanoate.

In accordance with one suitable process, for example, a Fenton reaction is used to initiate the surface modification reaction. In one embodiment, oxidation by a mixture of an iron(II) species and hydrogen peroxide is performed under mild conditions, for example, room temperature, in an aqueous solution, and relatively low concentrations of hydrogen peroxide (e.g., less than in some commercially marketed contact lens cleaning solutions). The surface modification initiated by the Fenton reaction is fast and a simple, one-step reaction, and unlike other initiator systems, residual initiator is non-toxic and easily extracted as described elsewhere herein. In one particular embodiment, the iron(II) species is present in the reaction mixture at a concentration of from about 0.1 mM to about 0.5 M (e.g., 0.5 mM, 10 mM, 25 mM, 50 mM, 100 mM, or 250 mM). In these and other embodiments, the peroxide (e.g., hydrogen peroxide) is present at a concentration of from about 0.05% to about 10% of the reaction mixture. Suitable solvents and solvent systems for the reaction mixture, as well as representative temperatures for carrying out the reaction, are as described elsewhere herein.

In some embodiments, any of the aforementioned peroxides such as benzoyl peroxide, lauroyl peroxide, hydrogen peroxide, or dicumyl peroxide can be imbibed into the polymer such as silicone hydrogel by dipping the polymer into a peroxide solution in an organic solvent for a predetermined period of time and dried. The peroxide containing polymer is put into a solution of monomer. The redox polymerization is initiated by the addition of a reducing agent, for example salts of Fe(II), such as Fe(II) chloride, Fe(II) sulfate, ammonium Fe(II) sulfate, or Fe(II) gluconate, at room temperature or elevated temperature, to the monomer solution.

For modifying the surface of an article and/or surface graft polymerization, it has been found particularly useful to use hydrophobic-hydrophilic redox initiator pairs. For example, in one embodiment the hydrophobic member of a hydrophobic-hydrophilic redox initiator pair is incorporated into a hydrophobic substrate as previously described. The substrate surface is then treated with an aqueous polymerization mixture containing monomers, typically hydrophilic monomers, and the hydrophilic member of the redox pair. This method offers particular advantages when polymers are being grafted from components having exposed external and internal surfaces to be modified (such as catheters) and any substrate that cannot readily be exposed to light. Additionally, such a system tends to minimize the extent of non graft polymerization in the bulk polymerization mixture away from the polymerization mixture/substrate surface interface.

In a preferred embodiment, the hydrophilic-hydrophobic redox pair is a hydrophobic oxidizing agent/hydrophilic reducing agent pair wherein (i) the hydrophobic oxidizing agent is tert-amyl peroxybenzoate, O,O-t-Butyl-O-(2-ethylhexyl)mono-peroxycarbonate, benzoyl peroxide, 2,2-bis (tert-butylperoxy)butane, 1,1-bis(tert-butylperoxy)cyclohexane, 2,5-bis(tert-butylperoxy)-2,5-dimethylhexane, 2,5-Bis(tert-Butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, 4,4-azobis(4-cyanovaleric acid), or 1,1'-Azobis(cyclohexanecarbonitrile), 2,2'-Azobisisobutyronitrile (AIBN) and (ii) the hydrophilic reducing agent is $Fe^{2+}$, $Cr^{2+}$, $V^{2+}$, $Ti^{3+}$, $Co^{2+}$, $Cu^+$, or an amine; transition metal ion complexes, e.g., copper (II) acetylacetonate, $HSO^{3-}$, $SO_3^{2-}$, $S_2O_3^{2-}$, or $S_2O_5^{2-}$. Exemplary combinations include any of the aforementioned peroxides and $Fe^{2+}$. In some preferred embodiments, benzoyl peroxide, dicumyl peroxide, or OO-t-Butyl-O-(2-ethylhexyl) mono-peroxycarbonate are used in combination with $Fe^{2+}$.

In an alternative embodiment, the hydrophilic-hydrophobic redox pair is a hydrophilic oxidizing agent/hydrophobic reducing agent pair wherein (i) the hydrophilic oxidizing agent is peracetic acid, a persulfate such as potassium persulfate, $Fe^{3+}$, $ClO^{3-}$, $H_2O_2$, $Ce^{4+}$, $V^{5+}$, $Cr^{6+}$, or $Mn^{3+}$, or their combinations; and (ii) the hydrophobic reducing agent is an alcohol, carboxylic acid, amine, or a boronalkyl or their combinations.

In accordance with one suitable process, for example, potassium persulfate can be used to initiate the surface modification reaction, similar to the Fenton reaction protocol described above. Unlike many redox reactions which require a redox pair, potassium persulfate alone can efficiently initiate the one-step reaction in aqueous solution. In one particular embodiment, potassium persulfate is present in the reaction mixture at a concentration of from about 0.1 mM to about 0.5 M (e.g., 0.5 mM, 10 mM, 25 mM, 50 mM, 100 mM, or 250 mM). Suitable solvents and solvent systems for the reaction mixture, as well as representative times and temperatures for carrying out the reaction, are as described elsewhere herein.

Other suitable redox systems include (1) organic-inorganic redox pairs, such as oxidation of an alcohol by $Ce^{4+}$, $V^{5+}$, $Cr^{6+}$, $Fe^{3+}Mn^{3+}$; (2) monomers which can act as a component of the redox pair, such as thiosulfate plus acrylamide, thiosulfate plus methacrylic acid, and N,N-dimethylaniline plus methyl methacrylate, and (3) boronalkyl-oxygen systems.

In accordance with another suitable process, for example, redox chemistry with initiation by Ce(IV), using hydroxyl functionality as a point from which to graft from and anchor the surface modification to the substrate. However, any silicone-based hydrogel contact lens, that is, being composed of silicon (>5% of the non-aqueous phase) and possessing an oxygen permeability, $D_k$, higher than $50 \times 10^{-11}$ (cm$^2$/sec), can be modified with this chemistry, whether or not hydroxyl moieties are present on the substrate. In some embodiments, for example, the concentration of silicone in the substrate (e.g., a contact lens) will be at least 1 wt. %, at least 5%, at least 10%, at least 15%, at least 20%, at least 25% or at least 30%. Typically in these embodiments, Ce(IV) concentration will be from about 1 mM to about 10 mM in an aqueous solution; in some embodiments, for example, the Ce(IV) concentration will be about 1 mM, about 2 mM, about 3 mM, about 4 mM, about 5 mM, about 6 mM, about 7 mM, about 8 mM, about 9 mM, or about 10 mM. Suitable solvents and solvent systems for the reaction mixture, as well as representative times and temperatures for carrying out the reaction, are as described elsewhere herein.

iv. Exemplary Initiators

Exemplary initiators include, but are not limited to, diacyl peroxides such as benzoyl peroxide, dichlorobenzoyl peroxide, dilauroyl peroxide, didecanoyl peroxide, diacetyl peroxide succinic acid peroxide, disuccinic peroxide and di(3,5,5-trimethylhexanoyl)peroxide. In a preferred embodiment, the diacyl peroxide is an aromatic diacyl peroxide, such as benzoyl peroxide.

Other exemplary initiators include, but are not limited to, peroxydicarbonates such as diethyl peroxydicarbonate, di-n-butyl peroxydicarbonate, diisobutyl peroxydicarbonate, di-4-tert-butylcyclohexyl peroxydicarbonate, di-sec-butyl peroxydicarbonate, di-2-ethylhexyl peroxydicarbonate, di-n-propyl peroxydicarbonate and diisopropyl peroxydicarbonate; peroxyesters, such as t-butyl perneodecanoate, t-butyl and t-amyl peroxy 2-ethyl hexanoate, and t-butyl peroxybenzoate; monoperoxycarbonates based on t-butyl and t-amyl monoperoxy 2-ethylhexyl carbonates; persulfates, such as potassium persulfate, ammonium persulfate, and sodium persulfate; cumene hydroxide, tert-butyl hydroperoxide, di(tert-amyl)peroxide, tert-butyl peroxide, 2,5-Bis(tert-butylperoxy)-2,5-dimethylhexane, 1,1-Bis(tert-butylperoxy)-3,3,5-trimethylcyclohexane; 1,1-Bis(tert-amylperoxy)cyclohexane, 1,1-Bis(tert-butylperoxy)-3,3,5-trimethylcyclohexane, 1,1-Bis(tert-butylperoxy)cyclohexane, 2,2-Bis(tert-butylperoxy)butane, 2,4-Pentanedione peroxide, 2,5-Bis(tert-butylperoxy)-2,5-dimethylhexane, 2,5-Di(tert-butylperoxy)-2,5-dimethyl-3-hexyne, 2-Butanone peroxide, cumene hydroperoxide, di-tert-amyl peroxide, dicumyl peroxide, lauroyl peroxide, tert-butyl peracetate, tert-butyl peroxide, tert-butyl peroxybenzoate, tert-butylperoxy 2-ethylhexyl carbonate, tert-Butylperoxy isopropyl carbonate, 4-nitro-benzenecarboperoxoic acid t-butyl ester, cyclohexanone peroxide, [(methylperoxy)(diphenyl)methyl]benzene, bis(t-butylcyclohexyl)peroxydicarbonate, and 2,4,6-triphenylphenoxyl dimer.

For articles (substrates) requiring coating on both internal and external surfaces, or even both convex and concave surfaces, additional considerations may be considered for initiating polymerization. Thermal initiators can be used; however, the elevated temperature typically required can adversely affect the substrate material. UV based approaches must be designed such that they can penetrate through the material or can be applied intralumenally from a fiber optic source threaded into the lumen for lumen-containing articles or directed from above and/or beneath the article for articles such contact lenses. This may be achieved by selecting a photoactive initiator which is labile at a UV wavelength not absorbed by the substrate polymer. Generally, lower wavelength UV irradiation is less absorbed and penetrates more readily than higher wavelength UV.

In contrast, redox chemistries generally do not require a direct line of sight to a light source to initiate polymerization since polymerization is not initiated photolytically and therefore may be advantageous for coating substrates that have one or more surfaces that are difficult to expose to the UV source. Further, redox polymerization typically can be done at low temperatures, for example less than 100° C., less than 80° C., less than 60° C., less than 55° C., less than 50° C., less than 45° C., less than 40° C., less than 35° C., or less than 30° C.

The graft-from polymerization can propagate through a cationic or anionic reaction, where the substrate surface acts as the cation or anion initiator or a cationic or anionic initiator is immobilized on the substrate and the monomer contains a reactive olefin. Examples of anionic polymerization are anionic ring opening, as in the case of synthesizing polycaprolactone or polycaprolactam, where the polymerization proceeds through a lactone or lactam moiety in a ring structure containing a pendant zwitterion group. Alternatively, an organic ring containing one or more units of unsaturation and a pendant zwitterionic group are polymerized. In one embodiment a pendant olefin is included in the monomer unit and is used for crosslinking, such as in ring opening metathesis polymerization (ROMP).

Packaging and Storage Solutions

As an alternative to the methods described above for providing the surface modification, a medical device such as a contact lens can be surface modified by immersing the device in a packaging or storage solution containing the polymer or copolymers described hereinabove. In one embodiment, the solution is a packaging solution for storing the lens. The packaging and storage solutions according to the present disclosure may be physiologically compatible, or may require the end user to wash or rinse the lens and place it in a physiologically compatible storage solution. In one embodiment, for example, the solution is "ophthalmically safe" for use with a lens such as a contact lens, meaning that a contact lens treated with the solution is generally suitable and safe for direct placement on the eye without rinsing, that is, the solution is safe and comfortable for daily contact with the eye via a contact lens that has been wetted with the solution. An ophthalmically safe solution has a tonicity and pH that is compatible with the eye and includes materials, and amounts thereof, that are non-cytotoxic according to ISO standards and U.S. Food & Drug Administration (FDA) regulations. In another embodiment, the storage and packaging solution is such that a lens stored therein requires washing or rinsing prior to placement in the eye. The polymer or copolymer will ordinarily be present in the solution in an amount ranging from about 10 ppm to about 10 wt. %, and preferably about 0.1 wt. % to about 5 wt. %.

The packaging or storage solution should also be sterile in that the absence of microbial contaminants in the product prior to release must be statistically demonstrated to the degree necessary for such products. The liquid media useful in the present invention are selected to have no substantial detrimental effect on the lens being treated or cared for and to allow or even facilitate the present lens treatment or treatments. The liquid media are preferably aqueous-based. A particularly useful aqueous liquid medium is that derived from saline, for example, a conventional saline solution or a conventional buffered saline solution.

The pH of the packaging or storage solutions should be maintained within the range of about 6 to about 9, and preferably about 6.5 to about 7.8. Suitable buffers may be added, such as boric acid, sodium borate, potassium citrate, citric acid, sodium bicarbonate, trimethamine, and various mixed phosphate buffers (including combinations of $Na_2HPO_4$, $NaH_2PO_4$ and $KH_2PO_4$) and mixtures thereof. Generally, buffers will be used in amounts ranging from about 0.05 to about 2.5 percent by weight, and preferably from about 0.1 to about 1.5 percent by weight of the solution.

Typically, the solutions of the present invention are also adjusted with tonicity agents, to approximate the osmotic pressure of normal lacrimal fluids which is equivalent to a 0.9 percent solution of sodium chloride or 2.5 percent of glycerol solution. The solutions are made substantially isotonic with physiological saline used alone or in combination, otherwise if simply blended with sterile water and made hypotonic or made hypertonic the lenses will lose their desirable optical parameters. Correspondingly, excess saline may result in the formation of a hypertonic solution which will cause stinging and eye irritation.

Examples of suitable tonicity adjusting agents include, but are not limited to, sodium and potassium chloride, dextrose, glycerin, calcium and magnesium chloride and the like and mixtures thereof. These agents are typically used individually in amounts ranging from about 0.01 to about 2.5% w/v and preferably from about 0.2 to about 1.5% w/v. Preferably, the tonicity agent will be employed in an amount to provide a final osmotic value of at least about 200 mOsm/kg, preferably from about 200 to about 400 mOsm/kg, more preferably from about 250 to about 350 mOsm/kg, and most preferably from about 280 to about 320 mOsm/kg.

If desired, one or more additional components can be included in the packaging or storage solution. Such additional component or components are chosen to impart or provide at least one beneficial or desired property to the packaging or storage solution. Such additional components may be selected from components which are conventionally used in one or more ophthalmic device care compositions. Examples of such additional components include cleaning agents, wetting agents, nutrient agents, sequestering agents, viscosity builders, contact lens conditioning agents, antioxidants, and the like and mixtures thereof. These additional components may each be included in the packaging or storage solutions in an amount effective to impart or provide the beneficial or desired property to the packaging or storage solutions. For example, such additional components may be included in the packaging or storage solutions in amounts similar to the amounts of such components used in other, e.g., conventional, contact lens care products.

Exemplary sequestering agents include, but are not limited to, disodium ethylene diamine tetraacetate, alkali metal hexametaphosphate, citric acid, sodium citrate and the like and mixtures thereof. Exemplary viscosity builders include, but are not limited to, hydroxyethyl cellulose, hydroxymethyl cellulose, polyvinyl pyrrolidone, polyvinyl alcohol and the like and mixtures thereof. Exemplary antioxidants include, but are not limited to, sodium metabisulfite, sodium thiosulfate, N-acetylcysteine, butylated hydroxyanisole, butylated hydroxytoluene and the like and mixtures thereof.

Kits and Methods of Packaging and Storing Articles

Another aspect of the present disclosure is directed to a method of packaging and storing a medical device as described herein, such as a contact lens. In one embodiment, the method includes at least packaging an contact lens as described herein immersed in an aqueous contact lens packaging solution, for example a packaging and storage solution that is capable of providing a surface modification as described herein. The method may include immersing the lens in an aqueous packaging solution prior to delivery to the customer/wearer, directly following manufacture of the contact lens. Alternately, the packaging and storing in the solution described above may occur at an intermediate point before delivery to the ultimate customer (wearer) but following manufacture and transportation of the lens in a dry state, wherein the dry lens is hydrated by immersing the lens in the contact lens packaging solution. Consequently, a package for delivery to a customer may include a sealed container containing one or more unused contact lenses immersed in an aqueous packaging and storage solution according to the present disclosure.

In one embodiment, the steps leading to the present ophthalmic lens packaging system includes (1) molding an ophthalmic lens in a mold comprising a posterior and anterior mold portion, (2) removing the lens from the mold and hydrating the lens, (3) introducing the packaging solution with the surface modification polymer or copolymer into the container with the lens supported therein, and (4) sealing the container. Additional steps may include performing an imbibing step and/or one or more surface modification steps as described herein. For example, step (3) above may involve applying a surface modification on the hydrated lens in the packaging solution, e.g., by introducing one or more monomer and initiator combinations and initiating polymerization as described herein (e.g., such as an ultraviolet (UV), thermal, or redox initiated polymerization). Preferably, the method also includes the step of sterilizing the contents of the container. Sterilization may take place prior to, or most conveniently after, sealing of the container and may be effected by any suitable method known in the art, e.g., by autoclaving of the sealed container and its contents at temperatures of about 120° C. or higher.

In another embodiment, this invention comprises: (1) molding an ophthalmic lens in a mold comprising a posterior and anterior mold portion, (2) removing the lens from the mold, and (3) introducing the lens and the solution with the surface modification polymer or copolymer into a container.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Grafting SBMA Polymer on Contact Lens Surface Via Ce(IV) Mediated Reaction

A contact lens was placed into a glass vial filled with an aqueous solution of 5% (wt/wt) SBMA with 1 mM ammonium cerium (IV) nitrate. The vial was topped off with the same reaction solution and was capped without any air bubbles. After it was sealed with electric tape, the vial was put on a shaker at 100 rpm at 60° C. for 1 h. After reaction, the sample was taken out and rinsed with 0.15M NaCl overnight.

Example 2

Grafting SBMA Polymer on Contact Lens Surface Via UV Chemistry

Step 1. Initiator IRGACURE 2959 imbibing. IRGACURE 2959 was dissolved in water at 37° C. to make a 0.5% solution. Contact lenses were placed in a 20 mL glass vial with 0.5% IRGACURE solution on a shaker at 100 rpm at 37° C. for 1 h. After rinsing with water for about 30 seconds, the contact lenses were put on a polyethylene rack to be separated from each other. After the lenses were dried with small air flow, they were kept in the dark overnight for further drying.

Step 2. UV grafting. The IRGACURE 2959 imbibed contact lenses were put into quartz glass tubes (one lens per tube) with 10% SBMA (wt) in water stoppered with rubber septa and secured with parafilm. The SBMA solution was purged with nitrogen through needles for 20 min and the needles were taken out. Any bubble attached on the contact lenses was removed by tapping the tubes. The tubes were placed upright in a UV-reactor and irradiated with spinning for 30 min. After removing the tubes from the reactor, each contact lens was rinsed in 0.15M NaCl overnight.

Example 3

Grafting pSBMA from Silicone Hydrogel Contact Lens Surfaces Using TBEC-Fe(II) Initiated Redox Polymerization to Improve Surface Hydrophilicity and Wettability A solution was prepared by adding t-butyl ethylhexyl peroxycarbonate (TBEC, a thermal initiator) (1.0 weight/volume %) to heptane. Five silicone hydrogel contact lenses were immersed in 50 ml of the above solution. The solution container was protected from light and the solution was agitated using an orbital shaker set at 120 rpm for 30 minutes. After 30 minutes, the above solution was decanted and the lenses were immersed and agitated in approximately 20 ml of heptane for approximately 10 seconds to remove residual TBEC. The heptane was decanted and the lenses imbibed with TBEC were dried for approximately 10 seconds on each side in a closeable rack using a gentle stream of compressed air. The lenses imbibed with TBEC were then protected from the light and allowed to dry at ambient conditions for 1-2 hours.

A solution was prepared by dissolving N-(3-sulfopropyl)-N-methacryloxyethyl-N,N-dimethylammonium betaine (SBMA) in de-ionized water. A solution was prepared by dissolving iron(II) gluconate dihydrate (ferrous gluconate) in de-ionized water. The aqueous ferrous gluconate solution was added to the aqueous SBMA solution and mixed thoroughly to create the reaction solution (1.0, 5.0, or 10.0 weight % SBMA, 5 mM ferrous gluconate). The reaction solution was then added to reaction vessels, and the lenses that had been previously imbibed with TBEC were immersed in the reaction solution. All air bubbles were removed from the lenses and reaction solution was added until the reaction vessel was completely full. The reaction vessel was capped and secured with parafilm and vinyl electrical tape to create an air-tight seal. The solutions containing the lenses were agitated using an orbital shaker set at 120 rpm and were heated at 60° C. for 2 hours to induce thermal graft-polymerization from the lens surface. After the 2 hour polymerization, the lenses were immersed in 0.15 M saline and agitated on an orbital shaker set at 120 rpm for 30 minutes to remove entangled oligomer, homopolymer and unreacted monomer from the lens surface. This 30 minute rinsing procedure was repeated two more times followed by an overnight rinse.

The contact angle of the surfaces of the treated lenses was measured using the static captive bubble method. Contact angle measurements for the Control lenses ranged from 19° to 36° whereas contact angle measurements for the lenses treated according to the invention all had contact angle measurements of 0° wherein there was no interaction of the captive air bubble with the modified surfaces.

The data demonstrate that the method of this invention significantly enhances the hydrophilicity and wettability of the surfaces of silicone hydrogel contact lenses.

Example 4

Adding Salt to Improve Processing

During the grafting of SBMA on contact lens via both Ce(IV) and UV chemistry, homopolymer of SBMA was produced during the reaction. Due to the existence of UCST of SBMA homopolymer, it precipitated from the solution when the reaction was not run at high temperature. As the homopolymer is soluble in salt solution, the addition of salt reduced the formation of precipitation during above reactions and kept to keep a clear solution. For example, 0.15M NaCl was added in Example 1 and 2.

Example 5

Process Description of UV in Various Manufacturing Processes (Without Initiators)

A non-extracted contact lens was put within the SBMA solution in a quartz glass tube. The SBMA solution was purged with nitrogen through needles for 20 min and the needles were taken out. Any bubble attached on the contact lenses was removed by tapping the tubes. The tubes were placed upright in a UV-reactor and irradiated with spinning for 30 min (100 W, mercury lamp, wavelength ca 360 nm). After removing the tubes from the reactor, each contact lens was rinsed in 0.15M NaCl overnight and thereafter evaluated using ATR-FTIR and contact angle test.

Example 6

Grafting Betaine Polymers Using Other Initiators

A contact lens and a polyHEMA hydrogel were added into a glass vial filled with the aqueous solution of 5% (wt/wt) SBMA with 1-5 mM iron (III) or other transitional or lanthanide metals. The vial was added to full with the reaction solution and was capped without any air bubbles. After being sealed with electric tape, the vial was put on the shaker at 100 rpm at 60° C. for 1 h. After reaction, the sample was taken out and rinsed with 0.15M NaCl overnight. Other initiators were tried and the reactions are listed in Table 1.

TABLE 1

New Catalysts for Polymerizing SBMA from Silicone Hydrogel Contact Lenses and from polyHEMA Hydrogel

| Catalyst | Catalyst Conc. | Substrate | SBMA Conc. (%) | Evidence of Grafting by ATR-FTIR |
|---|---|---|---|---|
| Fenton's Reagent | 1 mM $H_2O_2$ 100 mM Fe(II)-gluconate | SiHy Contact Lens | 10 | Yes |
| Fenton's Reagent | 1 mM $H_2O_2$ 100 mM Fe(II)-gluconate | pHEMA Hydrogel | 10 | Yes |

Example 7

Grafting Betaine Polymers Using Other Initiators

A contact lens and a polyHEMA hydrogel were added into a glass vial filled with the aqueous solution of 5% (wt/wt) SBMA with 1-5 mM potassium persulfate. The vial was added to full with the reaction solution and was capped without any air bubbles. After being sealed with electrical tape, the vial was put on the shaker at 100 rpm at 60° C. for 1 h. After reaction, the sample was taken out and rinsed with 0.15M NaCl overnight. Other initiators were tried and the reactions are listed in Table 2.

TABLE 2

New Catalysts for Polymerizing SBMA from Silicone
Hydrogel Contact Lenses and from polyHEMA Hydrogel

| Catalyst | Catalyst Conc. | Substrate | SBMA Conc. (%) | Evidence of Grafting by ATR-FTIR |
|---|---|---|---|---|
| Potassium Persulfate | 1 mM | SiHy Contact Lens | 5 | Yes |
| Potassium Persulfate | 1 mM | pHEMA Hydrogel | 5 | Yes |

Example 8

Grafting SBMA on Other Lenses from CIBA, Cooper, J&J, B&L, and Contamac

The following lenses from different companies (all silicone-based hydrogels) were modified using cerium and UV chemistry, grafting SBMA on the surface. The surface was characterized with ATR-FTIR. Contact angle after modification was measured.

| Sample | Substrate | Chemistry | Static Contact Angle | Evidence of Grafting by ATR-FTIR |
|---|---|---|---|---|
| 1 | ocufilcon D | 5% SBMA + 1 mM Ce(IV), 3 h | 0° | yes |
| 2 | lotrafilcon B | 10% SBMA + 2 mM Ce(IV), 4 h | 0° | yes |
| 3 | lotrafilcon B | 10% SBMA + 5 mM Ce(IV), 4 h | 0° | yes |
| 4 | senofilcon A | 10% SBMA + 1 mM Ce(IV), 4 h | N/A | yes |
| 5 | senofilcon A | 10% SBMA + 4 mM Ce(IV), 4 h | N/A | yes |
| 6 | efrofilcon A | 5% SBMA + 1 mM Ce(IV), 1.7 h | N/A | yes |
| 7 | efrofilcon A | 5% SBMA + 1 mM Ce(IV), 1.7 h | N/A | yes |
| 8 | ocufilcon D | 10% SBMA, no initiator, 3 h | 0° | yes |
| 9 | lotrafilcon B | 10% SBMA, no initiator, 1 h | N/A | yes |
| 10 | etafilcon A | 10% SBMA, no initiator, 3 h | N/A | yes |
| 11 | efrofilcon A | 10% SBMA, no initiator, 1.5 h | N/A | yes |
| 12 | efrofilcon A | 10% SBMA, no initiator, 1.5 h | N/A | yes |

Example 9

Multiple types of silicone hydrogel lenses were modified according to the previous examples and analyzed using Eosin staining or EDS. The silicone hydrogel lenses, measurements reaction conditions are identified in Table 1 and the results are depicted in FIGS. 1-4. FIG. 4 shows measurement of atomic percentage on the y-axis proceeding from a position outside the lens, through the surface of the lens (at approximately 4 microns), and then into the depth of the lens beyond 4 microns. These examples demonstrate the uniformity of the surface modification on each lens. These examples also demonstrate the flexibility of the chemistry and the ability to modify a variety of lenses with various depths of penetration based on the reaction conditions.

TABLE 1

Figure 2:
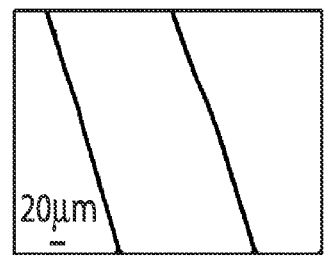

| | Reaction Conditions | Eosin images |
|---|---|---|
| SiHy/TBEC Eosin thickness: 5 µm; total thickness: 153 µm; 3.3% penetration depth | 1% TBEC in heptane (30 min, 22° C.), 1% SBMA, 5 mM Fe(II) gluconate, 2 h, 60° C., autoclaved | Fig. 1 |
| SiHy/Ce Eosin thickness: 4 µm; total thickness: 180 µm; 2.2 % penetration depth | 5% SBMA, 1 mM Ce(IV), 60° C., 1 h | Fig. 2 |

TABLE 1-continued

Figure 3:
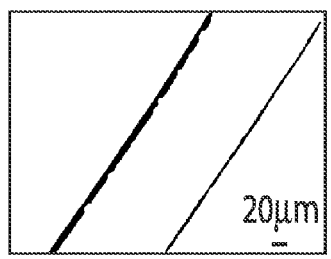
Figure 4:
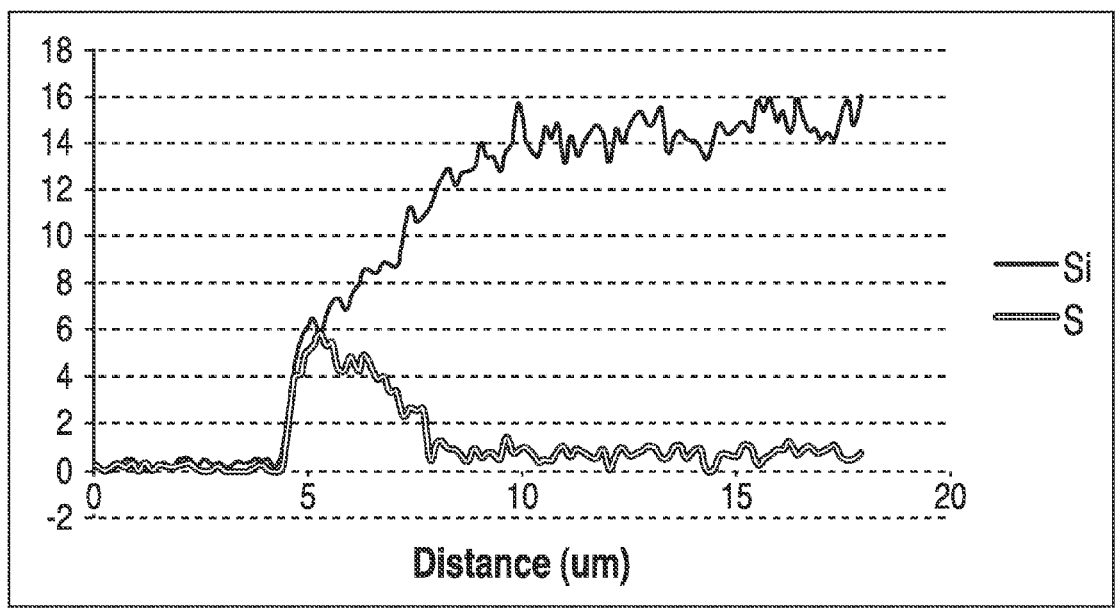
FIG. 4 is a plot of Si (silicon) and S (sulfur) as a function of depth from the surface of a contact lens having a surface modification as described in Example 9.

| | Reaction Conditions | Eosin images |
|---|---|---|
| SiHy/UV Eosin thickness: 7 µm; total thickness: 126 µm; 5.5% penetration depth | 0.5 % initiator, 5 ml/lens imbibed 1 h at 37° C., rinse and dry, then 10% SBMA, UV, 0.5 h | Fig. 3 |
| SiHy/Ce EDS thickness: 3.5 µm | 10% SBMA, 1.5 mM Ce(IV), 60° C., 4 h | Fig. 4 |

Example 10

Multiple batches of silicone hydrogel contact lenses (Air Optix® Aqua lenses) were modified as described in Example 1 (except that the aqueous solution was an aqueous solution of 15% (wt/wt) SBMA with 1 mM ammonium cerium (IV) nitrate) and the vial was put on a shaker for 4 hours) and measured for Contact Angle and Dimensions. The average advancing contact angle was 19.3±2.4 degrees. The average dimensions were 14.2±0.04 mm diameter and 8.53±0.05 mm base curve.

Example 11

Samples of modified contact lenses according to Example 10 were submitted for coefficient of friction measurements. Results demonstrated that the modified lenses had 62% less friction than the unmodified control lenses.

Example 12

Samples of modified contact lenses according to Example 10 were submitted for total sulfur analysis. The results were 0.078%.

Example 13

Samples of modified contact lenses according to Example 10 were submitted for oxygen permeability (Dk) measurements by a polarographic method. The results were that the effective permeability was 106 Fatt Dk units compared to 110 Fatt Dk units for unmodified lenses. This demonstrates that Dk, one of the bulk properties of the lenses, was not changed substantially.

Example 14

Samples of modified contact lenses according to Example 10 were submitted for power measurements after storage at ambient temperature for 90 days. The results for the modified lenses were −0.53 Diopters compared to −0.50 Diopters for the unmodified lenses, demonstrating that the power of the lenses was not changed substantially by modifying the surface.

Example 15

Samples of modified contact lenses according to Example 10 were submitted for water content. The results were 36% water content for the modified lenses compared to 33% water content for unmodified control lenses. This demonstrates that the surface modification does not substantially change the bulk water content.

Example 16

Samples of modified contact lenses according to Example 10 were submitted for Zeta Potential. The results demonstrated a neutral charge for both the modified and unmodified lenses, showing no change in surface charge due to the surface modification.

Example 17

Samples of modified contact lenses according to Example 10 were sterilized by autoclave and submitted for sterility testing. Results demonstrated no growth of organisms over 2 weeks in soybean casein digest broth (SCDB) or fluid thioglycollate medium (FTM). This result indicates that the contact lenses were able to be sterilized and the chosen packaging was able to maintain the sterility of the lenses.

Example 18

Samples of modified contact lenses according to Example 10 were tested for Endotoxin by LAL method. Results demonstrated the lenses had no detectable endotoxins (<0.025 Endotoxin Units per device).

Example 19

Samples of modified contact lenses according to Example 10 were submitted for Biocompatibility testing. The results demonstrated that the lenses were not cytotoxic per ISO 10993-5, not irritating to ocular tissue per ISO 10993-10 and there was no evidence of systemic toxicity per ISO 10993-11.

Example 20

Samples of modified contact lenses were subjected to a simulated cleaning regimen for 30 cycles. Lenses were rinsed with a 3% hydrogen peroxide solution and rubbed between gloved palm and index finger for 30 seconds. This stress was performed 30 times consecutively to simulate one month of cleaning. Advancing contact angles for the modified lenses after rubbing were 17±2 degrees, whereas the average advancing contact angle for the control lenses increased to above 30 degrees.

Example 21

Samples of modified contact lenses according to Example 10 were tested in 10 patients for evaluation of safety under an IRB approved protocol. No safety concerns were noted.

Example 22

A modified contact lens prepared according to Example 10 and an otherwise identical contact lens that was not modified according to Example 10 were analyzed on a Thermo Scientific K-Alpha XPS using a monochromatic soft aluminum K-alpha X-ray generated by 12 kV electron beam, using X-ray energy of 1.4866 keV, line width of 0.85 eV, and spot size of 400 micron. No carbon or other sputter-coating was used. To study the depth profile, each of the samples were etched with an argon sputtering gun. The argon ions had an energy of 1000 eV. The raster size was 2 mm. Each etching cycle was 30 seconds. A survey spectrum was scanned after each etching, so that the surface elements could be detected and quantified. For the modified sample, 60 etching cycles were performed. For the unmodified control sample, 30 cycles were performed.

Figure 5:
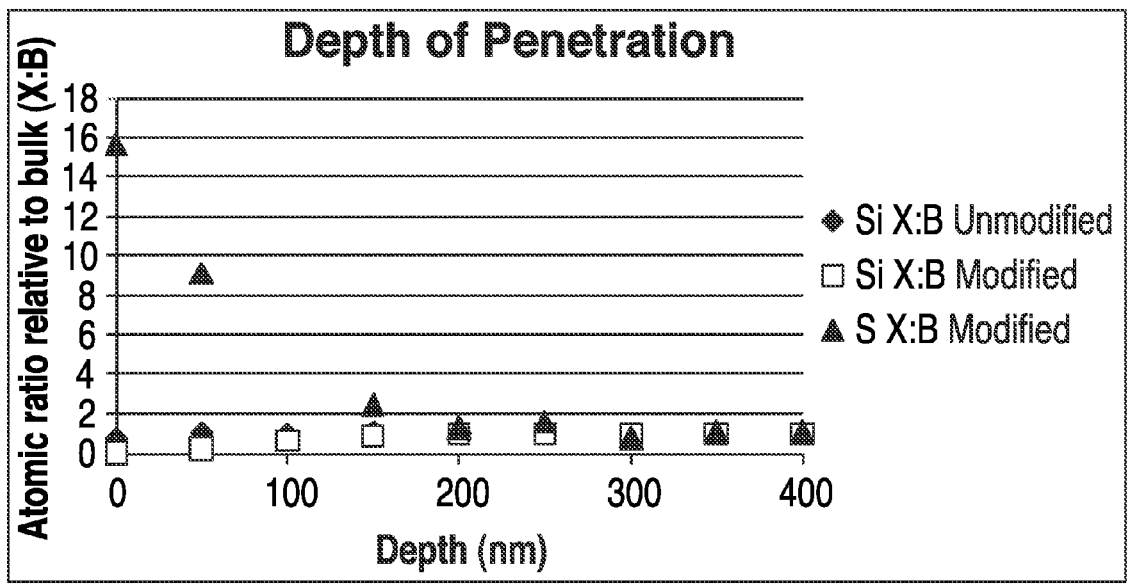
FIG. 5 is a plot showing the concentration of silicon (Si) and sulfur (S) as a function of depth from the surface of a contact lens having a surface modification as described in Example 22.
Figure 6:
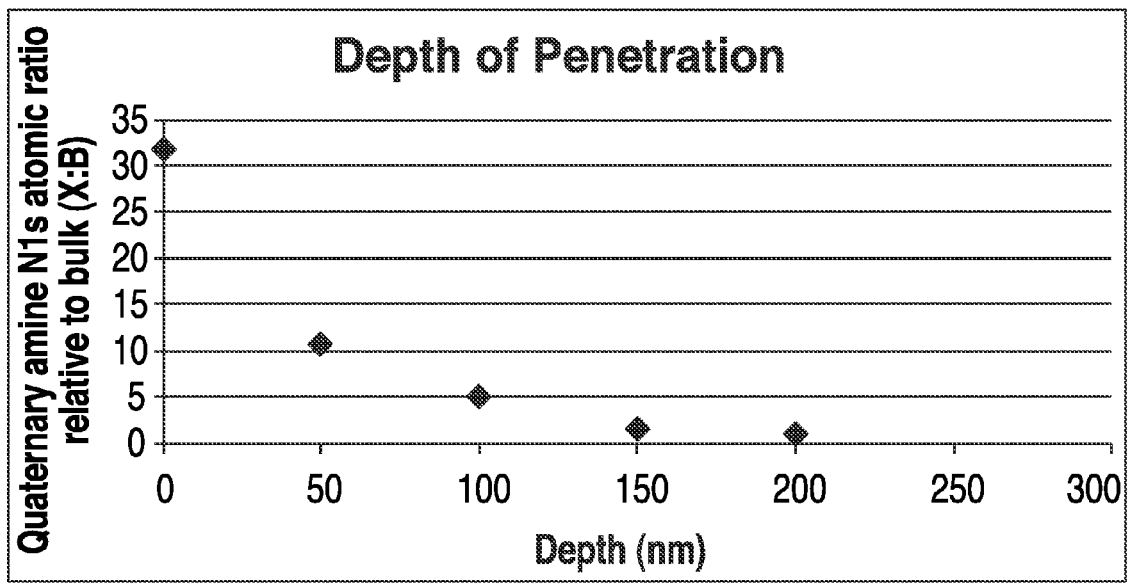
FIG. 6 is a plot showing the concentration of quaternary nitrogen (N1s) as a function of depth from the surface of a contact lens having a surface modification as described in Example 22.

The results are depicted in FIGS. 5 and 6. In each of these, the concentration of the element was normalized as a ratio (X:B) where "X" is the measured value at the point of measurement and "B" is the bulk concentration where the concentration is not substantially changing. In these measurements, the bulk concentration "B" was determined by calculating the average concentration over consecutive 50 nm intervals and identifying the first interval where the average concentration is within 10% of the average concentration of the previous interval. In FIGS. 5 and 6, the concentrations are averaged over 50 nm intervals, and the concentration is plotted at the leftmost point of the interval (e.g., the concentration plotted at 100 nm is the average of concentration from 100 nm to 150 nm).

For the unmodified sample, there was a 30% lower concentration of silicon on the surface than in the bulk (ratio of 0.7). For the modified sample the normalized ratio of the concentration of sulfur on the surface was initially 10-fold greater than the concentration of sulfur in the bulk (after 200 nm) and decreased approximately linearly from 10 to 1 over 200 nm whereas the normalized ratio of silicon increased from 0.04 on the surface to 1. (See FIG. 5).

FIG. 6 is an analysis of the quaternary amine (N1s) within the top 250 nm of the modified surface. The maximum normalized ratio for quaternary amine N1s is about 50 (i.e., about 5-fold greater than the maximum normalized ratio for sulfur) but the N1s normalized ratio curve has a slope and gradient that is consistent with slope and gradient of the normalized ratio curve for sulfur for the surface modification.

What is claimed is:

1. A process for modifying the surface of a silicon-containing polymer, the process comprising the steps of:
    forming a silicon-containing polymer in a first polymerization reaction mixture, the first polymerization reaction mixture comprising a photo-initiator whereby the photo-initiator initiates the polymerization and/or crosslinking of the silicon-containing polymer;
    forming a second polymerization reaction mixture comprising the silicon-containing polymer, a polymerization monomer, a free radical initiator system and a solvent system, the polymerization monomer comprising a zwitterionic monomer, wherein a residual amount of the photo-initiator that initiated the formation of the silicon-containing polymer in the first reaction mixture is present in the silicon-containing polymer when the silicon-containing polymer is combined with the solvent system of the second polymerization reaction mixture; and
    polymerizing the monomer in the second polymerization reaction mixture to form a surface modification polymer on the surface of the silicon-containing polymer.

2. The process of claim 1 wherein no more than 20% of the photo-initiator contained by the silicon-containing polymer is removed from the silicon-containing polymer before the silicon-containing polymer is combined with the solvent system of the second polymerization reaction mixture.

3. The process of claim 1 wherein the silicon-containing polymer contains at least 1 wt. % silicon.

4. The process of claim 1 wherein the silicon-containing polymer contains at least 20 wt. % silicon.

5. The process of claim 1 wherein the surface modification polymer comprises a carboxyammonium polymer or a sulfoammonium polymer.

6. The process of claim 1 wherein the surface modification polymer comprises a zwitterionic polymer.

7. The process of claim 1 wherein the surface modification polymer comprises a carboxybetaine polymer or a sulfobetaine polymer.

8. The process of claim 1 wherein the surface modification polymer comprises repeat units corresponding to Formula 3:

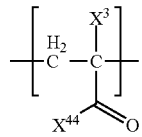

Formula 3 wherein $X^{44}$ comprises an oxylated alkylene moiety, a zwitterionic moiety, an anionic moiety, or a cationic moiety.

9. The process of claim 8 wherein $X^{44}$ is —$OX^{45}$, —$NHX^{45}$, or —$SX^{45}$, and $X^{45}$ is a substituted hydrocarbyl or heterocyclo moiety comprising an oxylated alkylene moiety, a zwitterionic moiety, an anionic moiety, or a cationic moiety.

10. The process of claim 9 wherein $X^3$ is hydrogen or alkyl.

11. The process of claim 8 wherein $X^{44}$ is —$O(CH_2)_2N^+(CH_3)_2(CH_2)_nSO_3^-$, —$O(CH_2)_2N^+(CH_3)_2(CH_2)_nCO_2^-$, —$NH(CH_2)_3N^+(CH_3)_2(CH_2)_nCO_2^-$, or —$NH(CH_2)_3N^+(CH_3)_2(CH_2)_nSO_3^-$, and n is 1-8.

12. The process of claim 8 wherein $X^{44}$ is —$NH(CH_2)_mN(CH_2)_nCH_3(CH_2)_pSO_3$, —$NH(CH_2)_mN(CH_2)_mCH_3(CH_2)_pCO_2$, —$NH(CH_2)_mN^+[(CH_2)_nCH_3]_2(CH_2)_pSO_3$, —$NH(CH_2)N^+[(CH_2)_nCH_3]_2(CH_2)_pCO_2$, —$NH(CH_2)_mNcyclo$-$(CH_2)_pCO_2$, or —$NH(CH_2)_mNcyclo$-$(CH_2)_pSO_3$, Ncyclo- is a heterocyclic structure or a heterocyclic derivative containing at least one nitrogen atom, m is 1-8; n is 0-5; and p is 1-8.

13. The process of claim 1 wherein the silicon-containing polymer contains more than 10 ppm of the photo-initiator that initiated the formation of the silicon-containing polymer in the first reaction mixture when the silicon-containing polymer is combined with the solvent system of the second polymerization reaction mixture.

14. The process of claim 1 wherein the silicon-containing polymer contains more than 1,000 ppm of the photo-initiator that initiated the formation of the silicon-containing polymer in the first reaction mixture when the silicon-containing polymer is combined with the solvent system of the second polymerization reaction mixture.

15. The process of claim 1 wherein the free-radical initiator system comprises first and second initiator sand the first and second initiators are capable of being initiated at different wavelengths.

16. An article formed by the process of claim 1.

17. The article of claim 16 wherein the article is a contact lens.

* * * * *